(12) United States Patent
Tao et al.

(10) Patent No.: US 12,067,211 B2
(45) Date of Patent: Aug. 20, 2024

(54) MULTI-WINDOW DISPLAY INTERFACE WITH HISTORICAL TASK BAR

(71) Applicant: Huawei Technologies Co., Ltd., Shenzhen (CN)

(72) Inventors: Qiang Tao, Beijing (CN); Jing Han, Beijing (CN); Guangyuan Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/760,587

(22) PCT Filed: Oct. 31, 2017

(86) PCT No.: PCT/CN2017/108818
§ 371 (c)(1),
(2) Date: Apr. 30, 2020

(87) PCT Pub. No.: WO2019/084827
PCT Pub. Date: May 9, 2019

(65) Prior Publication Data
US 2020/0278775 A1    Sep. 3, 2020

(51) Int. Cl.
*G06F 3/0482*   (2013.01)
*G06F 3/0485*   (2022.01)
*G06F 3/04883*  (2022.01)

(52) U.S. Cl.
CPC .......... *G06F 3/0482* (2013.01); *G06F 3/0485* (2013.01); *G06F 3/04883* (2013.01)

(58) Field of Classification Search
CPC .. G06F 3/0482; G06F 3/0485; G06F 3/04883; G06F 3/04486; G06F 2203/04803
See application file for complete search history.

(56) References Cited

U.S. PATENT DOCUMENTS 8,584,022 B1 * 11/2013 O'Shaughnessy .... G06F 3/0482
715/752
9,052,820 B2 *  6/2015 Jarrett .................... G06F 3/017
(Continued)

FOREIGN PATENT DOCUMENTS

CN    102855051 A    1/2013
CN    103577045 A    2/2014
(Continued)

OTHER PUBLICATIONS

Tripathi, S., et al., "Distributed Control Plane For High Performance Switch-based VXLAN Overlays," ANCS 15: Proceedings of the Eleventh ACM/IEEE Symposium on Architectures for networking and communications systems May 2015, 12 pages.
(Continued)

*Primary Examiner* — Ariel Mercado-Vargas
(74) *Attorney, Agent, or Firm* — Conley Rose, P.C.

(57) ABSTRACT

A method and associated apparatus provide for displaying, by a terminal, a first interface in response to an operation input by a user. Input by the user indicates to shrink the first interface, and display an interface including the shrunk first interface. In response to a minimization operation input by the user, a second interface is displayed on which the first interface is in a minimized state, a third minimized interface is displayed in the same way. A drop-down menu of a status bar is displayed in response to user input A multi-window display interface in response to a selection operation input by the user.

20 Claims, 58 Drawing Sheets

(56) References Cited

U.S. PATENT DOCUMENTS

| | | | | |
|---|---|---|---|---|
| 2005/0278650 A1* | 12/2005 | Sims | | H04M 3/5133 |
| | | | | 715/778 |
| 2006/0161847 A1* | 7/2006 | Holecek | | G06F 3/0481 |
| | | | | 715/716 |
| 2007/0186176 A1* | 8/2007 | Godley | | G06F 3/0483 |
| | | | | 715/764 |
| 2008/0126982 A1 | 5/2008 | Sadikali et al. | | |
| 2009/0228805 A1* | 9/2009 | Ruehle | | G06F 9/4493 |
| | | | | 715/745 |
| 2011/0087982 A1* | 4/2011 | McCann | | G06F 3/0486 |
| | | | | 715/788 |
| 2011/0175930 A1 | 7/2011 | Hwang et al. | | |
| 2012/0304132 A1* | 11/2012 | Sareen | | G06F 3/04883 |
| | | | | 715/863 |
| 2013/0050263 A1* | 2/2013 | Khoe | | G06F 3/04883 |
| | | | | 345/634 |
| 2013/0104075 A1* | 4/2013 | Matthews | | G06F 9/451 |
| | | | | 715/800 |
| 2013/0187861 A1* | 7/2013 | Lavallee | | G06F 9/543 |
| | | | | 345/173 |
| 2013/0263042 A1* | 10/2013 | Buening | | G06F 3/04883 |
| | | | | 715/783 |
| 2014/0109001 A1* | 4/2014 | Louch | | G09G 5/14 |
| | | | | 715/794 |
| 2014/0137036 A1* | 5/2014 | Han | | G06F 3/0482 |
| | | | | 715/798 |
| 2014/0164957 A1* | 6/2014 | Shin | | G06F 3/0481 |
| | | | | 715/753 |
| 2015/0227287 A1* | 8/2015 | Lee | | G06F 3/0482 |
| | | | | 715/830 |
| 2016/0124595 A1* | 5/2016 | Kim | | G06F 3/04842 |
| | | | | 715/769 |
| 2016/0179310 A1* | 6/2016 | Chaudhri | | G06F 3/0488 |
| | | | | 715/808 |
| 2016/0202884 A1* | 7/2016 | Ohki | | G06F 3/04842 |
| | | | | 715/784 |
| 2016/0274736 A1 | 9/2016 | Lamego et al. | | |
| 2016/0357358 A1 | 12/2016 | Forster et al. | | |
| 2017/0010790 A1 | 1/2017 | Glover et al. | | |
| 2017/0083209 A1* | 3/2017 | Cranfill | | G06F 3/04817 |
| 2017/0111209 A1 | 4/2017 | Ward et al. | | |
| 2018/0121082 A1 | 5/2018 | Zhu et al. | | |
| 2018/0307390 A1* | 10/2018 | Fang | | G06F 9/44 |

FOREIGN PATENT DOCUMENTS

| | | |
|---|---|---|
| CN | 103809845 A | 5/2014 |
| CN | 103838628 A | 6/2014 |
| CN | 103885992 A | 6/2014 |
| CN | 104881223 A | 9/2015 |
| CN | 104881266 A | 9/2015 |
| CN | 104993993 A | 10/2015 |
| CN | 105487742 A | 4/2016 |
| CN | 105808095 A | 7/2016 |
| CN | 106201276 A | 12/2016 |
| CN | 106325749 A | 1/2017 |
| CN | 106484283 A | 3/2017 |
| CN | 106537319 A | 3/2017 |
| CN | 106789527 A | 5/2017 |
| CN | 107153537 A | 9/2017 |
| EP | 3316112 A1 | 5/2018 |
| WO | 2016110202 A1 | 7/2016 |

OTHER PUBLICATIONS

Guo Dugang, et al., "Particle Filter Based on Multi-window," 2nd International Conference on Computer Science and Network Technology, 2012, 4 pages.

Wang Youqian, "Research on the Application of Embedded System on LED Large Screen Asynchronous Controller," Jan. 2017, with an English Abstract, 71 pages.

* cited by examiner

MULTI-WINDOW DISPLAY INTERFACE WITH HISTORICAL TASK BAR

CROSS-REFERENCE TO RELATED APPLICATIONS

This disclosure is a National Stage of International Patent Application No. PCT/CN2017/108818, filed on Oct. 31, 2017, which is hereby incorporated by reference in its entirety.

TECHNICAL FIELD

This application relates to the field of communications technologies, and in particular, to a method for terminal display, and a terminal.

BACKGROUND

With rapid development of electronic technologies, increasing varieties of application programs are available on smartphones, users are using various application programs increasingly frequently, and there are often a plurality of application programs active in a same time period. However, most smartphones use a single-task and single-window display mode, that is, a screen can display only one full-screen window at a time. Therefore, a user needs to switch back and forth between these application programs, suffering from cumbersome operations and poor user experience.

SUMMARY

This application provides a method for terminal display, enabling a terminal to display a plurality of interfaces simultaneously, thereby simplifying user operations and improving user experience.

According to a first aspect, this application provides a method for terminal display. The method specifically includes: displaying, by the terminal, a first interface, where the first interface displayed on the terminal includes a first application option and a second application option, where the first application option corresponds to a first application, and the second application option corresponds to a second application; receiving, by the terminal, an operation on the first application option and the second application option performed by a user on the first interface displayed on the terminal; and displaying, by the terminal, a second interface in response to the operation on the first interface displayed on the terminal, where the second interface displayed on the terminal includes a first interface of the first application and a first interface of the second application, where the first interface of the first application displays content of the first application, and the first interface of the second application displays content of the second application. Therefore, a display screen can display the first interface of the first application and the first interface of the second application simultaneously, simplifying user operations, increasing user efficiency, and improving user experience.

The first interface may be, for example, an interface including a drop-down menu of a status bar, an interface including a historical task bar, or an interface including a plurality of application icons. This embodiment of this application does not limit the first interface. Therefore, the user can manage a plurality of application interfaces easily, simplifying user operations, increasing user efficiency, and improving user experience.

It should be noted that, the first interface may be a terminal interface in a screen unlocked state, or may be a terminal interface in a screen off or screen locked state, simplifying user operations, increasing user efficiency, and improving user experience.

The first application and the second application may be identical or different applications. In this way, the terminal can display different interfaces of different applications simultaneously, and can also display different interfaces of one application, thereby improving user experience.

The operation on the first application option and the second application option performed by the user on the first interface may be, for example, an operation of selecting a check box corresponding to the first application option and a check box corresponding to the second application option, or tapping a corresponding button, or dragging the first application option or the second application option to a specific area. The operation on the first application option and the second application option performed by the user on the first interface is not limited in this application. Therefore, an implementation for operating the first application option and the second application option is provided to simplify user operations, increase user efficiency, and improve user experience.

The second interface is a multi-window display interface, in other words, the display screen of the terminal displays a plurality of windows at a same time. One of the windows is used to display the first interface of the first application, and another window is used to display a second interface of the second application. For example, the terminal divides the display screen into an upper window and a lower window, to display the first interface of the first application and the first interface of the second application respectively. For example, on the second interface, a window is displayed over another window. Alternatively, the terminal may divide the display screen into a left window and a right window. For an arrangement manner thereof, refer to an arrangement manner of the upper window and the lower window. Specifically, the arrangement manner may be alternatively selected automatically based on whether the terminal is currently in a portrait mode or a landscape mode, or the user may be prompted to manually select a specific arrangement manner. It should be noted that areas occupied by the two windows on the display screen may be equal or not equal, or sizes of the two windows may be adjusted by the user. Therefore, several specific manners for displaying two windows simultaneously by the terminal are provided to improve user experience.

In this application, the terminal may arrange, according to a rule, interface content displayed in each window on the second interface. For example, the terminal may display interfaces corresponding to applications in the windows in ascending or descending order of use frequencies, or may display an interface corresponding to a more frequently used application in a window occupying a larger area or in a window over another window based on an order in which the user selects each interface. Alternatively, the terminal may display interfaces in windows in a sequence in which the user selects the interfaces. Interface content specifically displayed in each window of a multi-window interface is not limited in this embodiment of this application.

It should also be noted that, a quantity of windows displayed on the multi-window display interface and a specific arrangement manner of each window are not limited in this embodiment of this application. Therefore, the terminal can display a plurality of windows simultaneously, thereby improving user experience.

For example, if three windows need to be displayed on the second interface, the terminal may arrange the three windows in the following manners. For example, the display screen of the terminal is divided into an upper part and a lower part. The upper part displays two windows, and the lower part displays one window. Alternatively, the upper part displays one window, and the lower part displays two windows. Alternatively, the upper part of the display screen of the terminal displays one window, the lower part displays one window, and over these two windows displays one window. Alternatively, the display screen of the terminal is divided into three parts. Alternatively, the display screen of the terminal may be divided into a left part and a right part. For an arrangement manner thereof, refer to an arrangement manner of the upper part and the lower part. Details are not described herein. It should be noted that areas occupied by the three windows may be equal or not equal. Alternatively, areas of two of the three windows are equal, and an area occupied by another window is greater or less than an area occupied by each of the two windows. Alternatively, sizes of the plurality of windows may be adjusted by the user. Therefore, several specific manners for displaying three windows simultaneously by the terminal are provided to improve user experience.

It can be learned that, in this application, sizes of a plurality of interfaces are rearranged, enabling the display screen of the terminal to display the plurality of interfaces simultaneously. The plurality of interfaces may be interfaces of different applications, or different interfaces of one application, or a combination thereof, thereby simplifying user operations, increasing user efficiency, and improving user experience.

In a possible design method, the method further includes: receiving, by the terminal, a first operation of the user; displaying, by the terminal, a second interface of the first application in response to the first operation; receiving, by the terminal, a second operation of the user; displaying, by the terminal, the first interface of the first application in response to the second operation, where the first interface of the first application is smaller than the second interface of the first application; receiving, by the terminal, a third operation of the user; displaying, by the terminal, a second interface of the second application in response to the third operation; receiving, by the terminal, a fourth operation of the user; and displaying, by the terminal, the first interface of the second application in response to the fourth operation, where the first interface of the second application is smaller than the second interface of the second application. Therefore, a quick manner for shrinking an interface is provided to simplify user operations, increase user efficiency, and improve user experience.

The first operation is used to display a full-screen interface of the first interface of the first application, that is, the second interface of the first application. If the second interface of the first application is a main interface of the first application, the first operation may be, for example, an operation of tapping an application icon of the first application to start the first application. If the second interface of the first application is another interface of the first application, the first operation includes an operation of continuing to operate the first application by the user, until the terminal displays the second interface of the first application. Therefore, a specific operation manner for opening a full-screen interface is provided to simplify user operations, increase user efficiency, and improve user experience.

The second operation is used to shrink the second interface of the first application. The second operation may be, for example, sliding inwards from a location of any one of four included angles of the display screen, tapping a switching button, selecting a switching option, or the like. Therefore, a specific operation manner for shrinking an interface is provided to simplify user operations, increase user efficiency, and improve user experience.

The second interface of the first application may also be referred to the first interface of the first application in a free-window mode, and the second operation may be an operation of switching the second interface of the first application to the free-window mode.

A size of the first interface of the first application is adjustable. Specifically, the terminal detects an adjustment operation performed by the user on a frame of a window in which the first interface of the first application is located, and the adjustment operation may be, for example, dragging the frame of the window. In response to the detected adjustment operation of the user on the frame of the free window, the terminal displays a window in a size different from that before the terminal detects the adjustment operation of the user on the frame of the free window. Alternatively, the adjustment operation may be an operation of dragging the window in which the first interface of the first application is located. In response to a detected another adjustment operation of the user on the frame of the window, the terminal displays a window at a location different from that before the terminal detects the adjustment operation of the user on the frame of the window. Therefore, an interface in the free-window mode is provided to simplify user operations, increase user efficiency, and improve user experience.

Optionally, after the terminal determines to shrink the first interface of the first application, a task management system sends information about the first interface of the first application to a notification management system, in other words, a first candidate interface in the free-window mode is not managed by the task management system any more but managed by the notification management system. Therefore, the notification management system displays, in a drop-down menu of a status bar, interface information of the first candidate interface in the free-window mode, enabling the user to manage the first candidate interface in the free-window mode easily by using the drop-down menu of the status bar. However, the task management system displays, in a historical task bar, interface information corresponding to an interface in a full-screen mode, enabling the user to manage the interface in the full-screen mode easily by using the historical task bar. In this way, according to this embodiment of this application, the user can manage application interfaces in different modes and different states separately, thereby improving user experience.

The third operation is used to display a full-screen interface of the first interface of the second application, that is, the second interface of the second application. For the third operation, refer to the descriptions about the first operation. Details are not described herein.

For the second interface of the second application, refer to the descriptions about the second interface of the first application. Details are not described herein.

The fourth operation is used to shrink the second interface of the second application, that is, to display the first interface of the second application. For details, refer to the second operation. Details are not described herein.

Therefore, the terminal determines that the first interface of the first application corresponds to the first application option, that the first interface of the second application corresponds to the second application option, and that the first application option and the second application option are displayed on the first interface.

In a possible design method, before the receiving, by the terminal, a first operation of the user, the method further includes: receiving, by the terminal, a fifth operation of the user; and displaying, by the terminal, a third interface in response to the fifth operation, where the third interface does not include the first application option and the second application option.

The fifth operation may be, for example, an operation of displaying the drop-down menu of the status bar, or sliding downwards from the top of the display screen on any interface displayed on the display screen, or selecting an option in the drop-down menu of the status bar. This is not limited in this application. Therefore, a specific operation manner for opening and displaying the drop-down menu of the status bar is provided to simplify user operations, increase user efficiency, and improve user experience.

The third interface is an interface including the drop-down menu of the status bar. Before the terminal determines the first application option and the second application option, the third interface does not display the first application option and the second application option.

In a possible design, after the displaying, by the terminal, the first interface of the first application, the method further includes: receiving, by the terminal, a sixth operation of the user; and displaying, by the terminal, the second interface of the first application in response to the sixth operation. The sixth operation is used to display the first interface of the first application in the full-screen mode, that is, the second interface of the first application. The sixth operation may be, for example, tapping a full screen button or selecting a full screen option on the first interface of the first application. This is not limited in this application. It can be learned that, according to this embodiment of this application, an interface can be quickly switched from the full-screen mode to the free-window mode, and can also be quickly switched from the free-window mode back to the full-screen mode, thereby simplifying user operations, increasing user efficiency, and helping improve user experience.

In a possible design method, the method further includes: receiving, by the terminal, a seventh operation of the user; displaying, by the terminal, a first interface of a third application in response to the seventh operation; receiving, by the terminal, an eighth operation of the user; and displaying, by the terminal, prompt information in response to the eighth operation. The seventh operation is used to instruct the terminal to display the first interface of the third application. For details, refer to the descriptions about the first operation. Details are not described herein.

Specifically, considering that some application interfaces include too much or too important content to switch to the free-window mode, or that the user does not want the application interfaces to switch to the free-window mode, the user may disable these application interfaces from switching to the free-window mode. In this case, after a control system determines that a switching operation is detected, the task management system also needs to determine whether the first interface of the third application can be switched to the free-window mode. If the first interface of the third application can be switched to the free-window mode, a window management system re-arranges the first interface of the third application, and switches the first interface of the third application to the free-window mode. Otherwise, prompt information is displayed to inform the user that the free-window mode is not supported for the first interface of the third application. In this way, various needs of the user can be met, thereby improving user experience.

In a possible design, the method further includes: receiving, by the terminal, a ninth operation of the user; displaying, by the terminal, a fourth interface in response to the ninth operation, where the fourth interface includes of a third interface of the first application and a third interface of the second application; detecting, by the terminal, a tenth operation of the user performed on the fourth interface; and displaying, by the terminal, the second interface in response to the tenth operation.

The ninth operation may be, for example, displaying the historical task bar, and the fourth interface may be an interface including the historical task bar. A task box, in which the third interface of the first application and the third interface of the second application are located, corresponds to the second interface. The tenth operation may be, for example, tapping the task box in which the third interface of the first application and the third interface of the second application are located. The terminal displays the second interface in response to the tenth operation, where the second interface is a multi-window display interface including the first interface of the first application and the second interface of the second application. In this way, the user can quickly switch from the historical task bar to the multi-window display interface, thereby simplifying user operations and improving user experience.

In a possible design method, after the displaying, by the terminal, a fourth interface, the method further includes: detecting, by the terminal, an eleventh operation of the user; displaying, by the terminal, the second interface of the first application in response to the eleventh operation; detecting, by the terminal, a twelfth operation of the user; and displaying, by the terminal, the second interface of the second application in response to the twelfth operation.

The eleventh operation may be, for example, tapping a full screen button on the third interface of the first application, selecting a full screen option, or the like. The terminal displays the second interface of the first application in response to the eleventh operation, where the second interface of the first application is a full-screen interface. In this way, the user can quickly switch from a multi-window display interface to the full-screen interface, thereby simplifying user operations and improving user experience.

The twelfth operation may be, for example, tapping a full screen button on the third interface of the second application, selecting a full screen option, or the like. The terminal displays the second interface of the second application in response to the twelfth operation, where the second interface of the second application is a full-screen interface. In this way, the user can quickly switch from the multi-window display interface to the full-screen interface, thereby simplifying user operations and improving user experience.

In an application scenario, the user is reading news or a subscribed article by using an application "WeChat". At this time, if a chat message is received, the user needs to exit the news or the subscribed article, and return to a main interface of "WeChat" to view the unread message. However, after viewing the message, if the user wants to continue reading the previously read news or subscribed article, the user needs to open the article again, and slide to a position of last view to continue reading. However, if the method for terminal display provided in this application is used, the terminal can display an interface of the news or the subscribed article being read in one window, and display a chat interface of "WeChat" in another one or more windows, thereby improving user experience.

Further, after displaying a combined multi-window display interface, the terminal may continue to display one or more multi-window display interfaces according to the foregoing method in response to an operation of the user. A quantity of combined multi-window display interfaces is not limited in this application. In this way, the user can quickly switch from the historical task bar to a plurality of multi-window display interfaces, thereby simplifying user operations and improving user experience.

According to a second aspect, this application provides a terminal, including: a display unit, configured to display a first interface, where the first interface displayed on the terminal includes a first application option and a second application option, where the first application option corresponds to a first application, and the second application option corresponds to a second application; and an input unit, configured to receive an operation on the first application option and the second application option performed by a user on the first interface displayed on the terminal.

The display unit is further configured to display a second interface in response to the operation on the first interface displayed on the terminal, where the second interface displayed on the terminal includes a first interface of the first application and a first interface of the second application, where the first interface of the first application displays content of the first application, and the first interface of the second application displays content of the second application.

In a possible design method, the input unit is further configured to receive a first operation of the user; the display unit is further configured to display a second interface of the first application in response to the first operation; the input unit is further configured to receive a second operation of the user; the display unit is further configured to display the first interface of the first application in response to the second operation, where the first interface of the first application is smaller than the second interface of the first application; the input unit is further configured to receive a third operation of the user; the display unit is further configured to display a second interface of the second application in response to the third operation; the input unit is further configured to receive a fourth operation of the user; and the display unit is further configured to display the first interface of the second application in response to the fourth operation, where the first interface of the second application is smaller than the second interface of the second application.

In a possible design method, the input unit is further configured to receive a fifth operation of the user; and the display unit is further configured to display a third interface in response to the fifth operation, where the third interface does not include the first application option and the second application option.

In a possible design method, the second application is an identical application, or the first application and the second application are different applications.

In a possible design method, the input unit is further configured to receive a sixth operation of the user; and the display unit is further configured to display the second interface of the first application in response to the sixth operation.

In a possible design method, the input unit is further configured to receive a seventh operation of the user; the display unit is further configured to display a first interface of a third application in response to the seventh operation; the input unit is further configured to receive an eighth operation of the user; and the display unit is further configured to display prompt information in response to the eighth operation.

In a possible design method, the terminal further includes a detection unit; the input unit is further configured to receive a ninth operation of the user; the display unit is further configured to display a fourth interface in response to the ninth operation, where the fourth interface includes a third interface of the first application and a third interface of the second application; the detection unit is configured to detect a tenth operation of the user performed on the fourth interface; and the display unit is further configured to display the second interface in response to the tenth operation.

In a possible design method, the detection unit is further configured to detect an eleventh operation of the user; the display unit is further configured to display the second interface of the first application in response to the eleventh operation; the detection unit is further configured to detect a twelfth operation of the user; and the display unit is further configured to display the second interface of the second application in response to the twelfth operation.

In a possible design method, the first interface is an interface including a drop-down menu of a status bar.

According to a third aspect, this application provides a terminal, including a processor, a memory, and a touchscreen, where the memory and the touchscreen are coupled to the processor; the memory is configured to store computer program code, where the computer program code includes a computer instruction; and when the processor executes the computer instruction, the terminal performs the following operations: the touchscreen is configured to display a first interface, where the first interface displayed on a terminal includes a first application option and a second application option, where the first application option corresponds to a first application, and the second application option corresponds to a second application; and the processor is configured to receive an operation on the first application option and the second application option performed by a user on the first interface displayed on the touchscreen.

The touchscreen is further configured to display a second interface in response to the operation on the first interface displayed on the touchscreen, where the second interface displayed on the touchscreen includes a first interface of the first application and a first interface of the second application, where the first interface of the first application displays content of the first application, and the first interface of the second application displays content of the second application.

In a possible design method, the processor is further configured to receive a first operation of the user; the touchscreen is further configured to display a second interface of the first application in response to the first operation; the processor is further configured to receive a second operation of the user; the touchscreen is further configured to display the first interface of the first application in response to the second operation, where the first interface of the first application is smaller than the second interface of the first application; the processor is further configured to receive a third operation of the user; the touchscreen is further configured to display a second interface of the second application in response to the third operation; the processor is further configured to receive a fourth operation of the user; and the touchscreen is further configured to display the first interface of the second application in response to the fourth operation, where the first interface of the second application is smaller than the second interface of the second application.

In a possible design method, the processor is further configured to receive a fifth operation of the user; and the touchscreen is further configured to display a third interface in response to the fifth operation, where the third interface does not include the first application option and the second application option.

In a possible design method, the second application is an identical application, or the first application and the second application are different applications.

In a possible design method, the processor is further configured to receive a sixth operation of the user; and the touchscreen is further configured to display the second interface of the first application in response to the sixth operation.

In a possible design method, the processor is further configured to receive a seventh operation of the user; the touchscreen is further configured to display the first interface of a third application in response to the seventh operation; the processor is further configured to receive an eighth operation of the user; and the touchscreen is further configured to display prompt information in response to the eighth operation.

In a possible design method, the processor is further configured to receive a ninth operation of the user; the touchscreen is further configured to display a fourth interface in response to the ninth operation, where the fourth interface includes a third interface of the first application and a third interface of the second application; the processor is configured to detect a tenth operation of the user performed on the fourth interface; and the touchscreen is further configured to display the second interface in response to the tenth operation.

In a possible design method, the processor is further configured to detect an eleventh operation of the user; the touchscreen is further configured to display the second interface of the first application in response to the eleventh operation; the processor is further configured to detect a twelfth operation of the user; and the touchscreen is further configured to display the second interface of the second application in response to the twelfth operation.

In a possible design method, the first interface is an interface including a drop-down menu of a status bar.

According to a fourth aspect, this application provides a graphical user interface (Graphical User Interface, GUI), where the graphical user interface is stored in a terminal, the terminal includes a touchscreen, a memory, and a processor, and the processor is configured to execute one or more computer programs stored in the memory. The graphical user interface includes: displaying a first interface on the touchscreen, where the first interface includes a first application option and a second application option, where the first application option corresponds to a first application, and the second application option corresponds to a second application; and displaying a second interface in response to an operation on the first application option and the second application option performed by a user on the first interface displayed on the terminal, where the second interface displayed on the terminal includes a first interface of the first application and a first interface of the second application, where the first interface of the first application displays content of the first application, and the first interface of the second application displays content of the second application.

In a possible design method, the graphical user interface displays a second interface of the first application in response to a first operation of the user; displays the first interface of the first application in response to a second operation of the user; displays a second interface of the second application in response to a third operation of the user; and displays the first interface of the second application in response to a fourth operation of the user, where the first interface of the second application is smaller than the second interface of the second application.

In a possible design, the graphical user interface displays a third interface in response to a fifth operation of the user, where the third interface does not include the first application option and the second application option.

According to a fifth aspect, this application provides a computer storage medium, where the computer storage medium includes a computer instruction, and when the computer instruction is run on a terminal, the terminal is enabled to perform the method for terminal display in any one of the first aspect, the second aspect, the third aspect, or the possible design methods.

According to a sixth aspect, this application provides a computer program product. When the computer program product is run on a computer, the computer is enabled to perform the method for terminal display in any one of the first aspect, the second aspect, the third aspect, or the possible design methods.

It should be understood that, the foregoing terminal provided in the second aspect, the third aspect, and the possible design methods, the GUI in the fourth aspect, the computer storage medium in the fifth aspect, and the computer program product in the sixth aspect are all used to perform the corresponding methods provided above. Therefore, for beneficial effects that can be achieved, refer to beneficial effects in the corresponding methods provided above. Details are not described herein.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the present invention, unless otherwise stated, "a plurality" means two or more than two.

With rapid development of smartphones, a user can start a plurality of applications simultaneously on a smartphone. However, in many cases, the user needs to view interfaces of a plurality of applications or a plurality of interfaces of one application on a display screen of the smartphone. For example, the user may be chatting on WeChat while writing an email. If the display screen of the smartphone can display only one window at a time, the user needs to switch back and forth between these two applications "WeChat" and "Email", which affects user experience. For another example, the user may be simultaneously chatting with a plurality of persons on WeChat, and needs to open a plurality of chat windows of WeChat. If the plurality of chat windows can be displayed simultaneously on the display screen, operations of the user are simplified, efficiency of the user is increased, and user experience is improved.

This application provides a method for terminal display. A user may freely select a plurality of applications, a plurality of interfaces of one application, or a combination of a plurality of applications and a plurality of interfaces of one application to combine into one display interface, to display a plurality of windows on a display screen simultaneously, where a size of each window may be adjusted freely based on a need of the user.

Figure 1A:
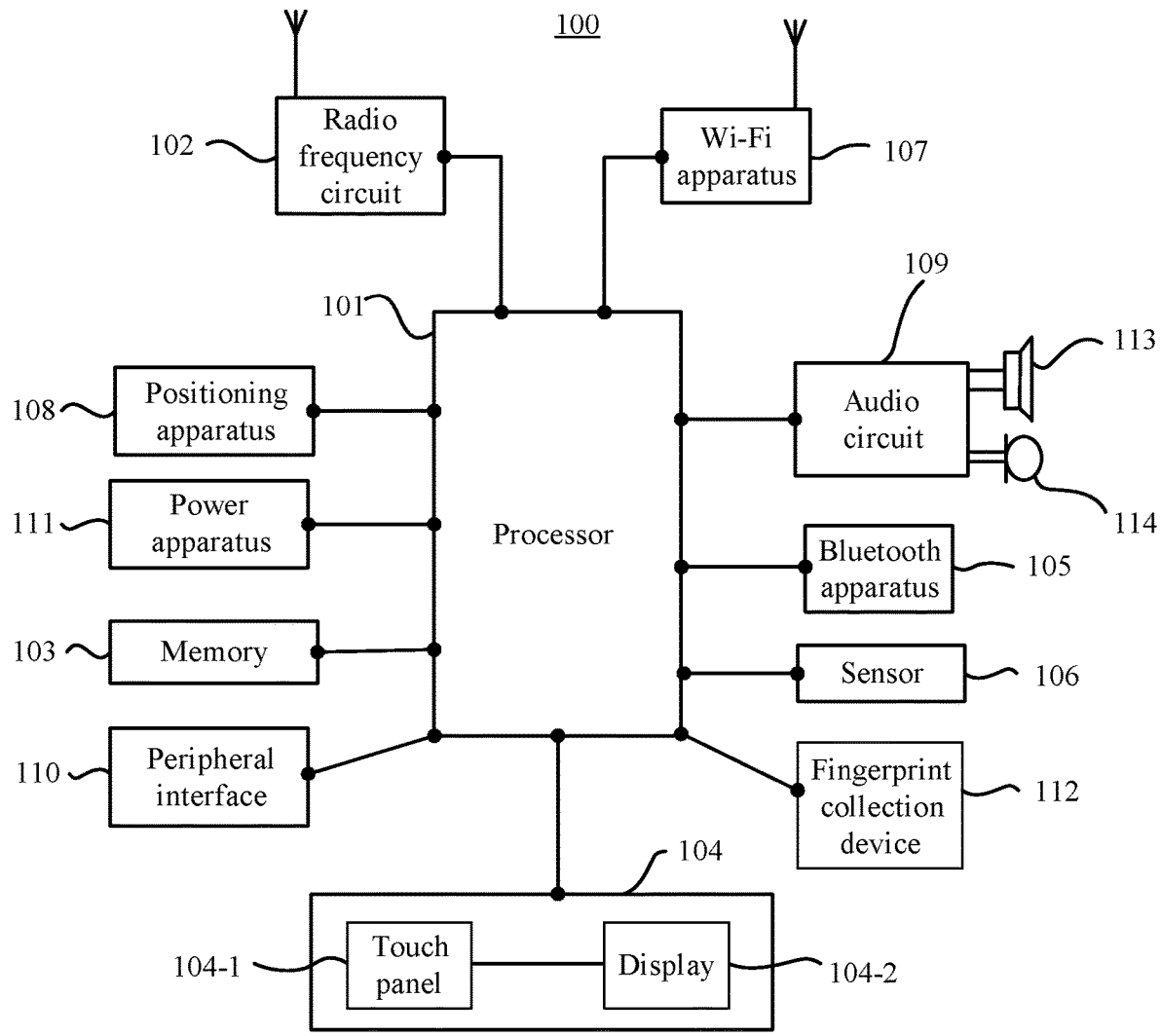
FIG. 1A is a schematic diagram of a hardware structure of a terminal.

A multi-window display method provided in this application may be performed by a display apparatus of a terminal, and the display apparatus may be a mobile phone 100 shown in FIG. 1A. Alternatively, the display apparatus of a terminal interface may be a central processing unit (CPU) or a control module in the terminal used to perform the multi-window display method of the terminal.

For example, the terminal in this application may be a device on which an application program may be installed and an icon of the application program may be displayed, such as a mobile phone (for example, the mobile phone 100 shown in FIG. 1A), a tablet computer, a personal computer (PC), a personal digital assistant (PDA), a smartwatch, a netbook, a wearable electronic device, an augmented reality (AR) device, or a virtual reality (VR) device. This disclosure imposes no special limitations on a specific form of the terminal.

As shown in FIG. 1A, the mobile phone 100 is used as an example of the foregoing terminal. The mobile phone 100 may specifically include components such as a processor 101, a radio frequency (RF) circuit 102, a memory 103, a touchscreen 104, a BLUETOOTH apparatus 105, one or more sensors 106, a wireless fidelity (WiFi) apparatus 107, a positioning apparatus 108, an audio circuit 109, a peripheral interface 110, and a power apparatus 111. These components may communicate over one or more communications buses or signal lines (not shown in FIG. 1A). A person skilled in the art may understand that, a hardware structure shown in FIG. 1A does not constitute a limitation to the mobile phone, and the mobile phone 100 may include more or fewer components than those shown in FIG. 1A, or may combine some components, or may have different component arrangements.

The following specifically describes each component of the mobile phone 100 with reference to FIG. 1A.

The processor 101 is a control center of the mobile phone 100, connects to various components of the mobile phone 100 by using various interfaces and lines, and performs various functions and data processing of the mobile phone 100 by running or executing an application program stored in the memory 103 and calling data stored in the memory 103. In some embodiments, the processor 101 may include one or more processing units. For example, the processor 101 may be a Kirin 960 chip made by Huawei Technologies. In some embodiments of this application, the foregoing processor 101 may further include a fingerprint verification chip used to verify a collected fingerprint.

The radio frequency circuit 102 may be configured to receive and send wireless signals during a call or information reception or sending. In particular, after receiving downlink data from a base station, the radio frequency circuit 102 may send the data to the processor 101 for processing, and in addition, send related uplink data to the base station. Generally, the radio frequency circuit includes but is not limited to an antenna, at least one amplifier, a transceiver, a coupler, a low noise amplifier, a duplexer, and the like. In addition, the radio frequency circuit 102 may also communicate with another device through wireless communication. The wireless communication may use any communication standard or protocol, including but not limited to Global System for Mobile Communications, General Packet Radio Service, Code Division Multiple Access, Wideband Code Division Multiple Access, Long Term Evolution, Email, Short Message Service, and the like.

The memory 103 is configured to store an application program and data, and the processor 101 performs various functions and data processing of the mobile phone 100 by running the application program and the data stored in the memory 103. The memory 103 mainly includes a program storage area and a data storage area. The program storage area may store an operating system, and an application program required by at least one function (such as an audio play function or an image play function). The data storage area may store data (such as audio data and a phone book) created based on use of the mobile phone 100. In addition, the memory 103 may include a high-speed random access memory (Random Access Memory, RAM), and may also include a nonvolatile memory such as a magnetic disk storage device, a flash memory device, or another volatile solid-state storage device. The memory 103 may store various operating systems, such as an iOS® operating system developed by Apple Inc., and an Android® operating system developed by Google Inc. The foregoing memory 103 may exist separately, and is connected to the processor 101 by using the foregoing communications bus. Alternatively, the memory 103 may be integrated with the processor 101.

The touchscreen 104 may specifically include a touch panel 104-1 and a display 104-2.

The touch panel 104-1 may collect a touch event (such as an operation performed by a user on or near the touch panel 104-1 by using any proper object such as a finger or a stylus) performed by the user of the mobile phone 100 on or near the touch panel 104-1, and send collected touch information to another device (for example, the processor 101). The touch event performed by the user near the touch panel 104-1 may be referred to as a floating touch. The floating touch may mean that the user does not need to directly touch the touch panel to select, move, or drag a target (for example, an icon), and the user only needs to stay near the device to perform a desired function. In addition, the touch panel 104-1 may be implemented by using a plurality of types, such as a resistive type, a capacitive type, an infrared type, and a surface acoustic wave type.

The display (also known as a display screen) 104-2 may be configured to display information input by the user, or information provided to the user, and various menus of the mobile phone 100. The display 104-2 may be configured in a form of a liquid crystal display, an organic light-emitting diode, or the like. The touch panel 104-1 may cover the display 104-2. After detecting the touch event on or near the touch panel 104-1, the touch panel 104-1 sends the touch event to the processor 101 to determine a touch event type, and then the processor 101 may provide corresponding visual output on the display 104-2 based on the touch event type. In FIG. 1A, the touch panel 104-1 and the display screen 104-2 are used as two independent components to implement input and output functions of the mobile phone 100. However, in some embodiments, the touch panel 104-1 and the display screen 104-2 may be integrated to implement the input and output functions of the mobile phone 100. It may be understood that the touchscreen 104 is formed by stacking a plurality of layers of materials. In this embodiment of this application, only the touch panel (layer) and the display screen (layer) are shown. Other layers are not described in this embodiment of this application. In addition, the touch panel 104-1 may be configured in a full-panel form on a front surface of the mobile phone 100, and the display screen 104-2 may also be configured in a full-panel form on the front surface of the mobile phone 100, so that a bezel-free structure can be obtained on the front surface of the mobile phone.

In addition, the mobile phone 100 may further have a fingerprint recognition function. For example, a fingerprint reader 112 may be configured on a back surface of the mobile phone 100 (for example, below a rear camera), or a fingerprint reader 112 may be configured on the front surface of the mobile phone 100 (for example, below the touchscreen 104). For another example, a fingerprint collection device 112 may be configured in the touchscreen 104 to implement the fingerprint recognition function. In other words, the fingerprint collection device 112 may be integrated with the touchscreen 104 to implement the fingerprint recognition function of the mobile phone 100. In this case, the fingerprint collection device 112 is configured in the touchscreen 104, and may be a part of the touchscreen 104, or may be configured in the touchscreen 104 in another manner. In this embodiment of this application, a main component of the fingerprint collection device 112 is a fingerprint sensor, and the fingerprint sensor may use any type of sensing technology, including but not limited to an optical type, a capacitive type, a piezoelectric type, or an ultrasonic sensing technology.

The mobile phone 100 may further include the bluetooth apparatus 105 that is configured to realize data exchange between the mobile phone 100 and another device (for example, a mobile phone or a smartwatch) in a short distance. In this embodiment of this application, the bluetooth apparatus may be an integrated circuit, a bluetooth chip, or the like.

The mobile phone 100 may further include at least one sensor 106, such as a light sensor, a motion sensor, or another sensor. Specifically, the light sensor may include an ambient light sensor and a proximity sensor. The ambient light sensor may adjust luminance of the display of the touchscreen 104 based on brightness of ambient light. The proximity sensor may turn off the display when the mobile phone 100 moves to an ear. As one type of motion sensor, an accelerometer sensor may detect an acceleration magnitude in various directions (usually on three axes), may detect a magnitude and a direction of gravity when the mobile phone is in a static state, and may be applied to an application that recognizes a mobile phone posture (such as screen switching between a landscape mode and a portrait mode, a related game, and magnetometer posture calibration), a vibration recognition-related function (such as a pedometer or tapping), and the like. For another sensor that may also be configured in the mobile phone 100, such as a gyroscope, a barometer, a hygrometer, a thermometer, or an infrared sensor, details are not described herein.

The Wi-Fi apparatus 107 is configured to provide the mobile phone 100 with a network access that complies with Wi-Fi related standard protocols. The mobile phone 100 may be connected to a Wi-Fi access point by using the Wi-Fi apparatus 107, to help the user send or receive an email, browse a webpage, access streaming media, and the like. The Wi-Fi apparatus 107 provides the user with wireless broadband Internet access. In some other embodiments, the Wi-Fi apparatus 107 may also function as a Wi-Fi wireless access point to provide Wi-Fi network access for another device.

The positioning apparatus 108 is configured to provide a geographic location for the mobile phone 100. It can be understood that the positioning apparatus 108 may specifically be a receiver of a positioning system such as a global positioning system (Global Positioning System, GPS), a Beidou navigation satellite system, or Russia's GLONASS. After receiving the geographic location sent by the foregoing positioning system, the positioning apparatus 108 sends the information to the processor 101 for processing, or sends the information to the memory 103 for storage. In some other embodiments, the positioning apparatus 108 may be alternatively a receiver of an assisted global positioning system (Assisted Global Positioning System, AGPS). The AGPS system acts as an assistance server to assist the positioning apparatus 108 in performing ranging and positioning services. In this case, the assistance positioning server communicates with a device such as the positioning apparatus 108 (that is, the GPS receiver) of the mobile phone 100 through a wireless communications network to provide positioning assistance. In some other embodiments, the positioning apparatus 108 may alternatively use a positioning technology that is based on a Wi-Fi access point. Each Wi-Fi access point has a globally unique media access control (Media Access Control, MAC) address. When Wi-Fi is enabled on the device, the device can scan and collect broadcast signals from surrounding Wi-Fi access points, to obtain MAC addresses broadcast by the Wi-Fi access points. The device sends, to a location server by using a wireless communications network, data (such as the MAC address) that can indicate the Wi-Fi access points. The location server retrieves geographic locations of the Wi-Fi access points, calculates a geographic location of the device based on strength of Wi-Fi broadcast signals, and sends the geographic location to the positioning apparatus 108 of the device.

The audio circuit 109, a loudspeaker 113, and a microphone 114 may provide an audio interface between the user and the mobile phone 100. The audio circuit 109 may transmit an electrical signal converted from received audio data to the loudspeaker 113, and the loudspeaker 113 converts the electrical signal into an audio signal for outputting. In addition, the microphone 114 converts a collected audio signal into an electrical signal, and the audio circuit 109 receives the electrical signal, converts the electrical signal into audio data, and then outputs the audio data to the RF circuit 102, so that the audio data is sent to, for example, another mobile phone, or the audio data is output to the memory 103 for further processing.

The peripheral interface 110 is configured to provide various interfaces for external input/output devices (such as a keyboard, a mouse, an external display, an external memory, and a subscriber identification module card). For example, the peripheral interface 110 is connected to the mouse through a universal serial bus (Universal Serial Bus, USB) interface, and is connected to a subscriber identification module (Subscriber Identification Module, SIM) card provided by a telecom operator through a metal contact on a card slot of the subscriber identification module. The peripheral interface 110 may be configured to couple the foregoing external input/output peripheral devices to the processor 101 and the memory 103.

In this embodiment of this application, the mobile phone 100 may communicate with another device in a device group through the peripheral interface 110. For example, the mobile phone 100 may receive, through the peripheral interface 110, display data sent by another device for display. This is not limited in this embodiment of this application.

The mobile phone 100 may further include the power apparatus 111 (such as a battery and a power management chip) that supplies power to each component. The battery may be logically connected to the processor 101 by using the power management chip, so as to implement functions such as charge management, discharge management, and power consumption management by using the power apparatus 111.

Although not shown in FIG. 1A, the mobile phone 100 may further include a camera (a front camera and/or the rear camera), a flash, a micro projection apparatus, a near field communication (NFC) apparatus, and the like, and details are not described herein.

The methods in the following embodiments can be all implemented in the mobile phone 100 with the foregoing hardware structure.

Figure 1B:
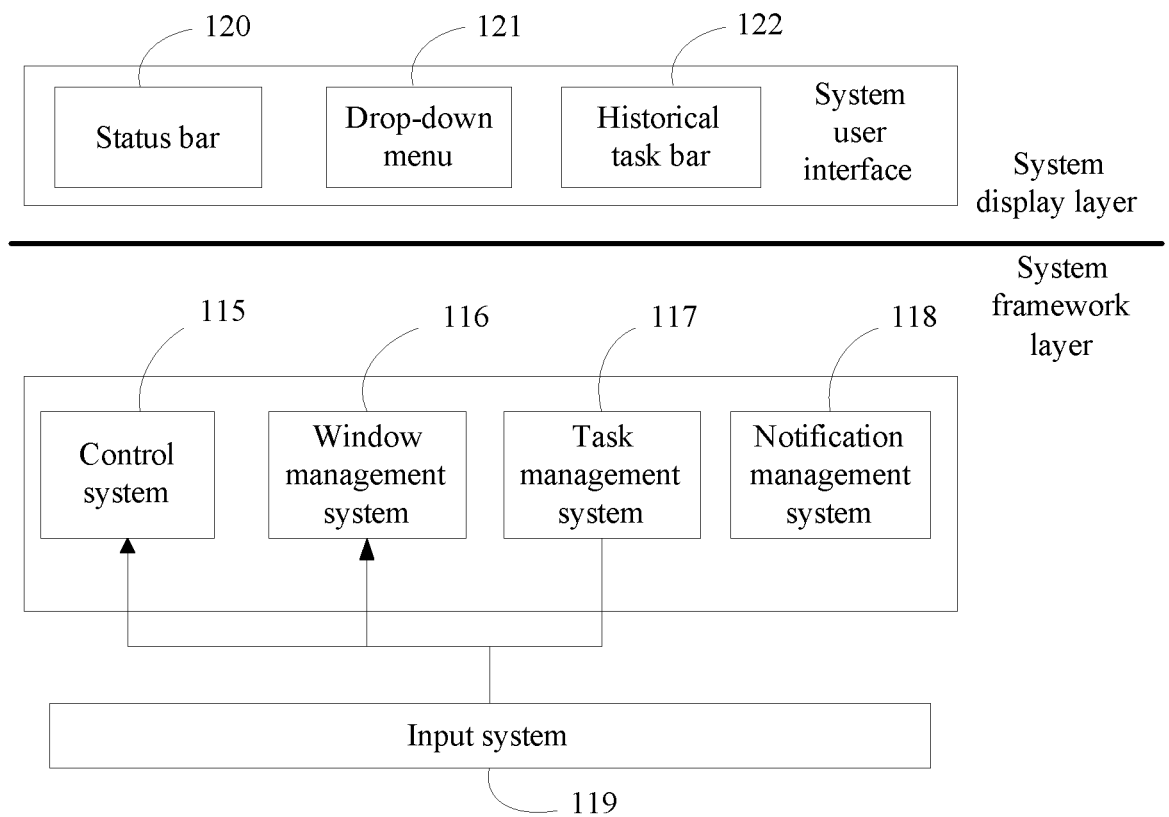
FIG. 1B is a schematic diagram of a hardware structure of a terminal.

For example, as shown in FIG. 1B, an embodiment of this application further provides an architectural diagram of a terminal. The terminal includes a system framework layer and a system display layer. The system framework layer includes a control system 115, a window management system 116, a task management system 117, a notification management system 118, and an input system 119. The system display layer includes a status bar 120, a drop-down menu 121, and a historical task bar 122.

The input system is configured to detect an input event of a user, where the input event of the user includes a tap, a drag, a press, a voice input, an optical input, or an operation in another manner of the user.

The control system 115 is configured to identify an input event type, an input event location, and the like, so that the terminal performs different processing based on different input events.

In this application, for example, the control system 115 may be configured to identify that an operation input by the user is an operation of shrinking a current interface, displaying an interface in a full-screen mode, closing an interface, displaying a drop-down menu of a status bar, or the like.

The window management system 116 is used by the terminal to manage information of a window displayed on a display screen, including a size of the window, a display location of the window, and the like.

In this application, for example, the window management system 116 may modify the size of the window where the current interface is located according to a command input by the user to shrink the current interface, and refresh the display. Alternatively, the window management system 116 adjusts the size of the window, the location of the window on the display screen, and the like according to an adjustment operation on the window performed by the user on the current interface.

The task management system 117 is used by the terminal to manage an application in an active state, including managing the historical task bar 122. The historical task bar 122 is a display interface of the terminal, and displays an active application program in the terminal, or a recently started application program of the user. Such application programs may reside in a background to speed up startup, or may not reside in a background and only enables the user to start the recently started program easily.

In this application, the task management system 117, for example, may manage a full-screen interface, a multi-window display interface, and the like.

In this application, the notification management system 118 is used by the terminal to manage notification messages in the status bar 120 and the drop-down menu 121.

The status bar 120 is before the interface displayed on the terminal, and displays information such as a signal status and a terminal battery power level. In this application, the status bar 120 may also display a notification message generated by each application program on the terminal. The drop-down menu 121 is also a display interface of the terminal, displaying the notification information generated by each application program. In this application, the status bar 120 displays an icon corresponding to an application interface in a free-window mode, and the like. For example, the drop-down menu 121 may display the application interface in the free-window mode, and the like.

FIG. 2A to FIG. 26 show some example user interfaces in a process in which the terminal performs the method for terminal display provided in this application.

Figure 2A:
FIG. 2A and FIG. 2B are a schematic diagram of an example of a terminal interface.
Figure 2B:
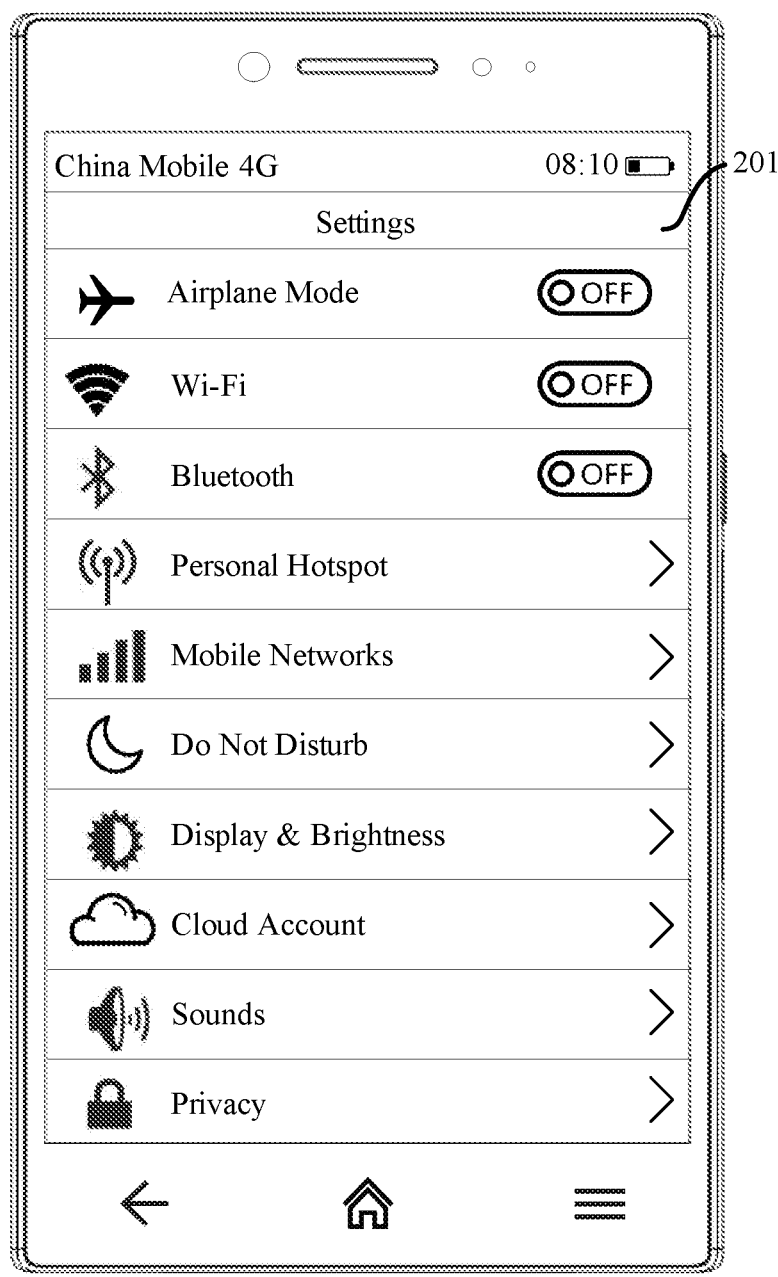

FIG. 2A shows a user interface displayed on the terminal. The user interface displays a plurality of icons of application programs (application icons for short); and the terminal detects a selection operation on an application icon by a user, for example, tapping an application icon "Settings". FIG. 2B shows a user interface displayed by the terminal in response to the detected selection operation of the user. For example, the interface is a main interface of an application "Settings".

Figure 3A:
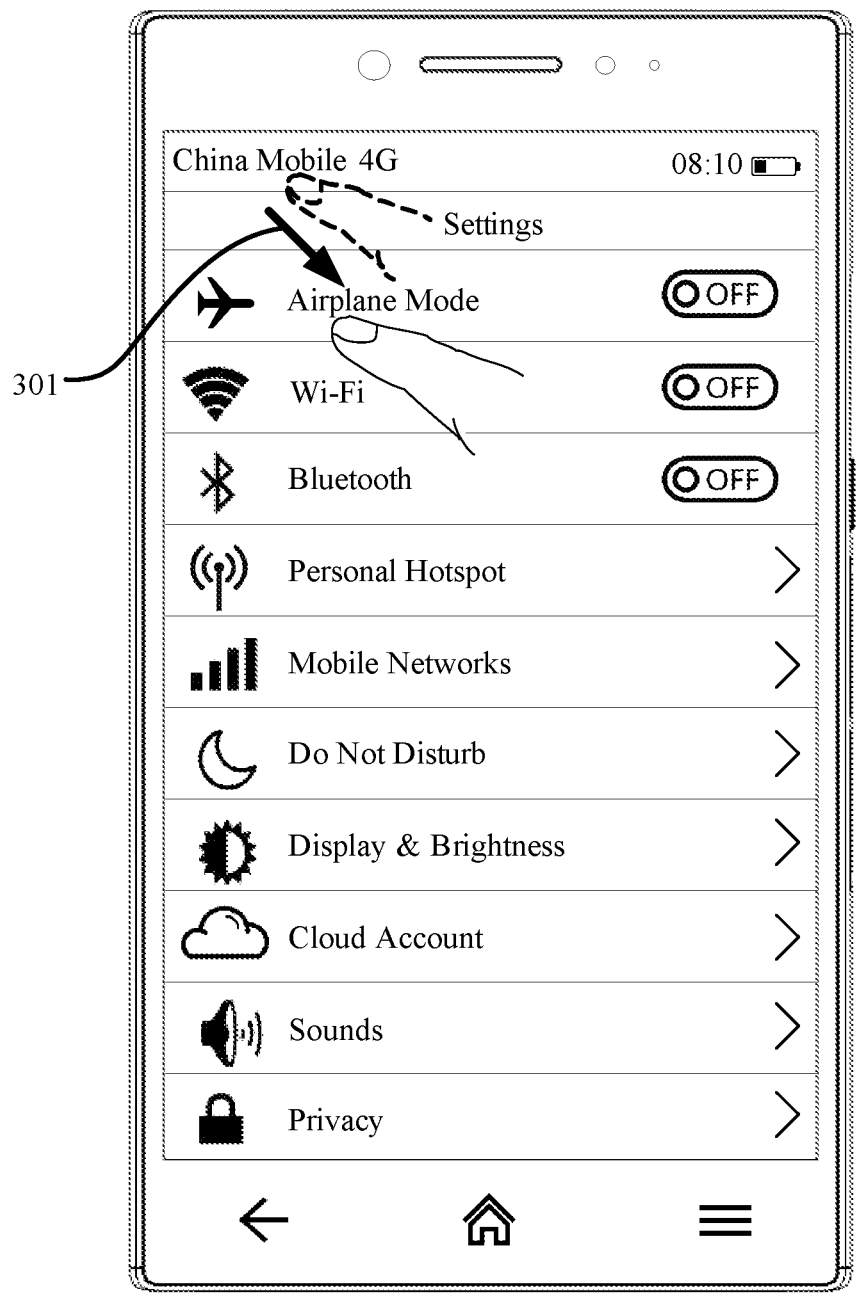
FIG. 3A and FIG. 3B are a schematic diagram of an example of a terminal interface.
Figure 3B:
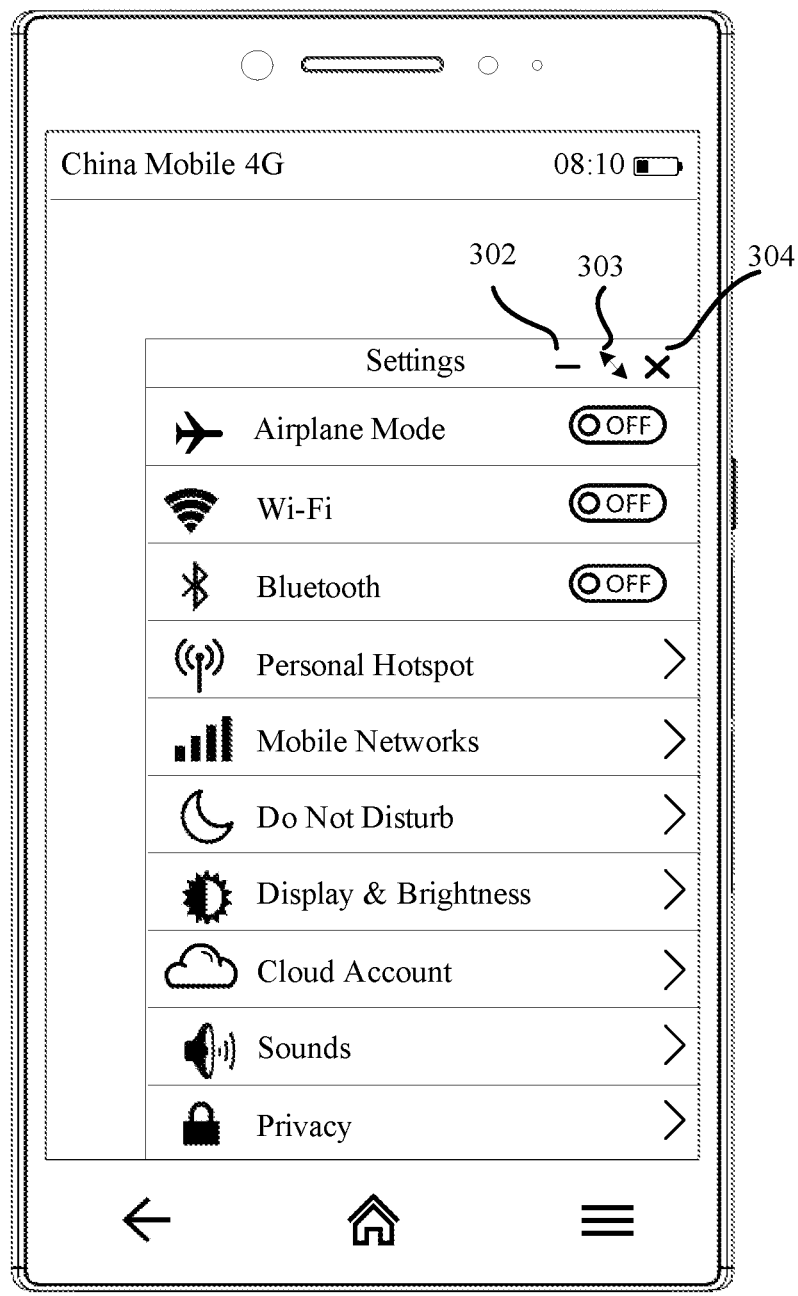

FIG. 3A shows that the terminal detects an operation of shrinking an interface by the user. The operation of shrinking an interface may be, for example, an operation of sliding from the upper left corner towards the lower right on the current user interface by the user. FIG. 3B) shows a user interface displayed by the terminal in response to the operation of shrinking the interface. The user interface includes a free window. In this embodiment of this application, the free window is a non-full-screen display window. Usually, the terminal may adjust a size and a location of the free window in response to an operation of the user. The free window shown in FIG. 3B is used to display the user interface displayed in FIG. 3A. In addition, the free window also includes a minimize button 302, a full screen button 303, and a close button 304.

Figure 4A:
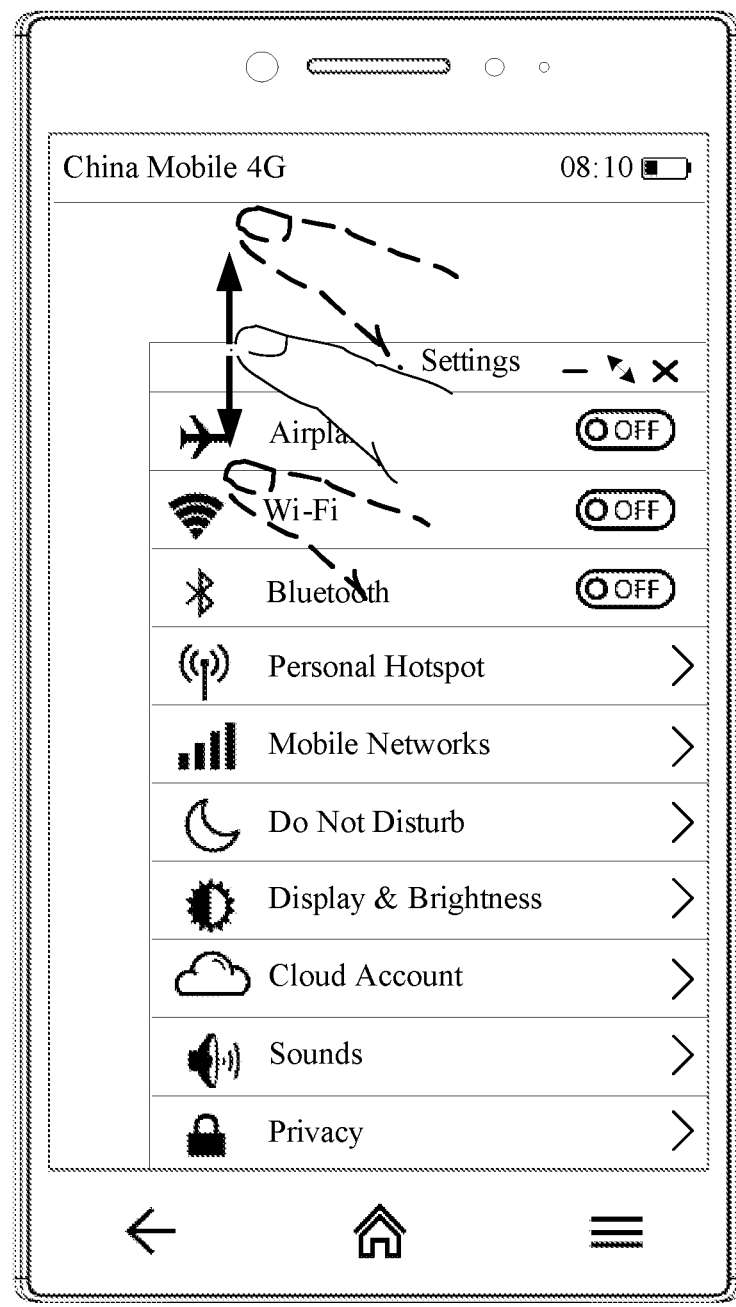
FIG. 4A and FIG. 4B are a schematic diagram of an example of a terminal interface.
Figure 4B:
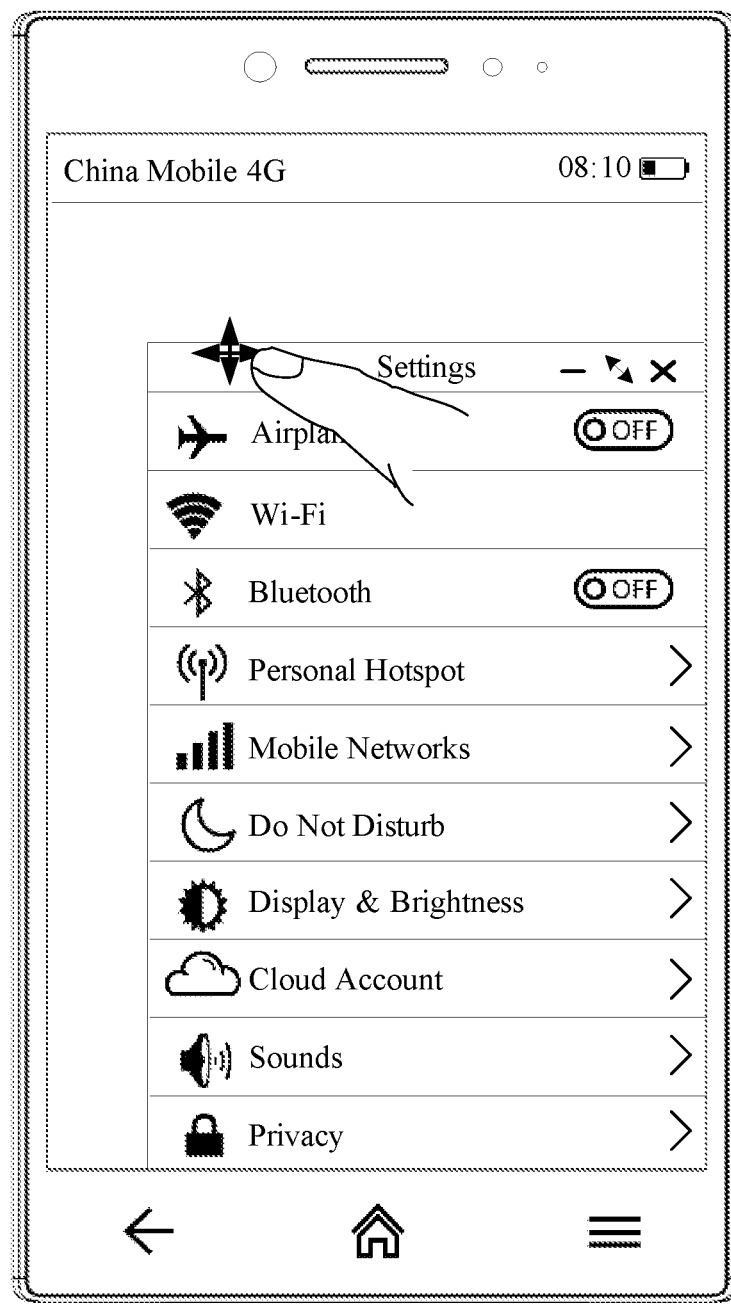

FIG. 4A shows that the terminal detects an adjustment operation of the user on a frame of the free window. The adjustment operation may be, for example, a drag operation on the frame of the free window. In response to the detected adjustment operation of the user on the frame of the free window, the terminal displays the free window in a size different from that before the terminal detects the adjustment operation of the user on the frame of the free window. Alternatively, the adjustment operation may be a drag operation on the free window. FIG. 4B shows that the terminal detects another adjustment operation on the frame of the free window, and displays the free window at a location different from that before the terminal detects the adjustment operation of the user on the frame of the free window.

Figure 5A:
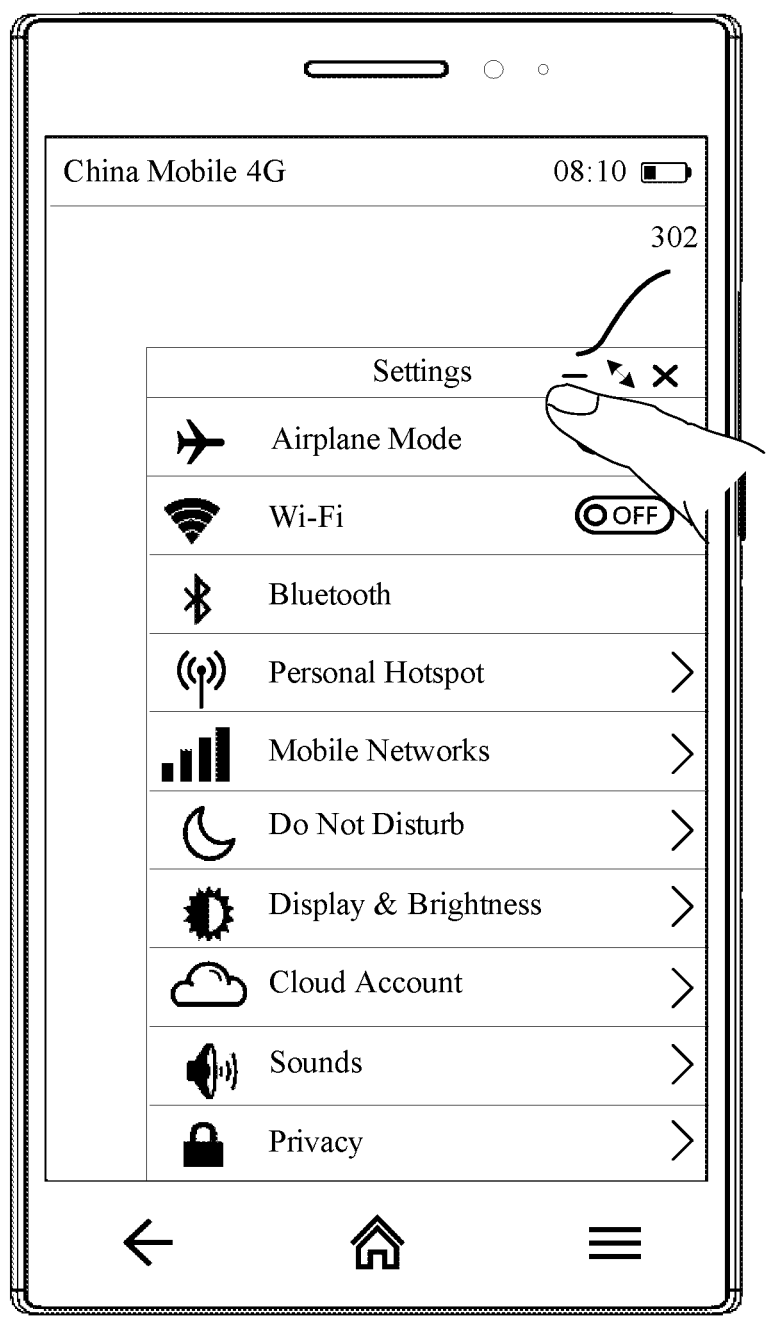
FIG. 5A and FIG. 5B are a schematic diagram of an example of a terminal interface.
Figure 5B:
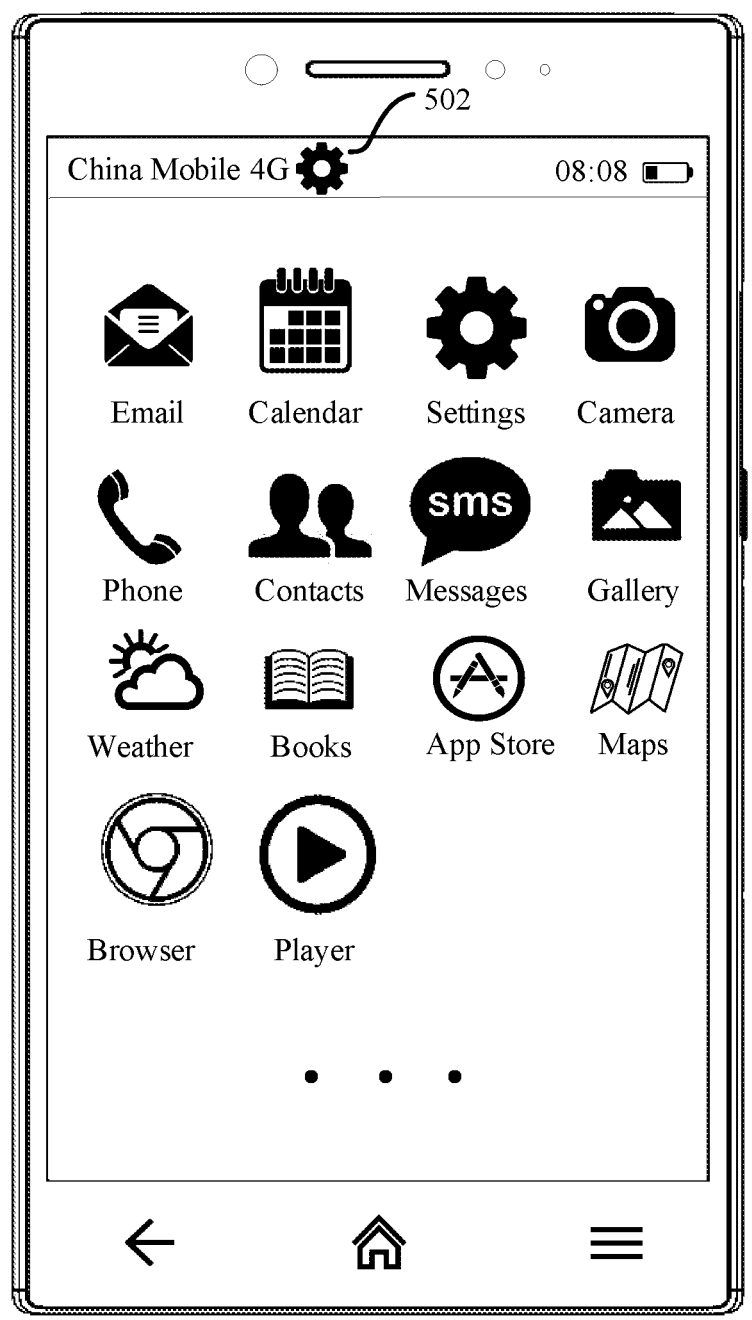

FIG. 5A shows that the terminal detects an operation performed by the user to minimize the free window. The operation of minimizing the free window may be, for example, tapping the minimize button 302. FIG. 5B shows a user interface displayed when the terminal detects the operation performed by the user to minimize the free window. The user interface includes a plurality of application icons, and an application icon corresponding to the minimized free window. The application icon corresponding to the minimized free window is simply referred to as a minimization icon. The minimization icon is displayed at the upper left corner of a status bar. In FIG. 5B the minimized free window is the main interface of the application "Settings".

Figure 6A:
FIG. 6A and FIG. 6B are a schematic diagram of an example of a terminal interface.
Figure 6B:
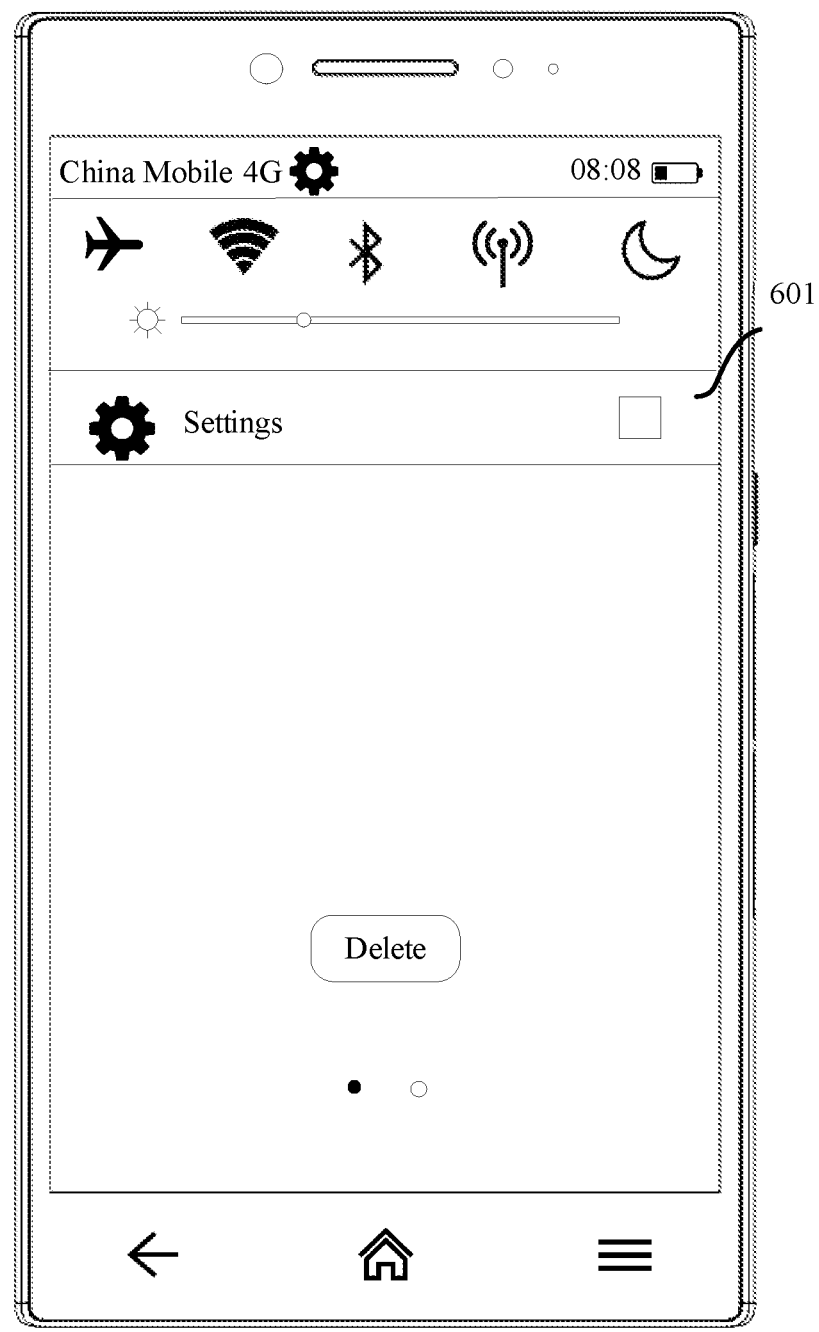

FIG. 6A shows that the terminal detects an operation input by the user for displaying a drop-down menu of the status bar. For example, the operation may be an operation of sliding down from the top of the display screen. FIG. 6B shows a user interface displayed by the terminal in response to the operation input by the user to display the drop-down menu of the status bar. The user interface includes the drop-down menu of the status bar, and the drop-down menu of the status bar includes the application icon corresponding to the minimized free window, and a check box 601 corresponding to the minimized free window.

Figure 7A:
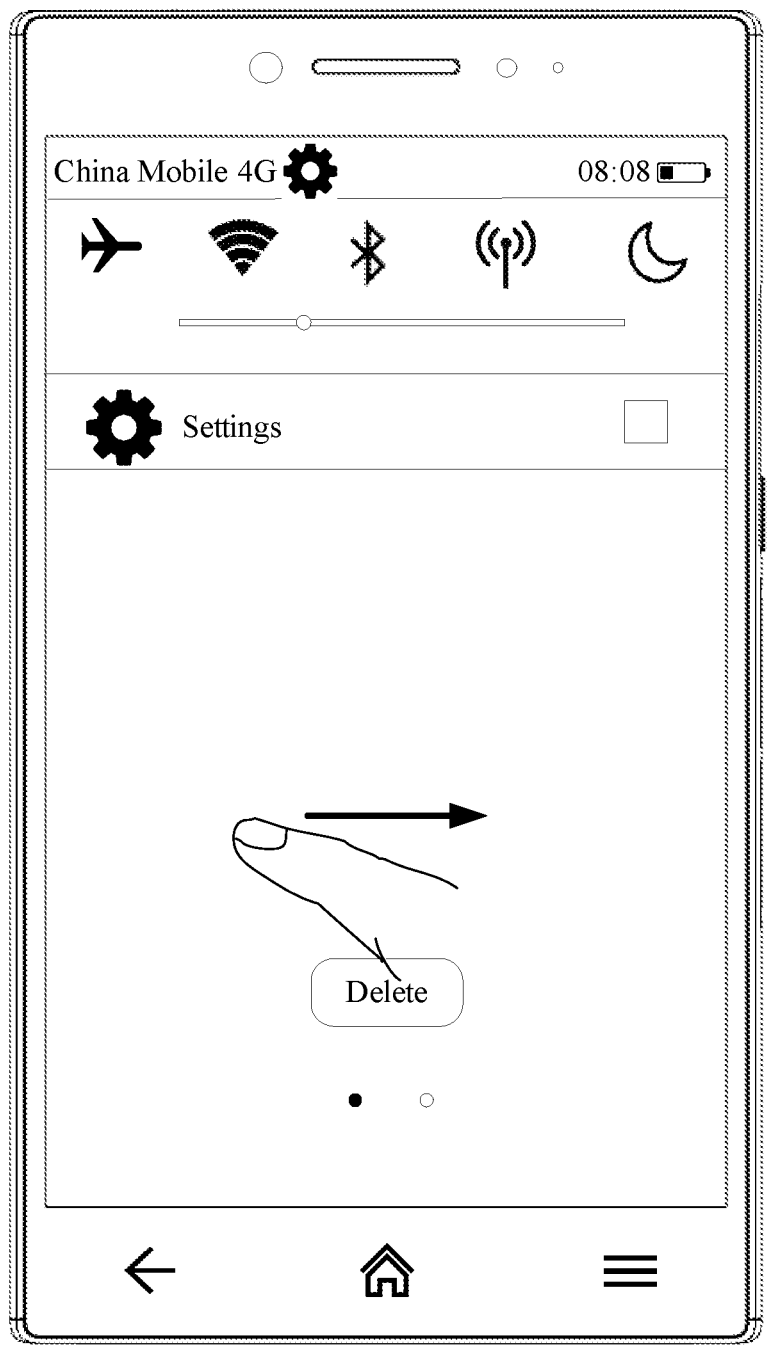
FIG. 7A and FIG. 7B are a schematic diagram of an example of a terminal interface.
Figure 7B:
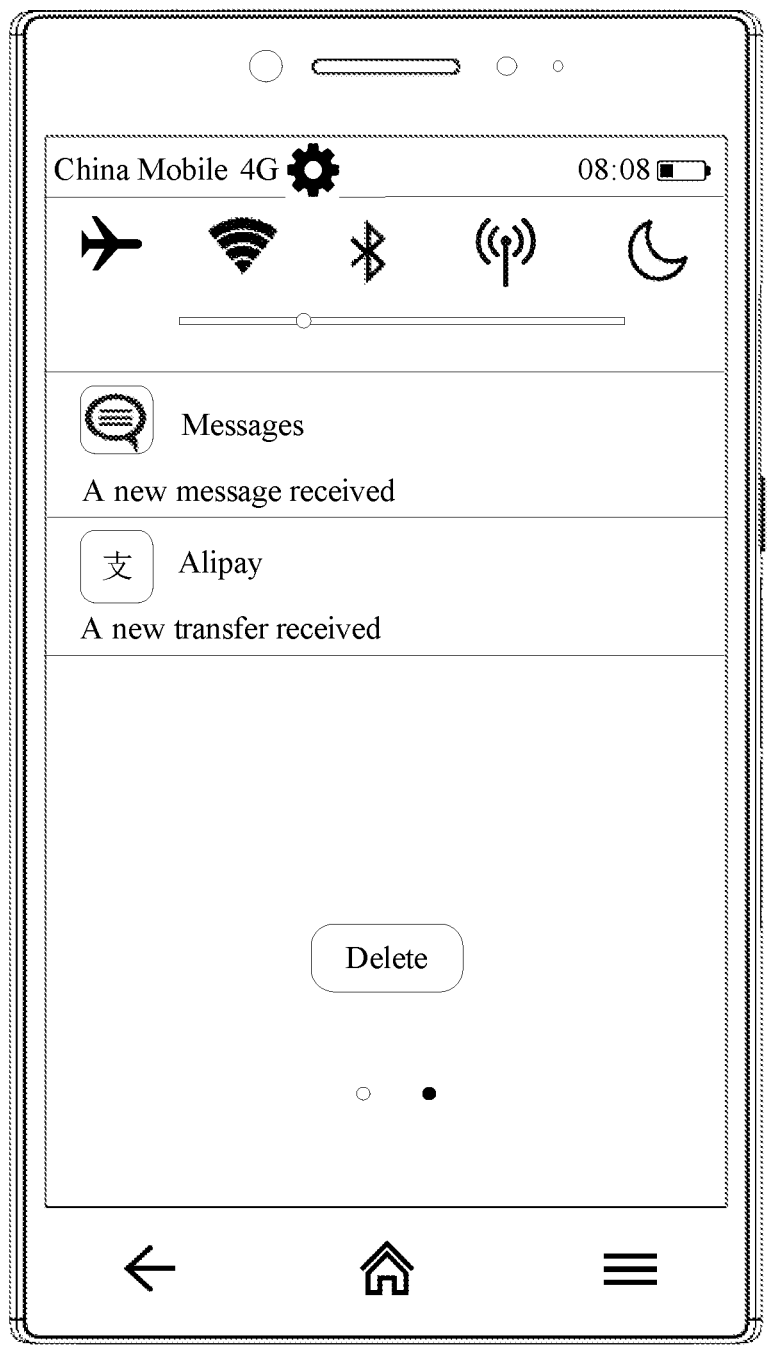
Figure 8A:
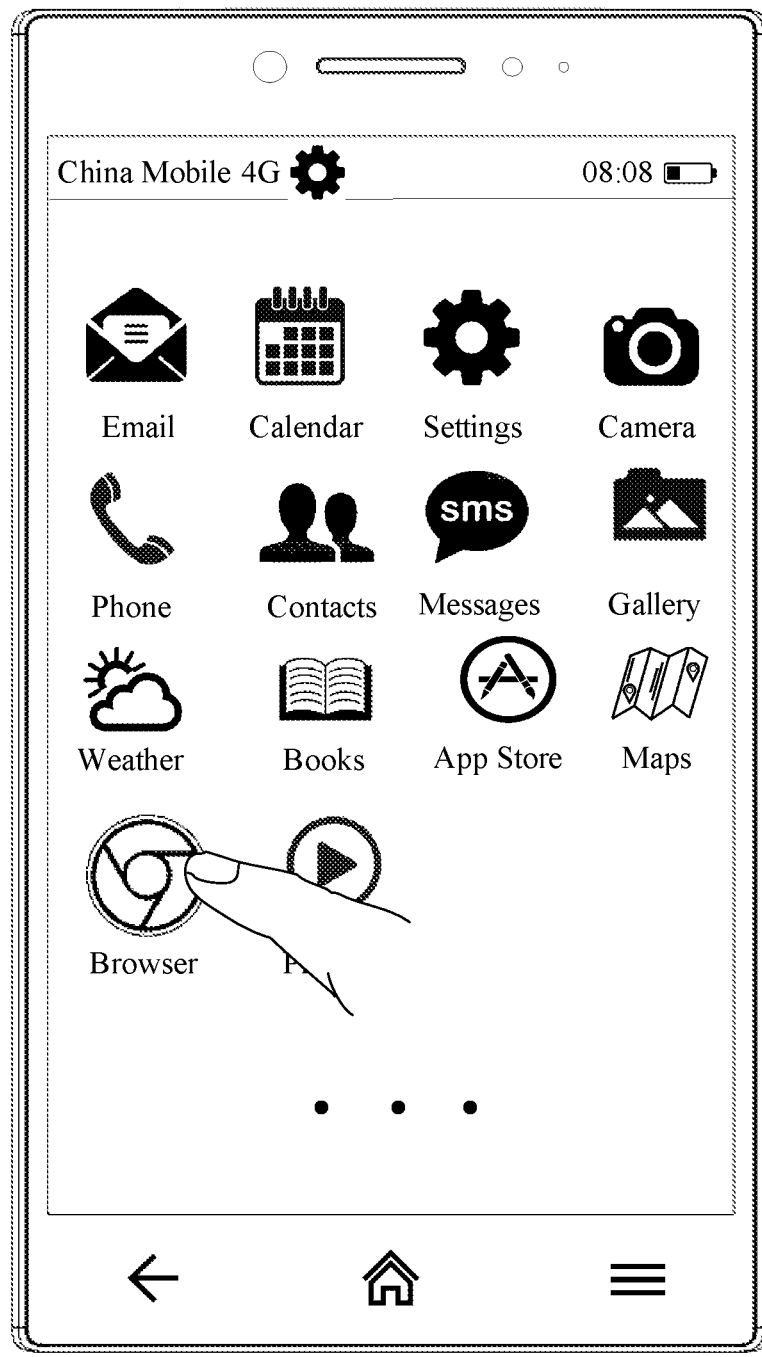
FIG. 8A and FIG. 8B are a schematic diagram of an example of a terminal interface.
Figure 8B:
Figure 9A:
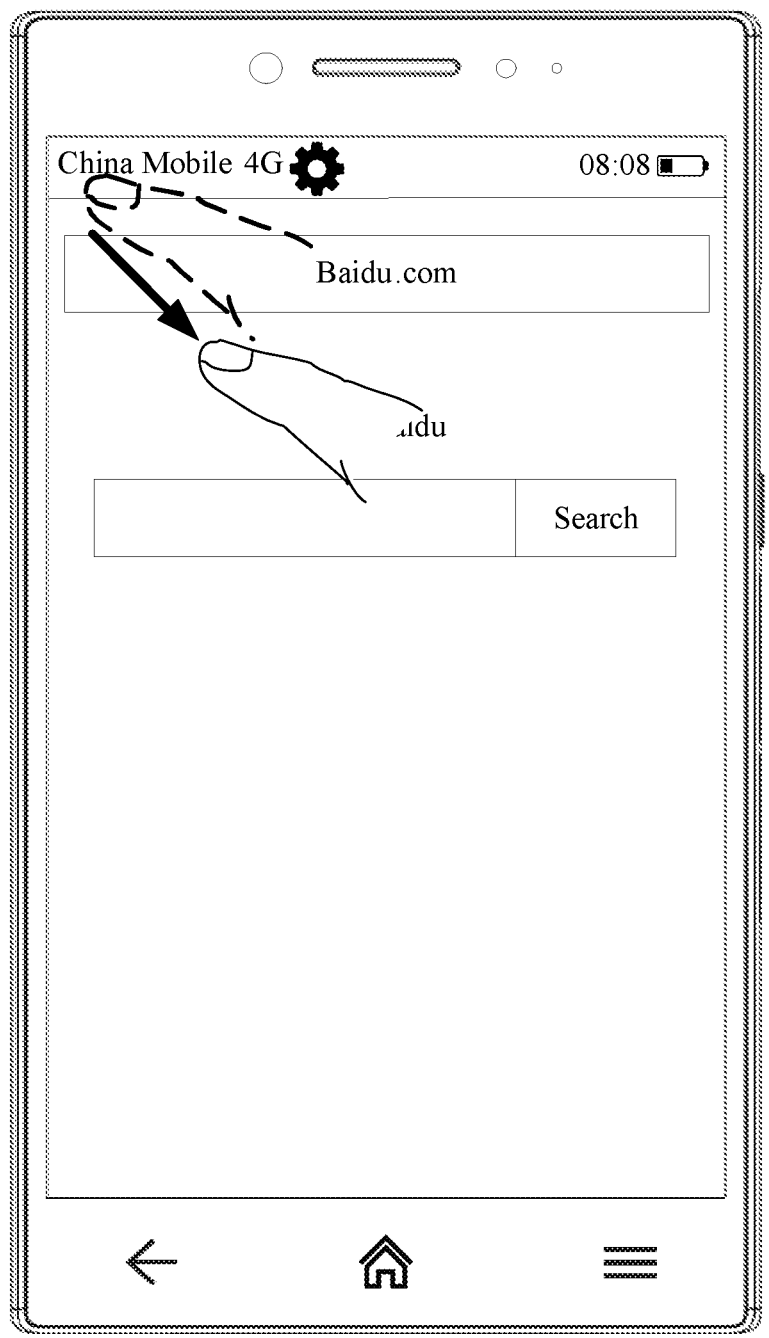
FIG. 9A and FIG. 9B are a schematic diagram of an example of a terminal interface.
Figure 9B:
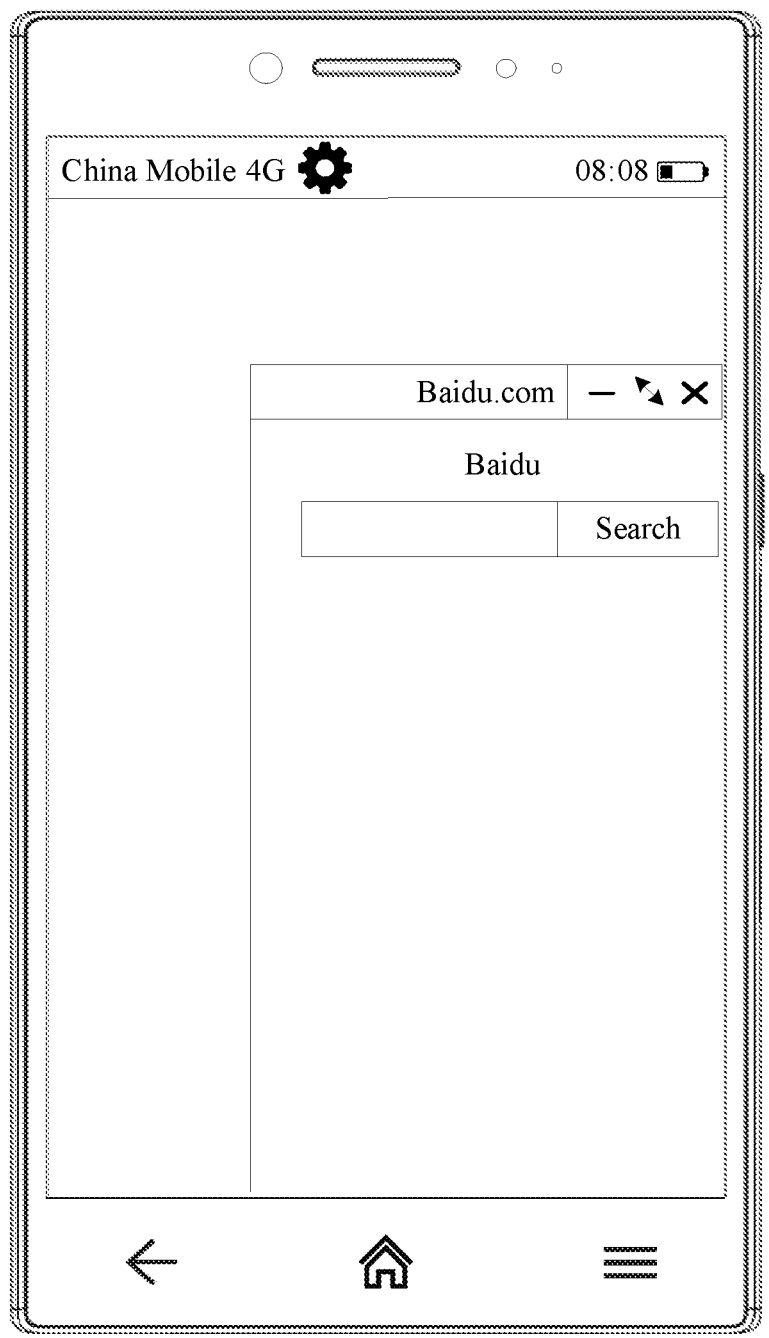
Figure 10A:
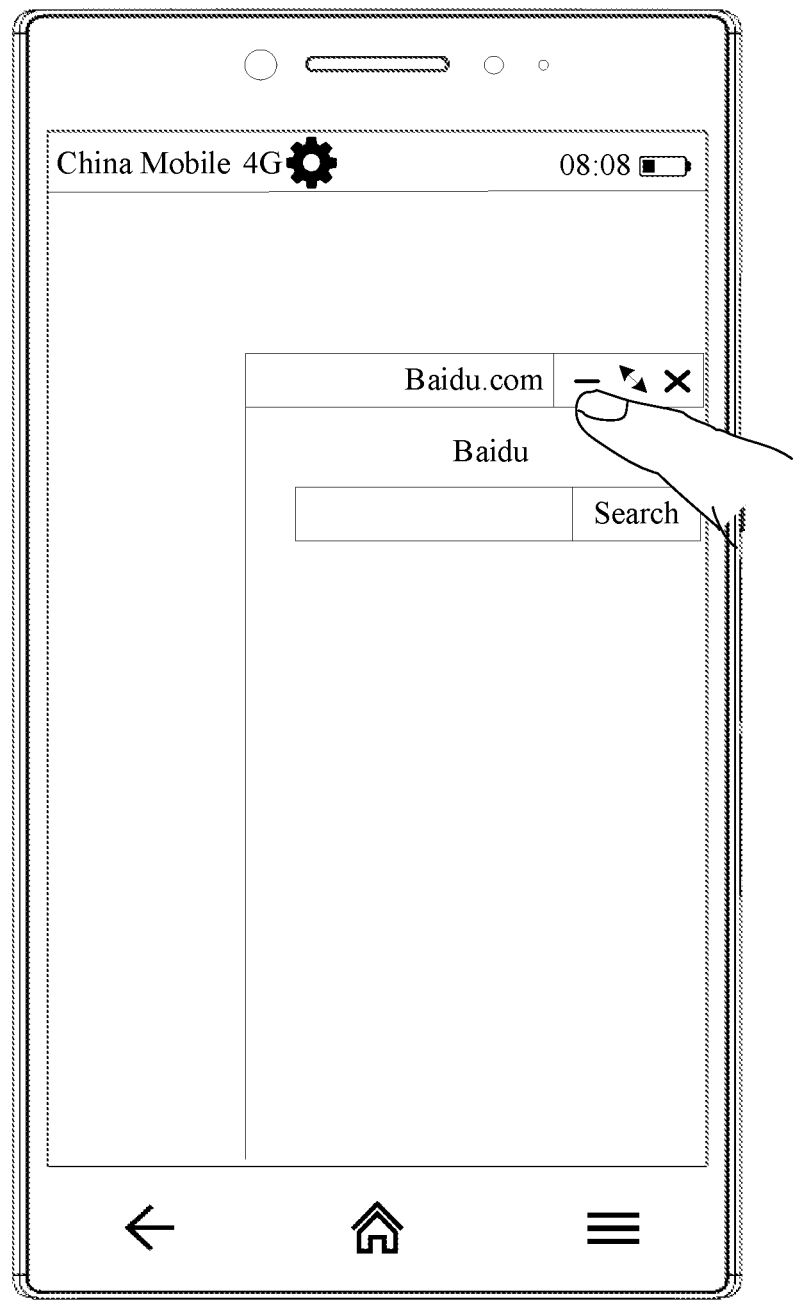
FIG. 10A and FIG. 10B are a schematic diagram of an example of a terminal interface.
Figure 10B:
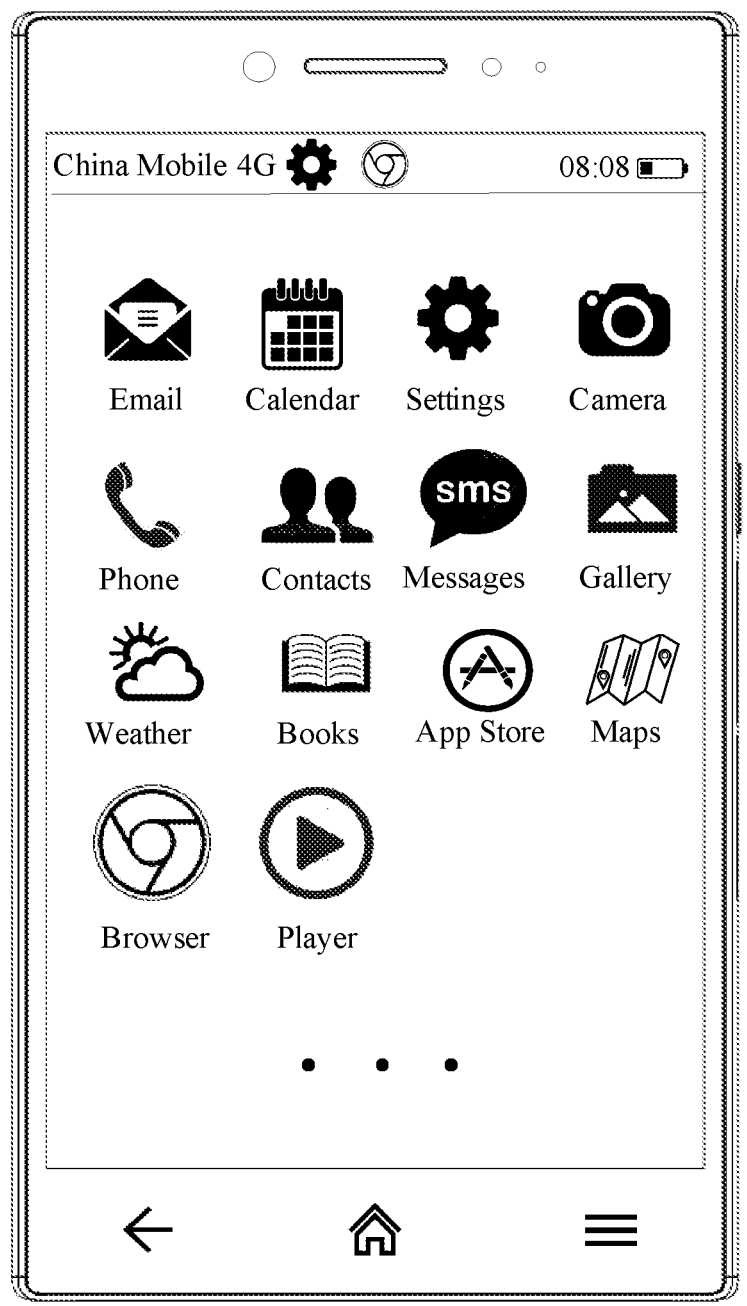
Figure 11A:
FIG. 11A and FIG. 11B are a schematic diagram of an example of a terminal interface.
Figure 11B:
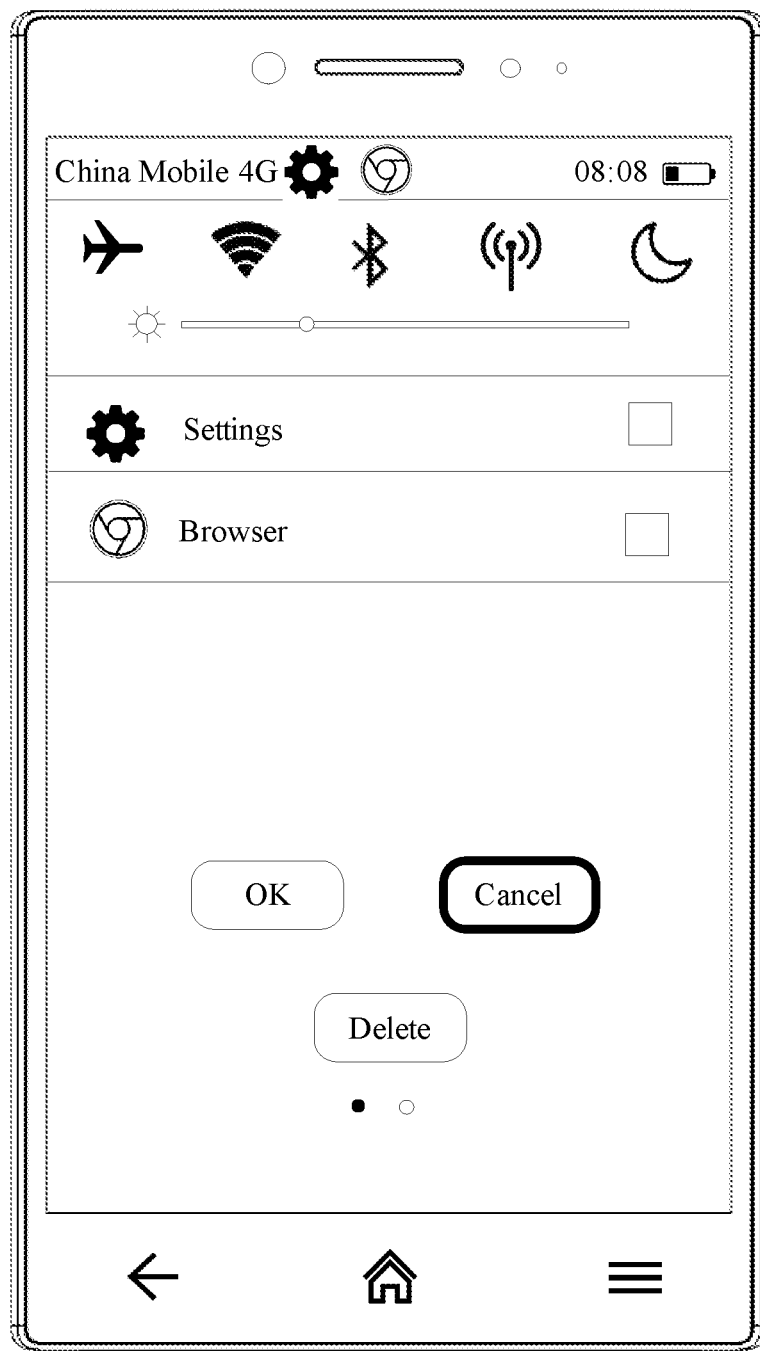

FIG. 7A shows that the terminal detects an operation performed by the user to switch a display page of the drop-down menu of the status bar. For example, the operation may be an operation performed by the user to slide rightwards in the drop-down menu of the status bar. FIG. 7B shows a user interface displayed by the terminal in response to the detected operation performed by the user to switch the display page of the drop-down menu of the status bar. The user interface displays notification messages of a plurality of application programs.

FIG. 8A to FIG. 11B show that the terminal detects an operation performed by the user to select another application, for example, selecting an application "Browser", detects a switch operation performed by the user to switch the application from the full-screen mode to the free-window mode, detects an operation performed by the user to minimize a free window of the application, detects an operation performed by the user to select the drop-down menu of the status bar, and displays corresponding user interfaces in response to these detected operations.

Figure 12:
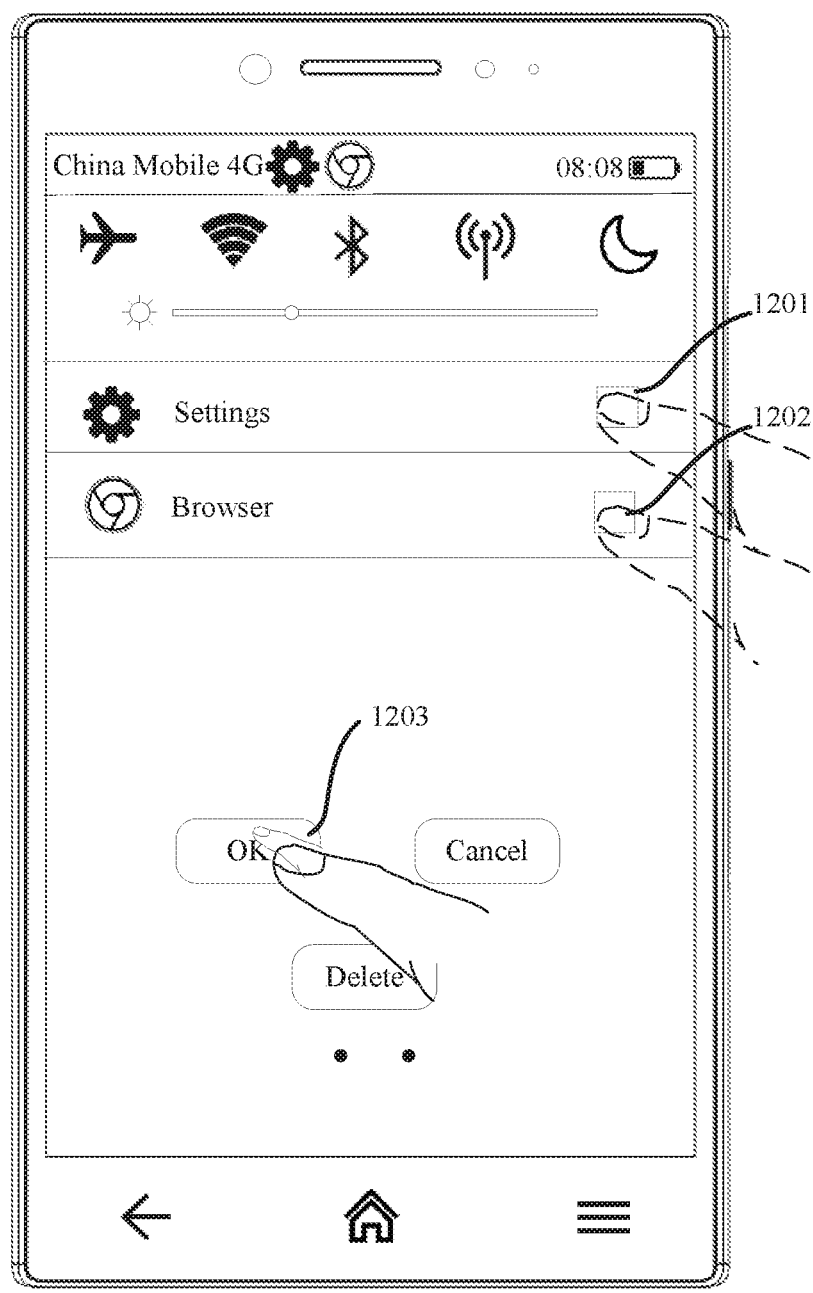
FIG. 12 is a schematic diagram of an example of a terminal interface.
Figure 13A:
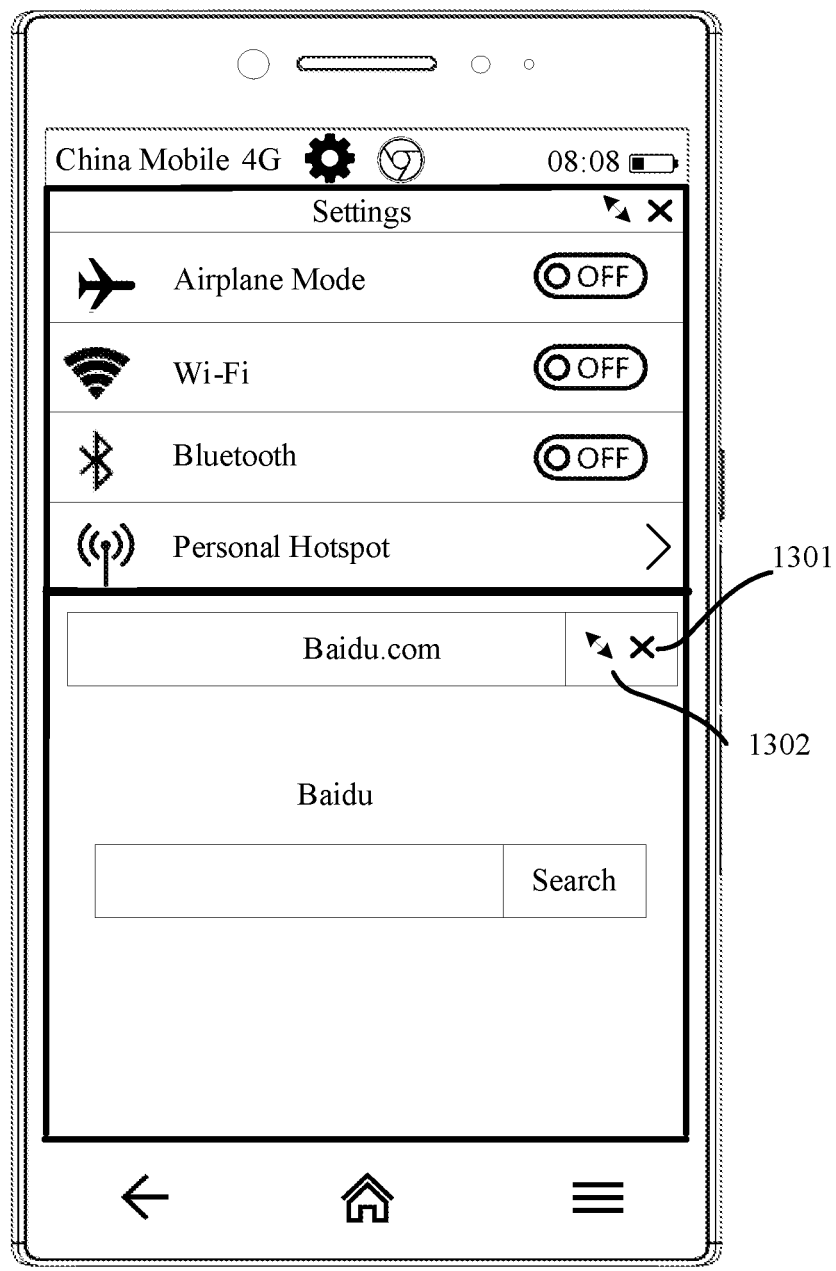
FIG. 13A and FIG. 13B are a schematic diagram of an example of a terminal interface.
Figure 13B:
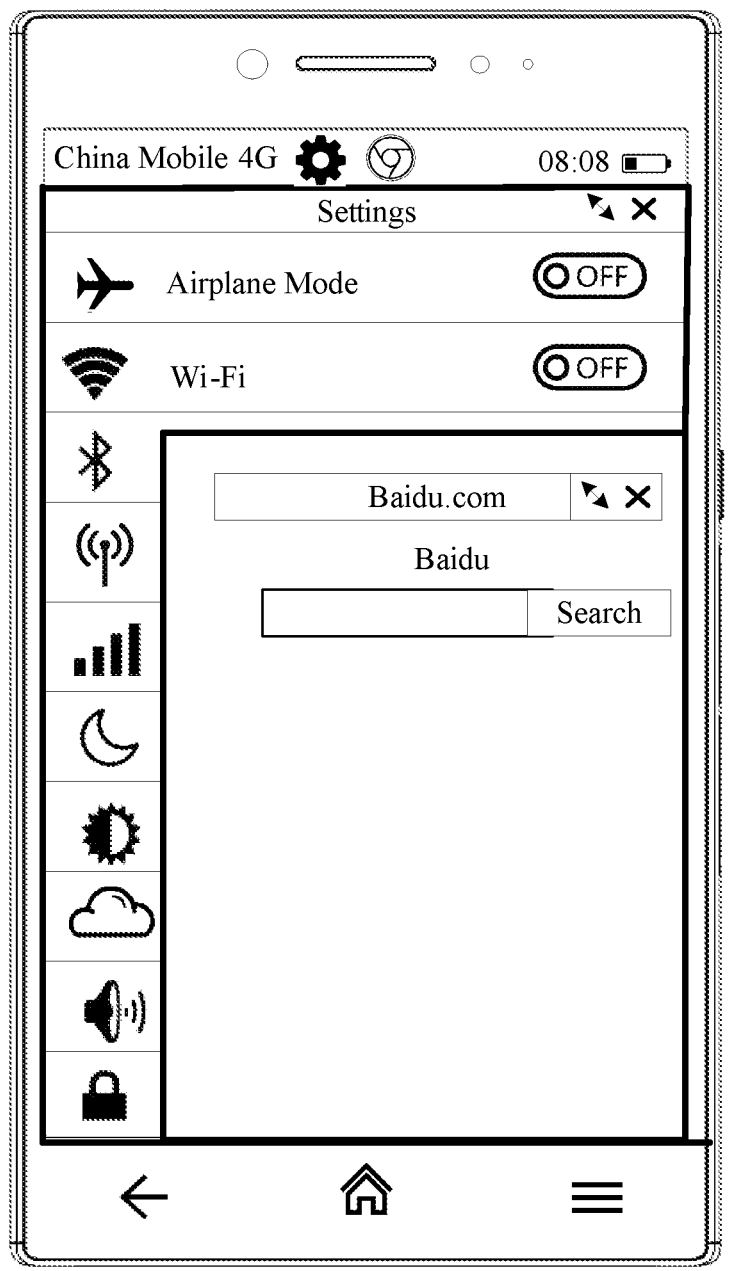

FIG. 12 shows that the terminal detects an operation performed by the user to select interfaces to be displayed in a multi-window mode. For example, the selection operation may be tapping a check box 1201, tapping a check box 1202, and tapping a button 1203. FIG. 13A and FIG. 13B show two kinds of multi-window user interfaces displayed by the terminal in response to the selection operation input by the user. The user interface shown in FIG. 13A includes an upper window and a lower window, respectively displaying different interfaces selected by the user. For example, the upper window displays a main interface of "Settings", and the lower window displays a main interface of "Browser". Each window also includes a close button 1301, and an all button 1302. On the user interface shown in FIG. 13B, a window is displayed over another window. For example, the window below displays the main interface of "Settings", and the window above displays the main interface of "Browser". Further, the terminal may divide the display screen into a left window and a right window. For an arrangement manner thereof, refer to the foregoing arrangement manners of the two windows. Details are not described herein. Specifically, the arrangement manner may be alternatively selected automatically based on whether the terminal is currently in a portrait mode or a landscape mode, or the user may be prompted to manually select a specific arrangement manner. It should be noted that areas occupied by the two windows on the display screen may be equal or not equal, or sizes of the two windows may be adjusted by the user.

Figure 14:
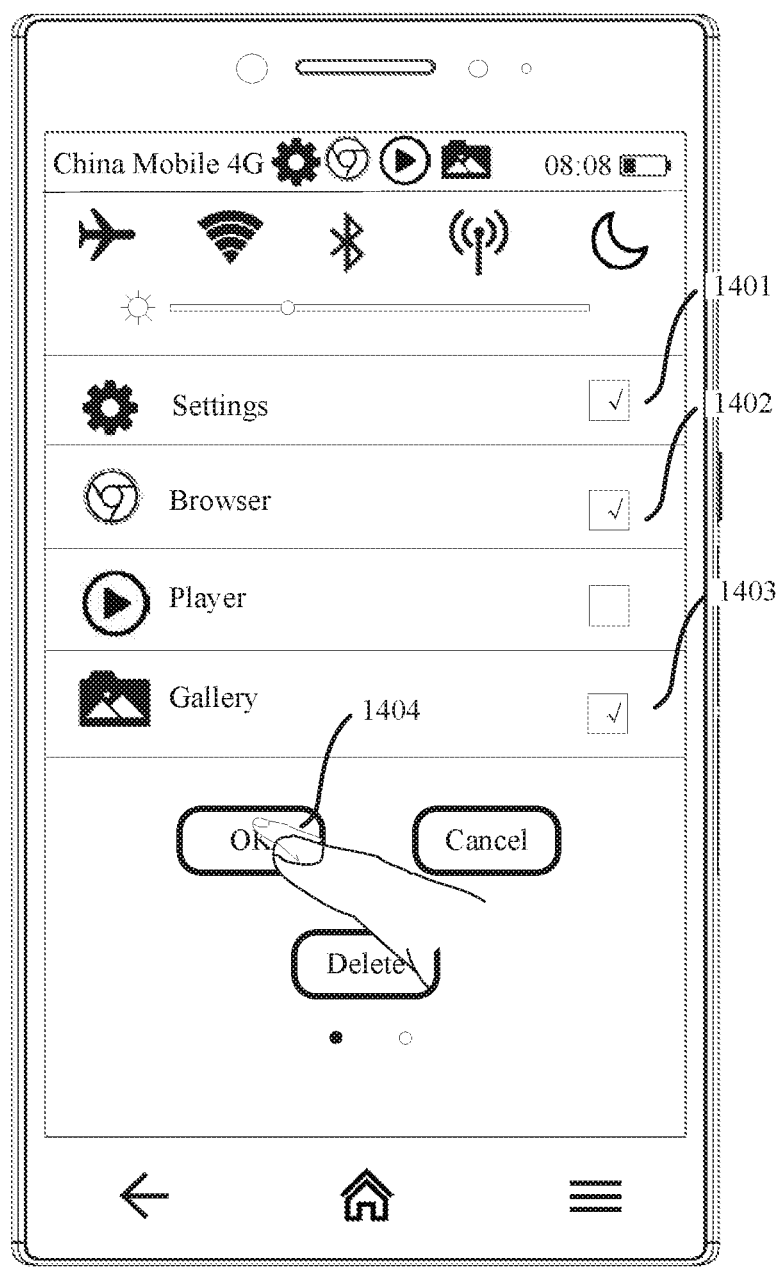
FIG. 14 is a schematic diagram of an example of a terminal interface.
Figure 15A:
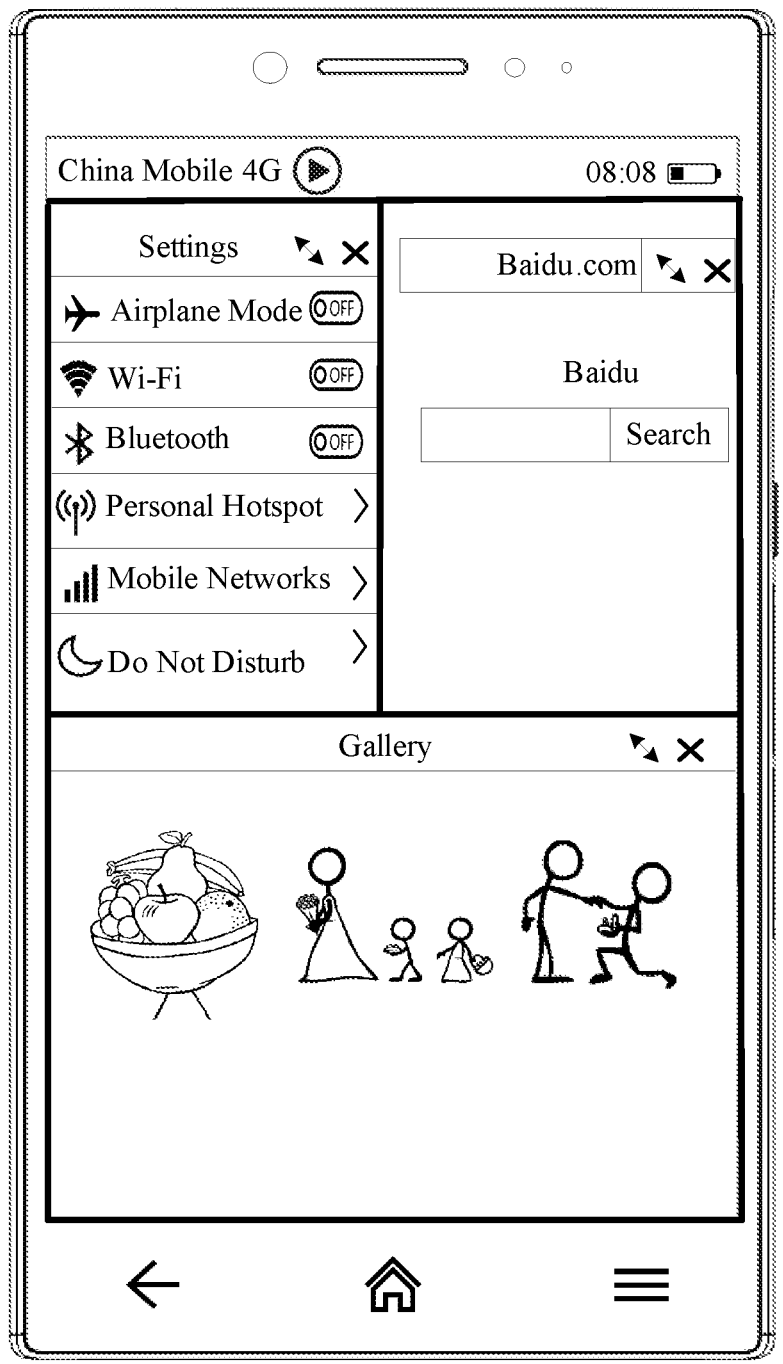
FIG. 15A and FIG. 15B are a schematic diagram of an example of a terminal interface.
Figure 15B:
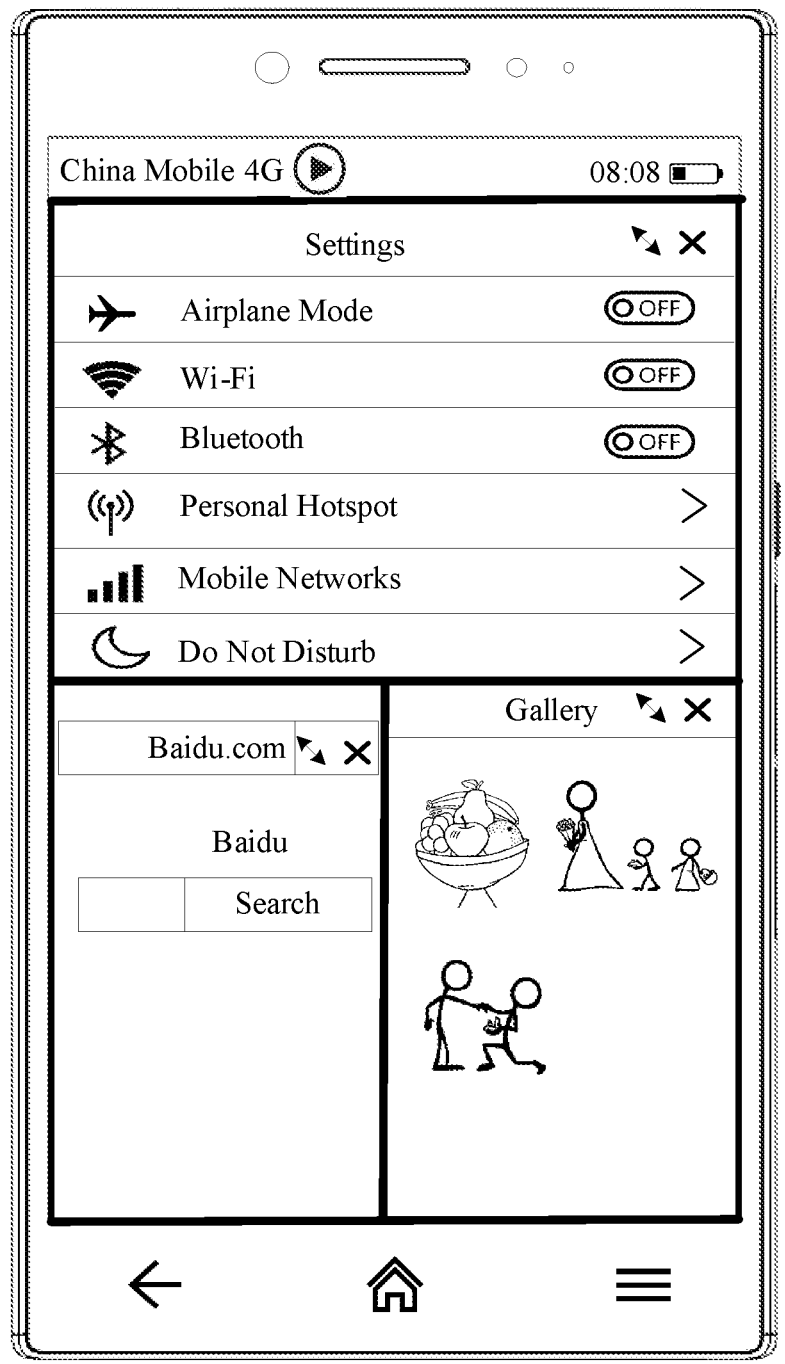
Figure 16A:
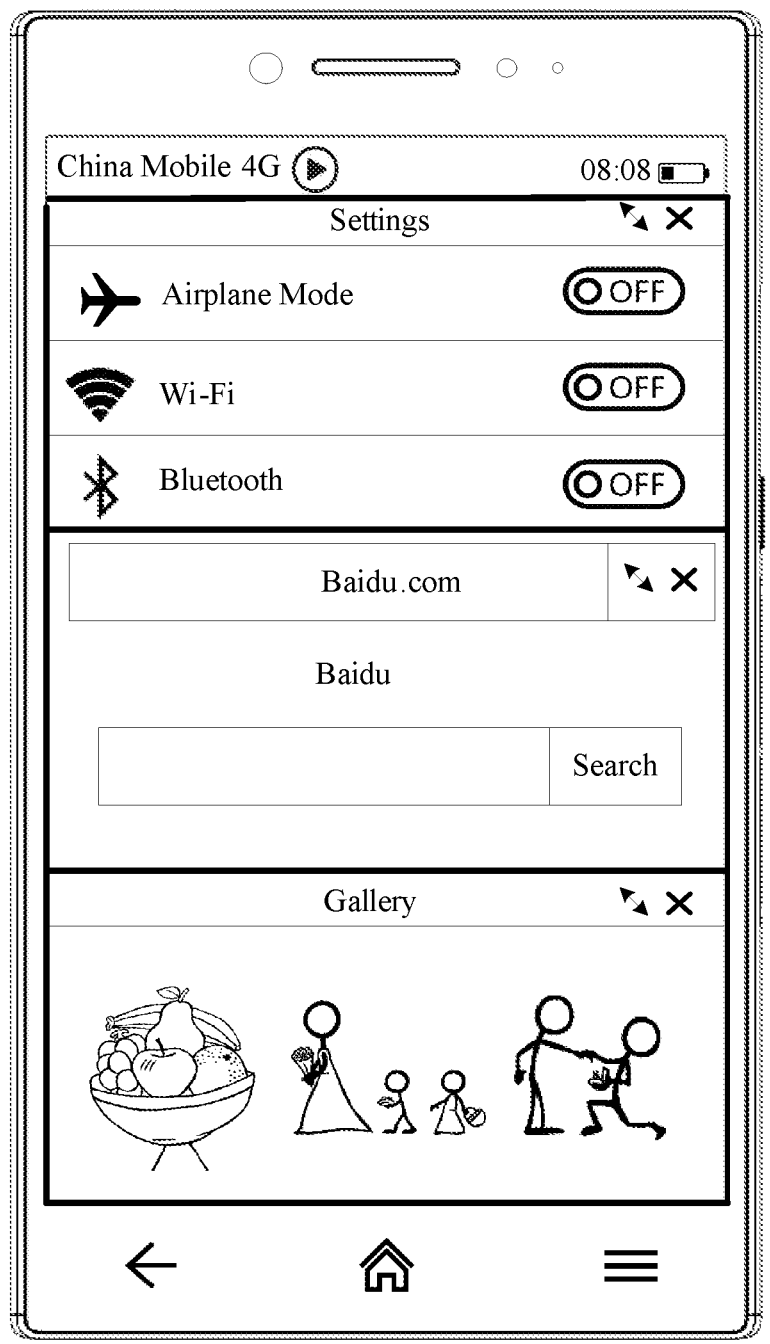
FIG. 16A and FIG. 16B are a schematic diagram of an example of a terminal interface.
Figure 16B:
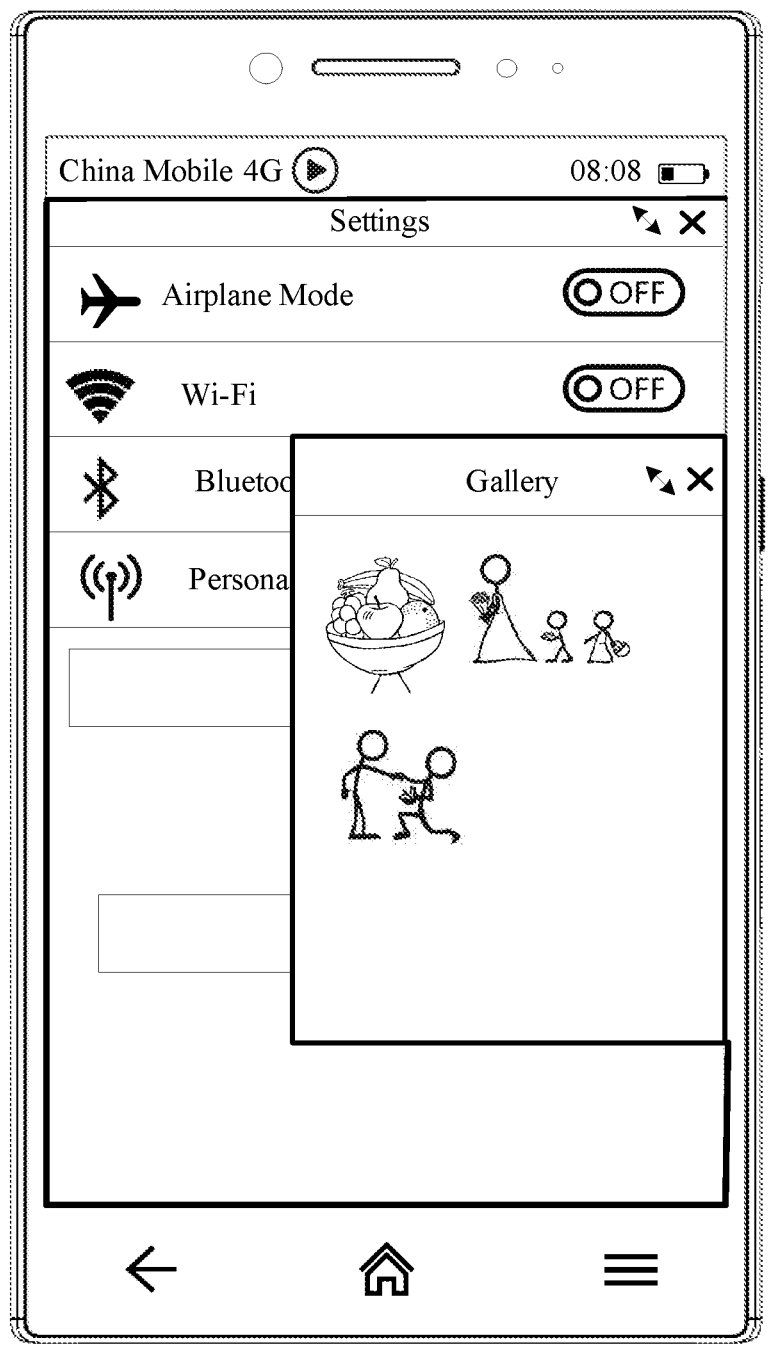

FIG. 14 shows that the terminal detects another operation performed by the user to select interfaces to be displayed in a multi-window mode. For example, the selection operation may be tapping a check box 1401, tapping a check box 1402, tapping a check box 1403, and tapping a check box 1404. FIG. 15A to FIG. 16B show four kinds of multi-window user interfaces displayed by the terminal in response to the selection operation input by the user. Specifically, on the user interface shown in FIG. 15A, the display screen of the terminal is divided into an upper part and a lower part, where the upper part displays two windows, and the lower part displays one window. Alternatively, as shown in FIG. 15B, the upper part displays one window, and the lower part displays two windows. Alternatively, on a user interface shown in FIG. 16B, the upper part of the display screen of the terminal displays one window, the lower part displays one window, and over these two windows displays one window. Alternatively, on the user interface shown in FIG. 16A, the display screen of the terminal is divided into three parts. Alternatively, the display screen of the terminal may be divided into a left part and a right part. For window display in the left and right parts, refer to the arrangement manner of the upper part and the lower part. Details are not described herein. It should be noted that areas occupied by the three windows may be equal or not equal. Alternatively, areas of two of the three windows are equal, and an area occupied by another window is greater or less than an area occupied by each of the two windows. Alternatively, sizes of the plurality of windows may be adjusted by the user.

Figure 17A:
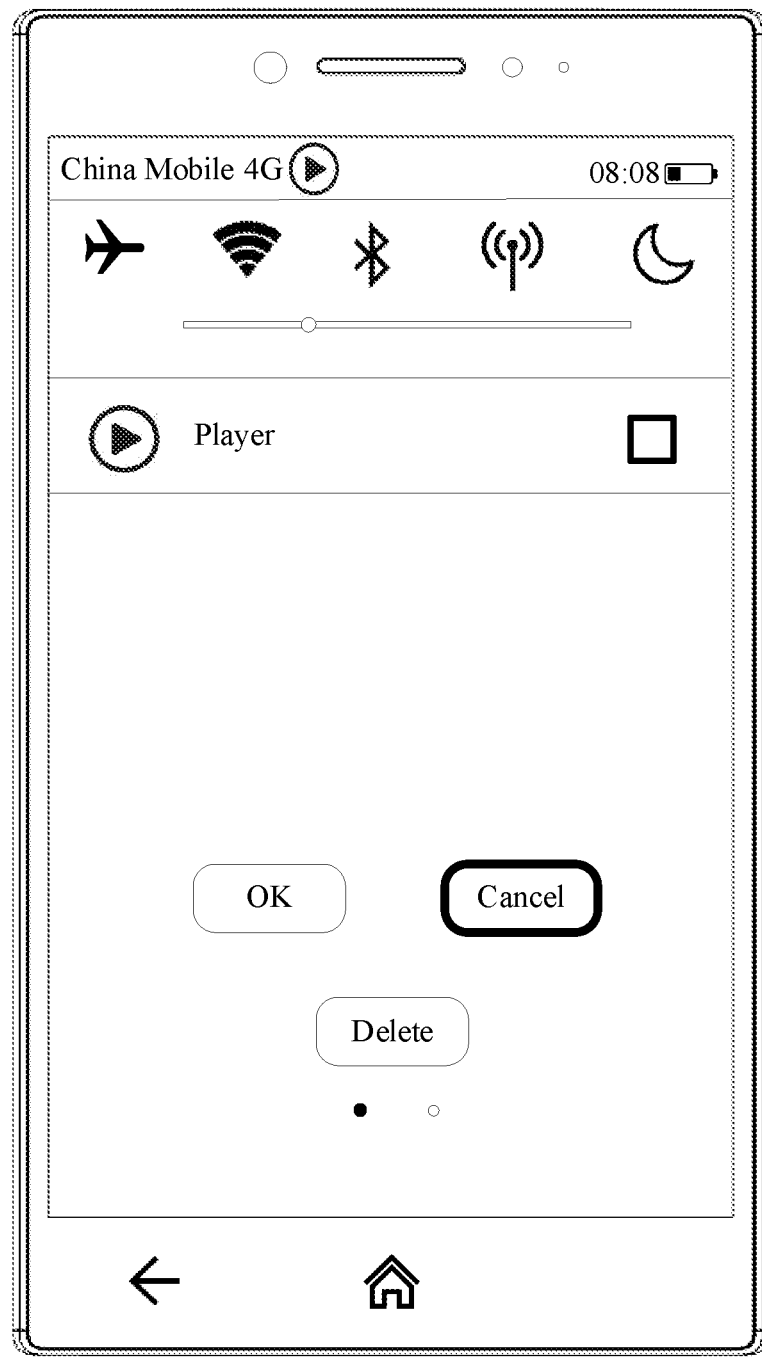
FIG. 17A and FIG. 17B are a schematic diagram of an example of a terminal interface.
Figure 17B:
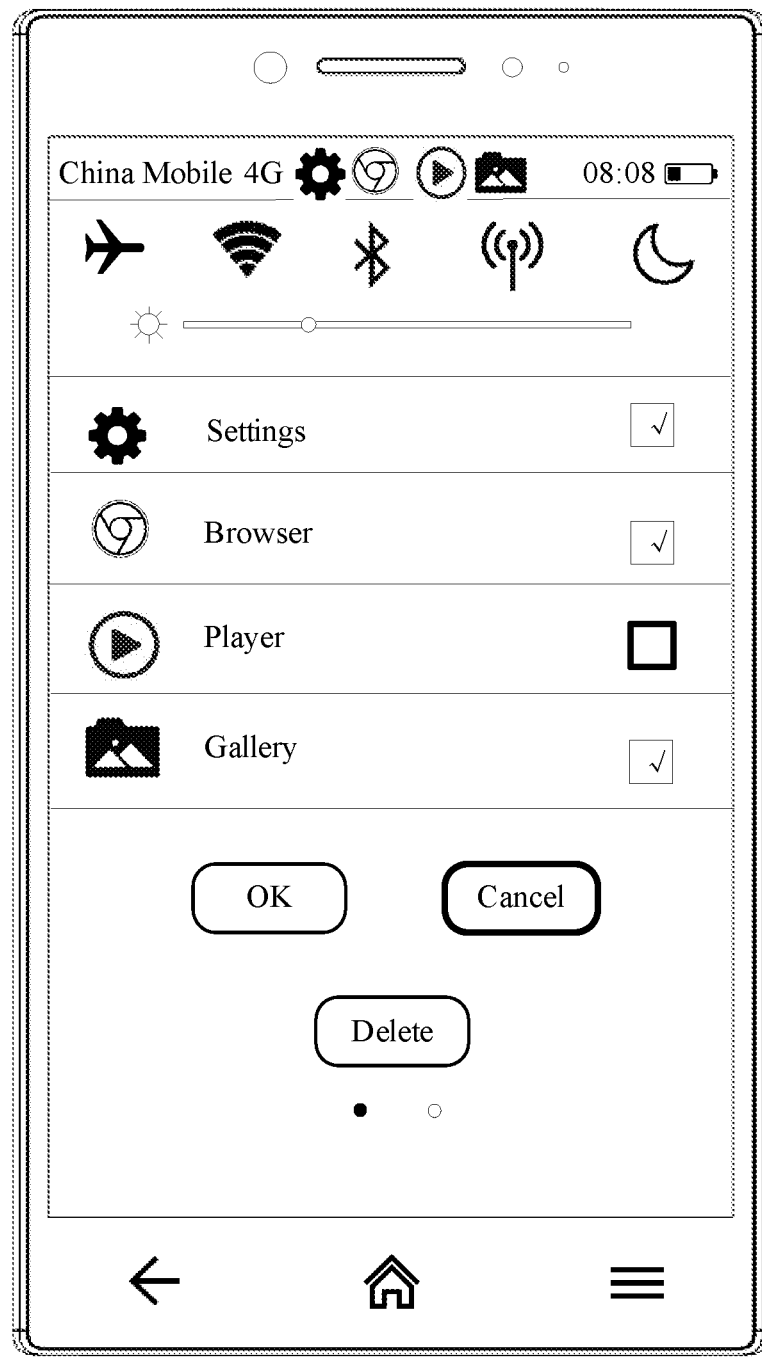

FIG. 17A shows a user interface displayed, after the terminal displays the multi-window display interface, in response to a detected operation input by the user to select the drop-down menu of the status bar. The user interface includes a minimization icon and a check box corresponding to an application "Player". FIG. 17B shows another user interface displayed, after the terminal displays the multi-window interface, in response to a detected operation input by the user to display the drop-down menu of the status bar. The user interface includes minimization icons and check boxes corresponding to the application "Settings", the application "Browser", the application "Player", and an application "Gallery". The check boxes corresponding to the application "Settings", the application "Browser", and the application "Gallery" are inoperable.

Figure 18A:
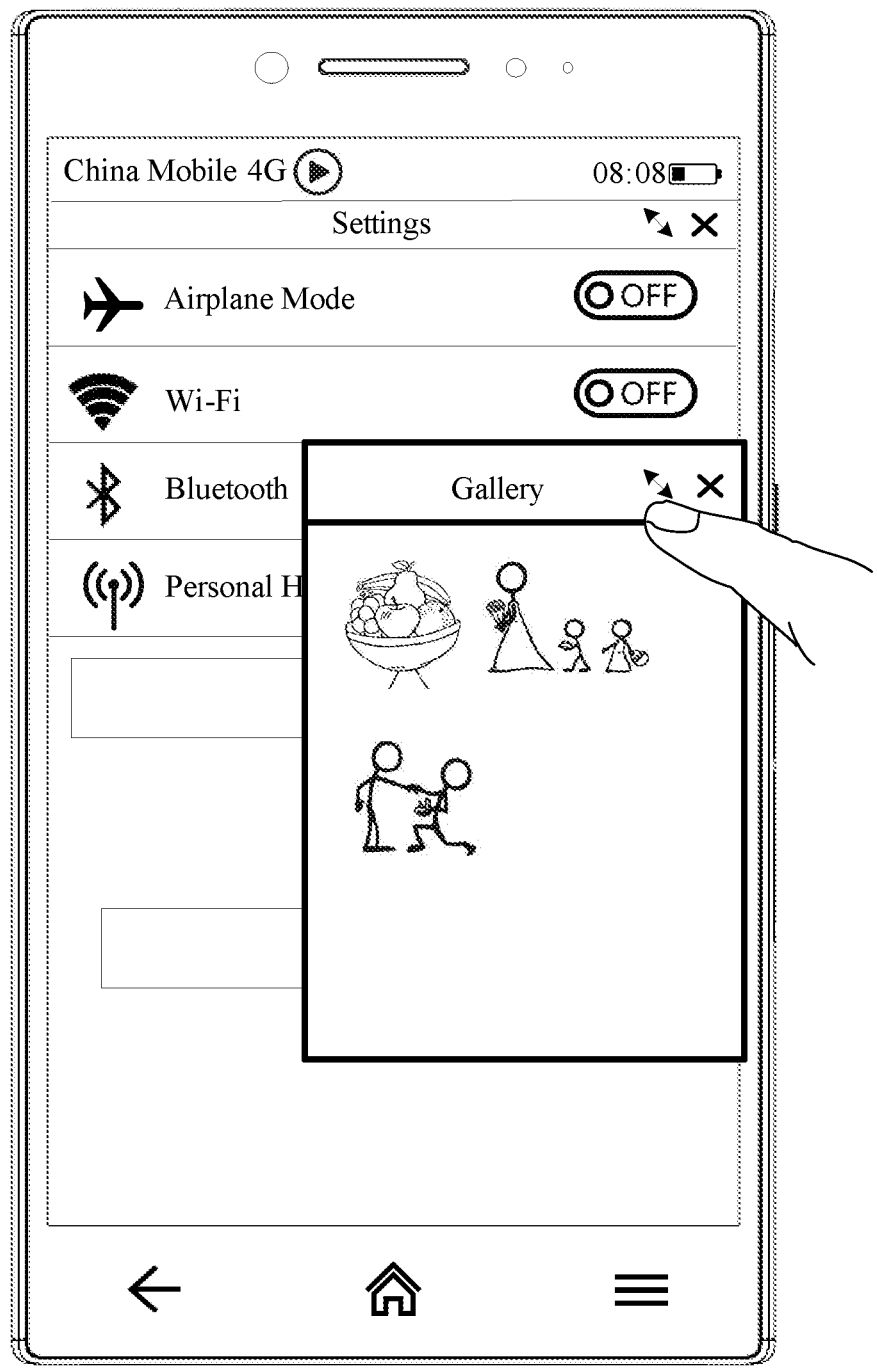
FIG. 18A and FIG. 18B are a schematic diagram of an example of a terminal interface.
Figure 18B:
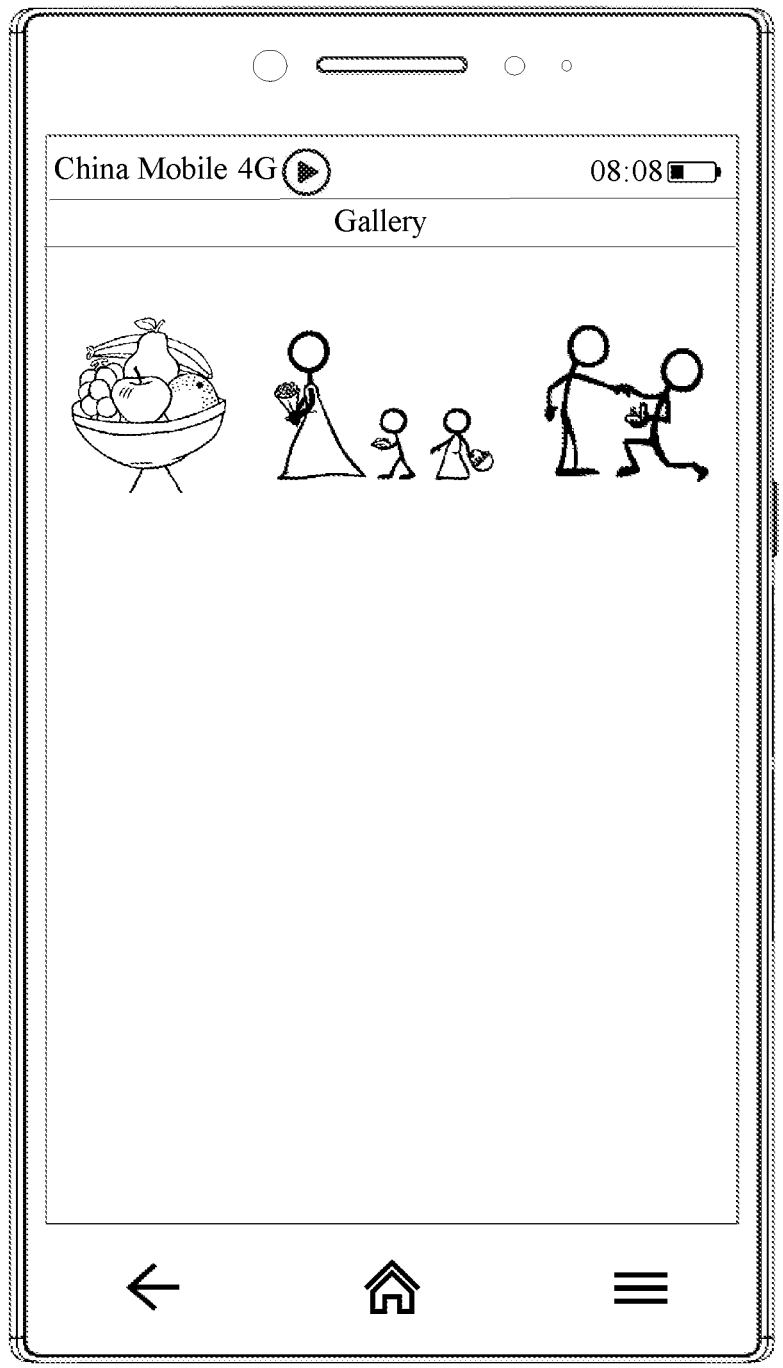

FIG. 18A shows that the terminal detects an operation input by the user to display an interface in the full-screen mode. For example, the operation may be tapping a full screen button on the display window by the user. FIG. 18B shows a user interface displayed by the terminal in response to an operation input by the user to display an interface in the full-screen mode. The user interface is a full-screen interface of the application "Gallery".

Figure 19A:
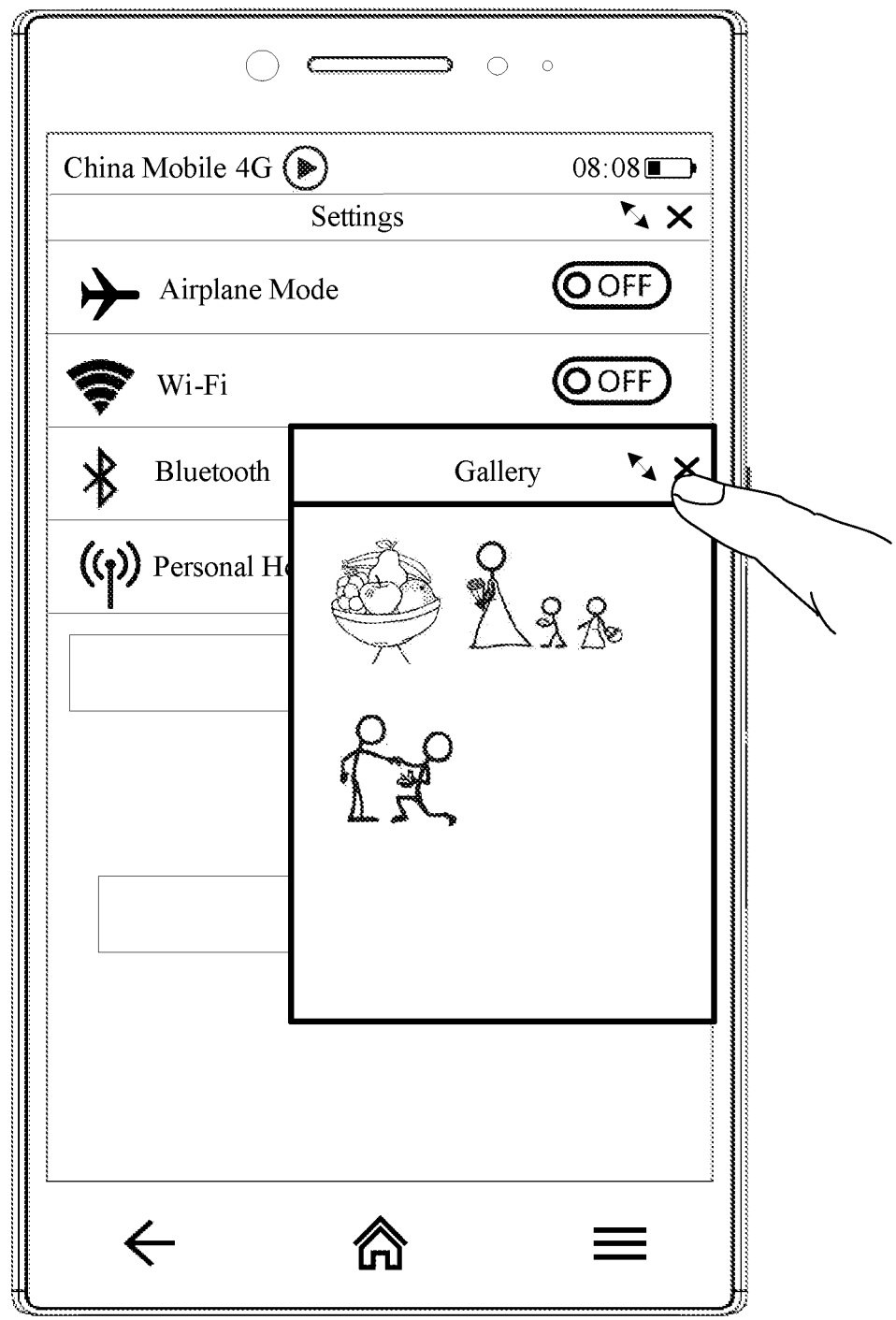
FIG. 19A and FIG. 19B are a schematic diagram of an example of a terminal interface.
Figure 19B:
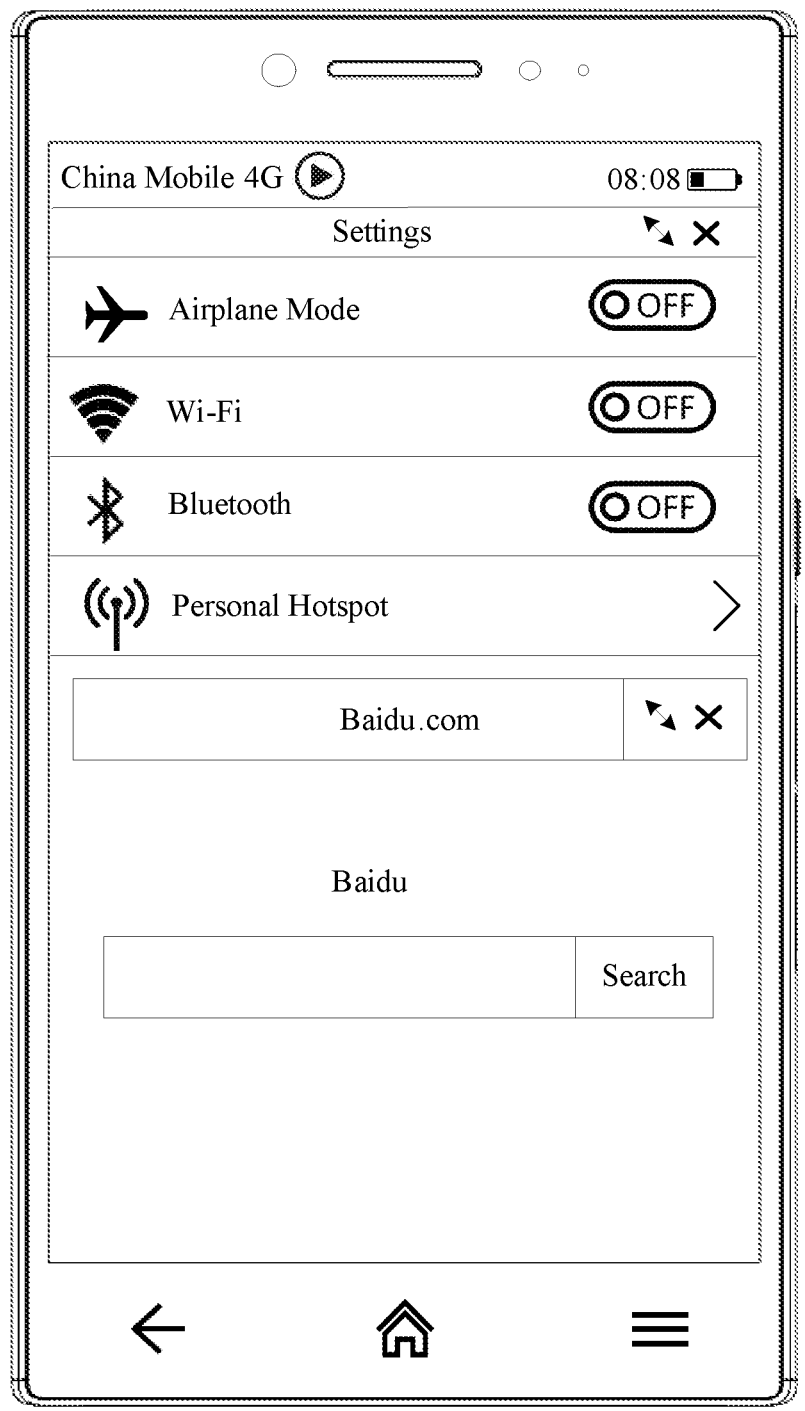

FIG. 19A shows that the terminal detects an operation input by the user to close an interface. For example, the operation may be tapping a close button on the display window by the user. FIG. 19B shows a user interface displayed by the terminal in response to an operation input by the user to close an interface. The user interface includes two display windows that are used to display the interface of the application "Settings" and the interface of the application "Browser", respectively.

Figure 20A:
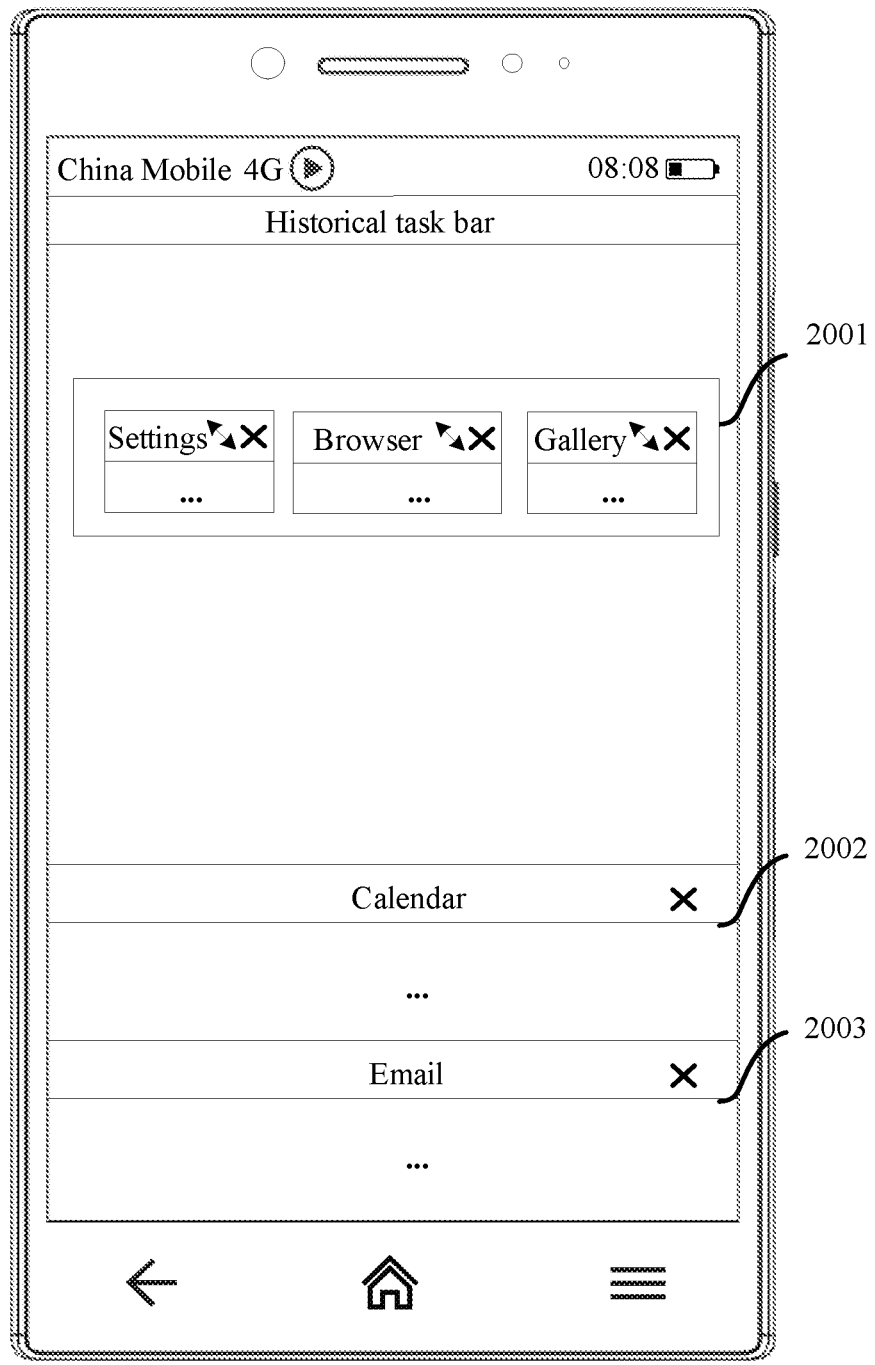
FIG. 20A and FIG. 20B are a schematic diagram of an example of a terminal interface.
Figure 20B:
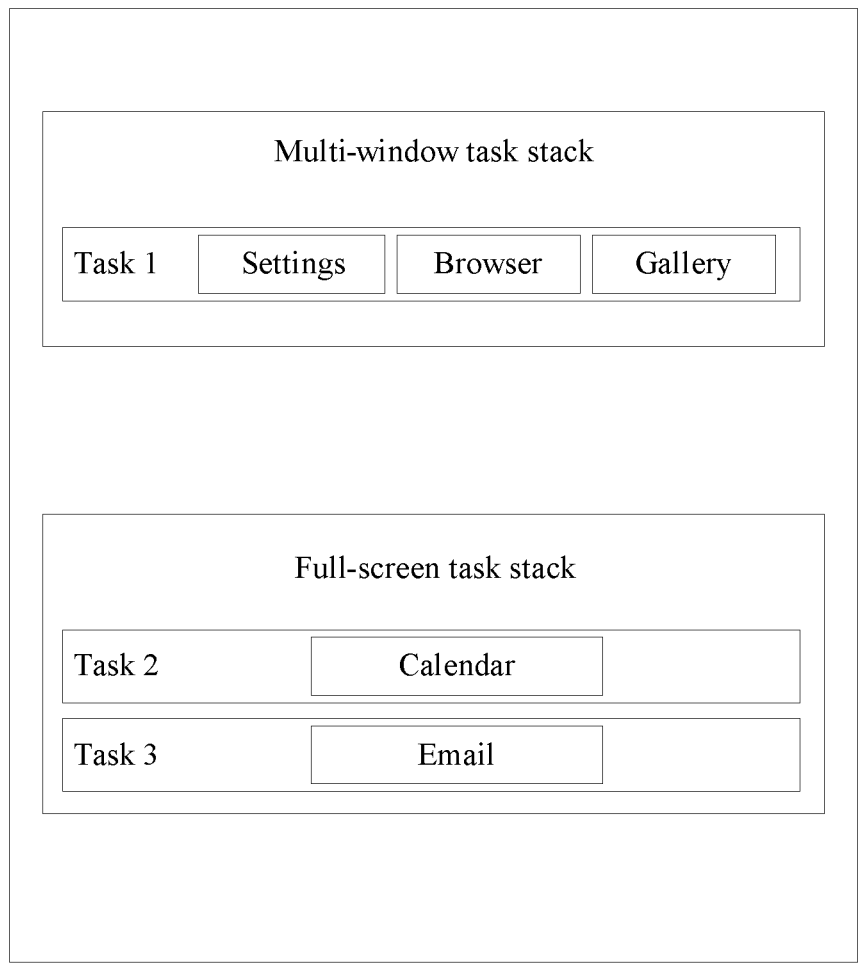

FIG. 20A shows a historical task bar interface displayed by the terminal in response to a detected operation performed by the user to display a historical task bar. For example, the operation may be tapping a menu bar, selecting an option of the historical task bar, and the like. FIG. 20B shows a corresponding architectural diagram of the terminal when the terminal displays the interface shown in FIG. 20A.

Figure 21A:
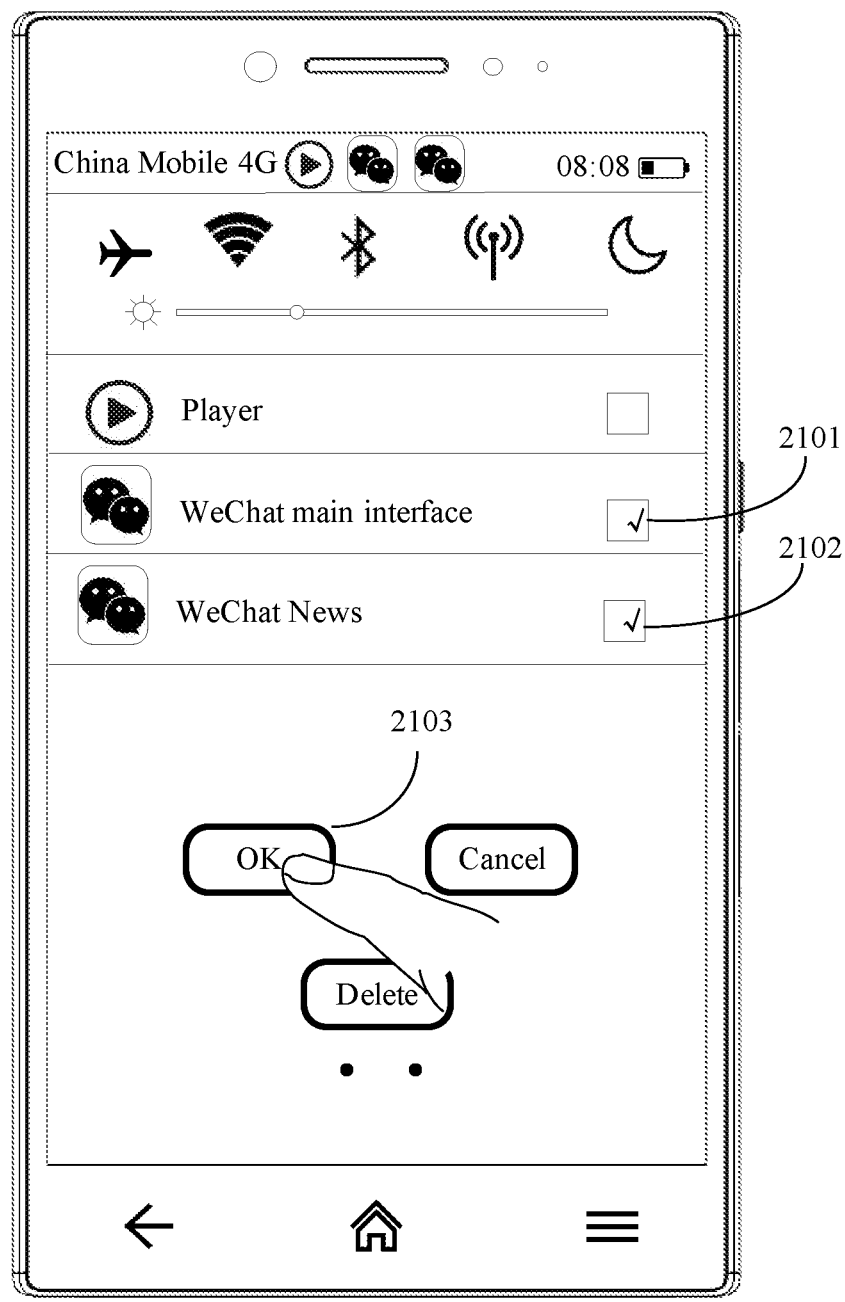
FIG. 21A and FIG. 21B are a schematic diagram of an example of a terminal interface.
Figure 21B:
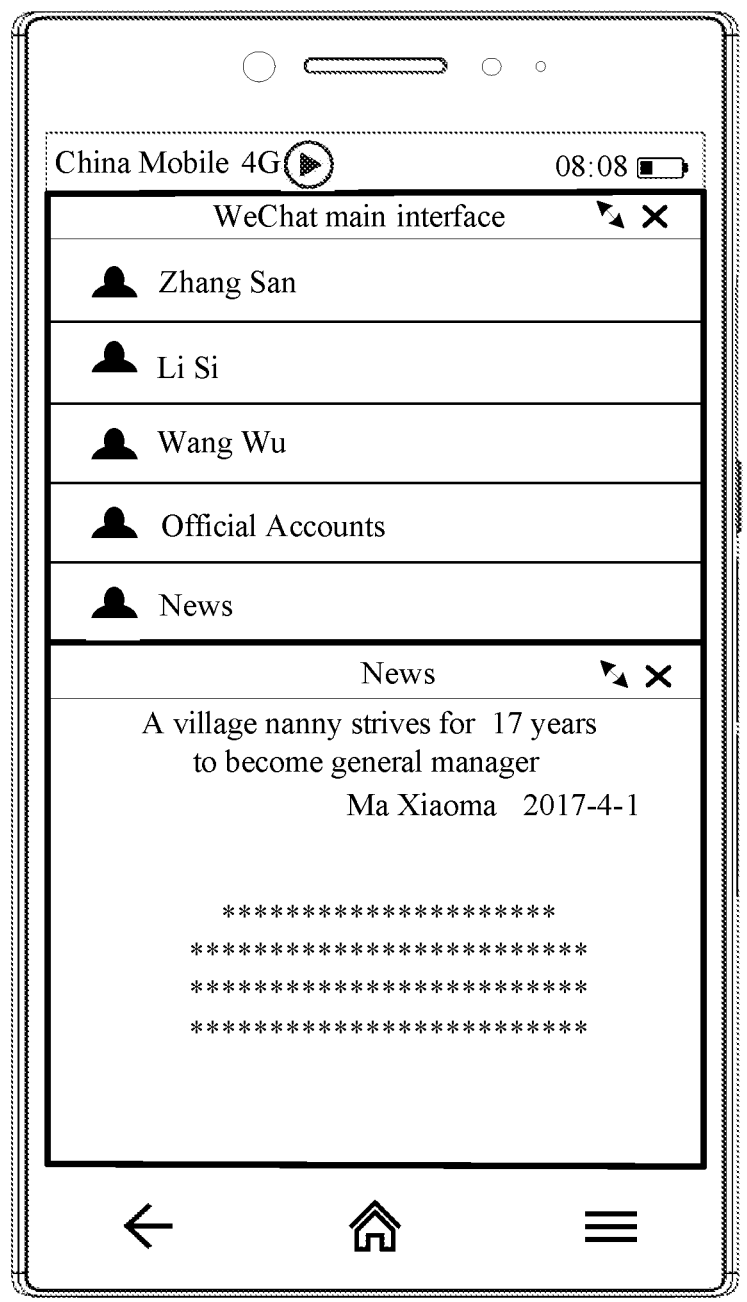

FIG. 21A shows that the terminal detects another operation performed by the user to select interfaces to be displayed in the multi-window mode. For example, the selection operation may be tapping a check box 2101, tapping a check box 2102, and tapping a button 2103. FIG. 21B shows a user interface displayed by the terminal in response to the selection operation input by the user. The user interface includes two display windows, respectively displaying a main interface of an application "WeChat" and a reading interface of the application "WeChat".

Figure 22A:
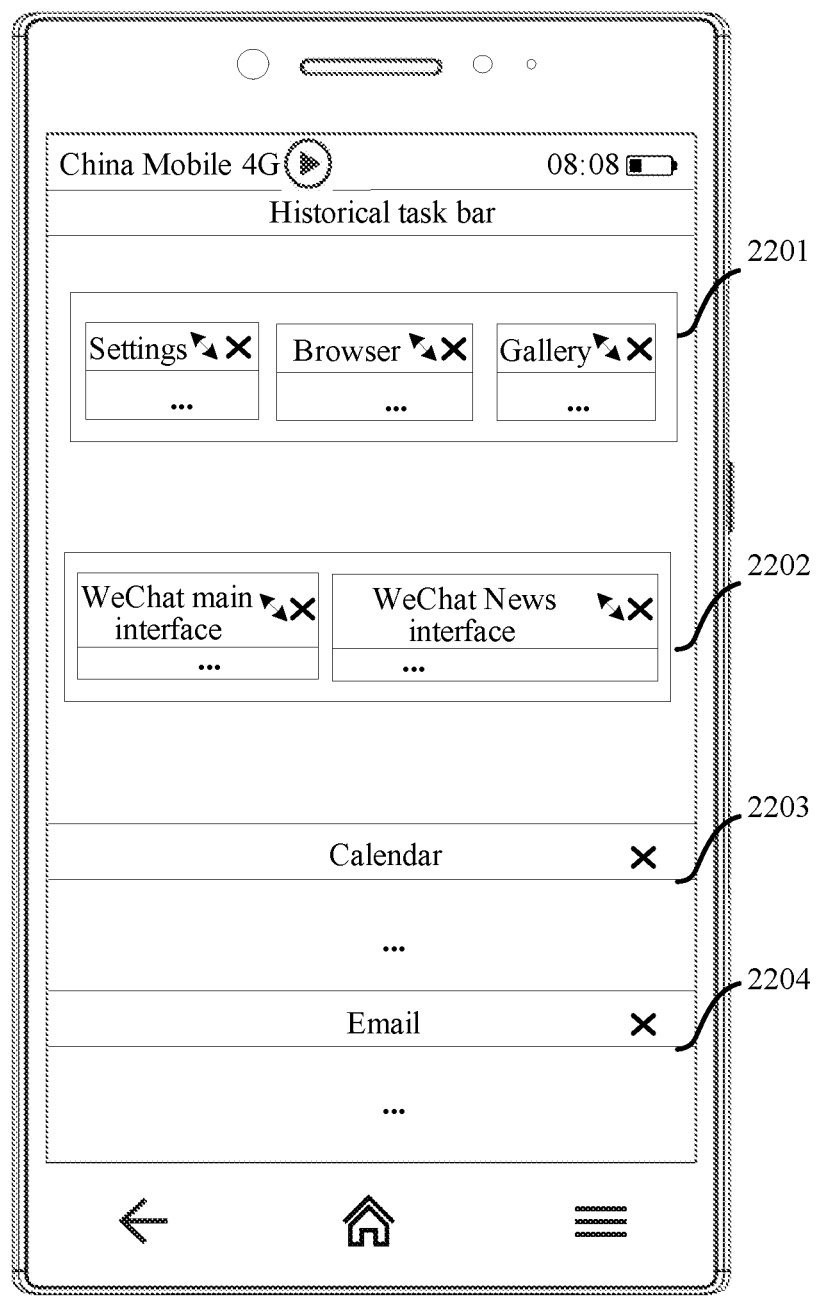
FIG. 22A and FIG. 22B are a schematic diagram of an example of a terminal interface.
Figure 22B:
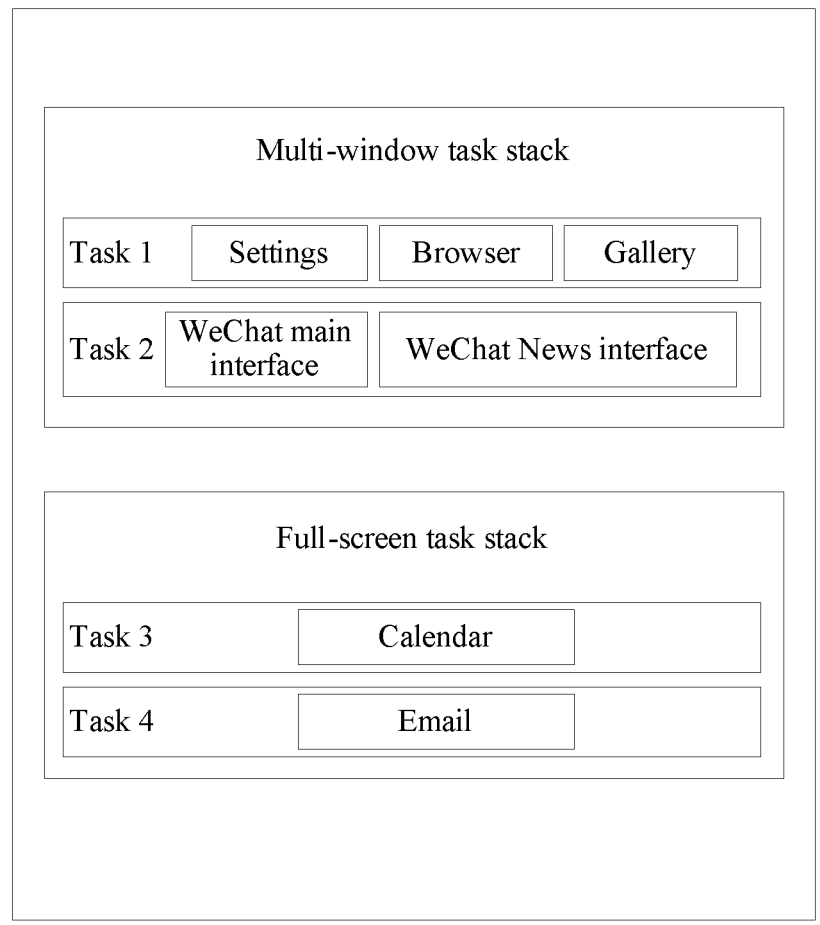

FIG. 22A shows a user interface displayed by the terminal in response to another detected operation input by the user to display the historical task bar. The user interface includes four historical task boxes: 2201 to 2204. The task boxes 2201 and 2202 are two display interfaces displaying a plurality of windows; and each task box corresponding to the display interface displaying a plurality of windows further includes a multi-window display button and a multi-window close button, such as 220101 and 220102. For example, the operation may be tapping the menu bar and selecting the option of the historical task bar. FIG. 22B shows a corresponding architectural diagram of the terminal when the terminal displays the user interface shown in FIG. 22A.

Figure 23:
FIG. 23 is a schematic diagram of an example of a terminal interface.

FIG. 23 shows a user interface. The user interface includes a function button, such as 2301 shown in FIG. 23. The terminal displays, in the drop-down menu of the status bar, an application icon corresponding to the user interface and a check box corresponding to the application icon, in response to a detected operation performed by the user on the function button.

Figure 24A:
FIG. 24A and FIG. 24B are a schematic diagram of an example of a terminal interface.
Figure 24B:
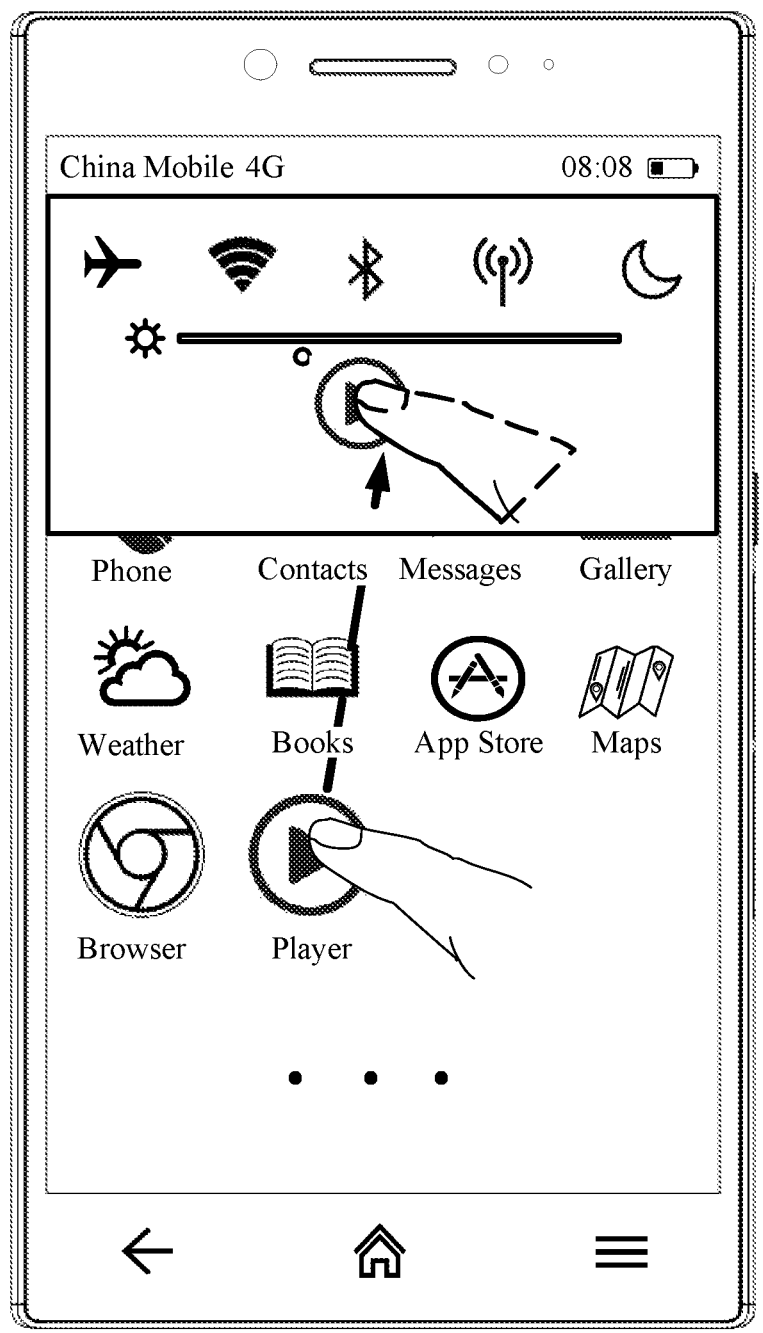

FIG. 24A and FIG. 24B show that the terminal detects an operation performed by the user to drag an application icon to the status bar, and displays, in the drop-down menu of the status bar, the application icon and a check box corresponding to the application icon, in response to the detected operation performed by the user to drag the application icon to the status bar.

Figure 25A:
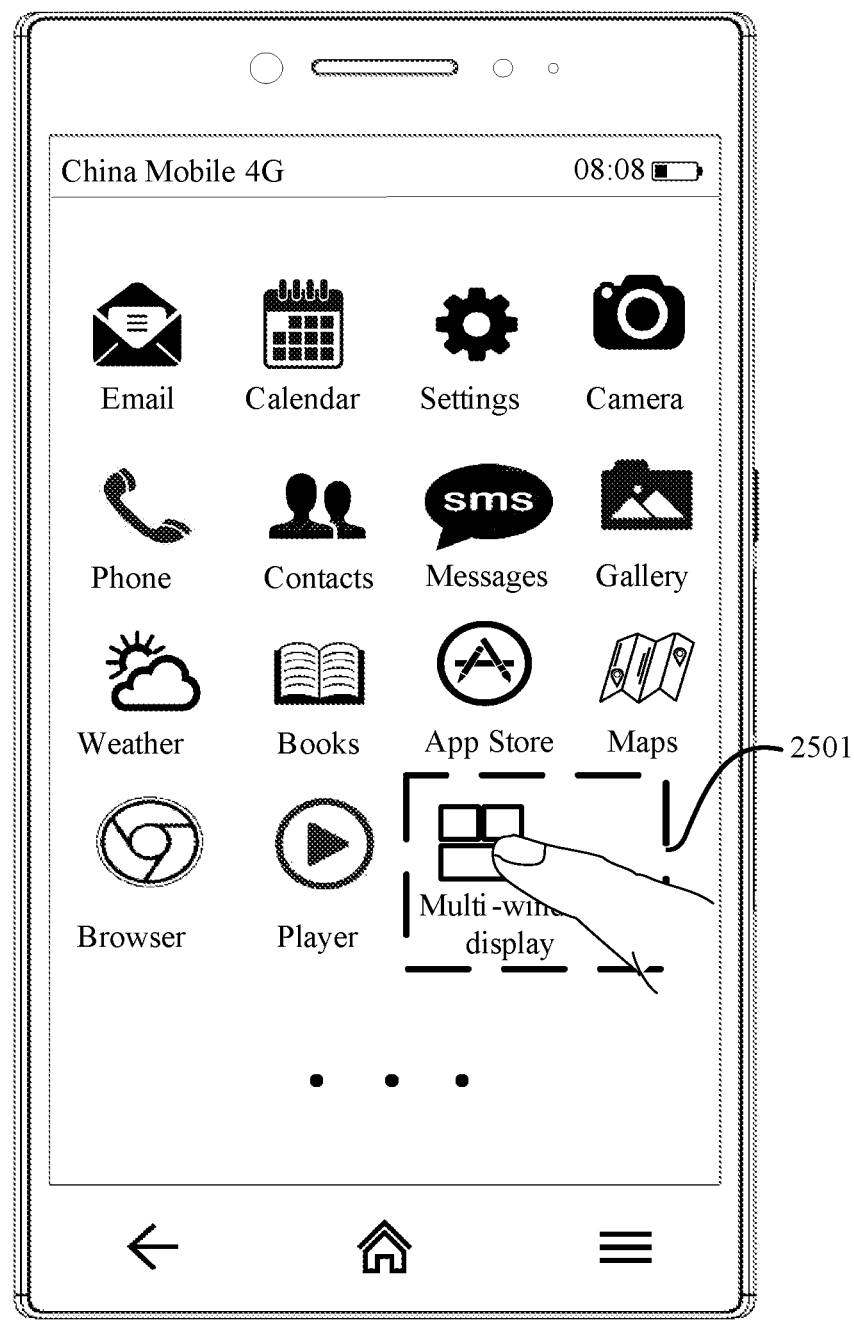
FIG. 25A and FIG. 25B are a schematic diagram of an example of a terminal interface.
Figure 25B:
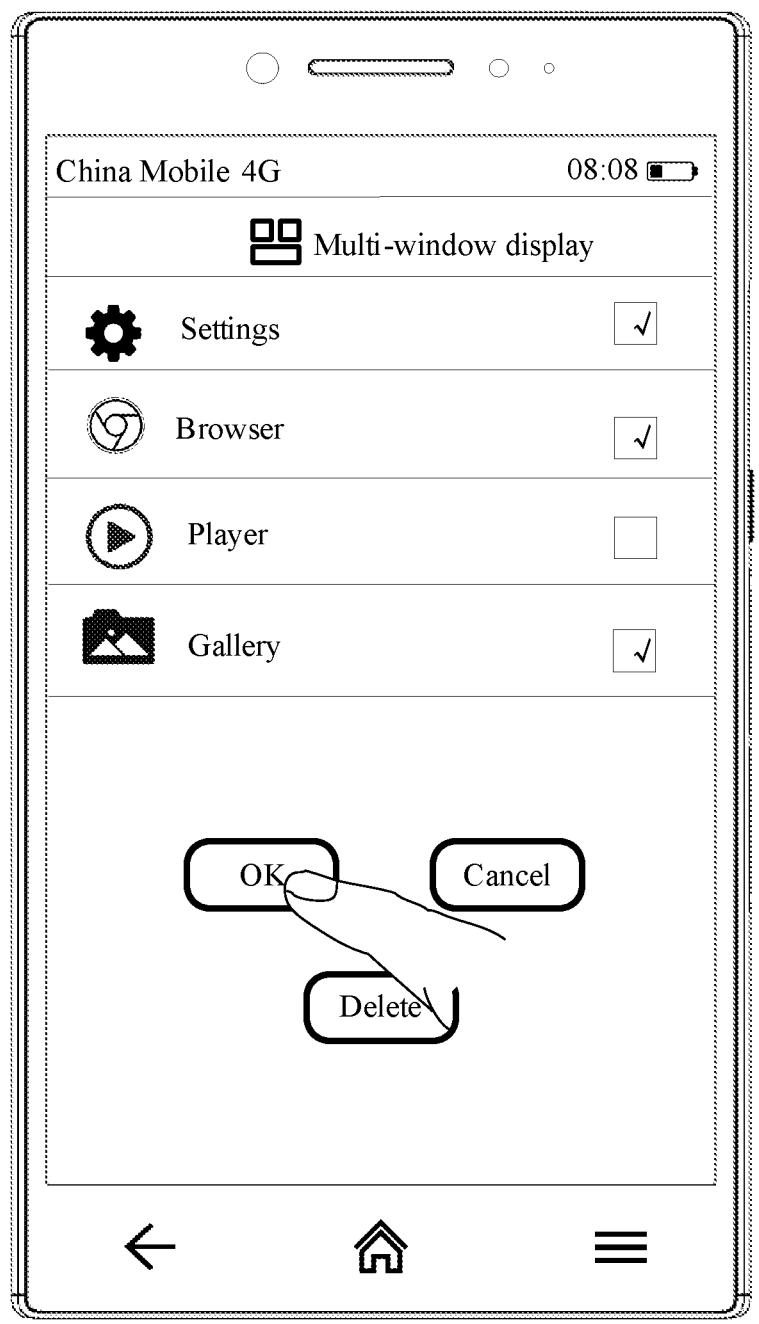

FIG. 25A shows another user interface, where the user interface includes a plurality of application icons, including an application icon "Multi-window display". In addition, the terminal detects an operation performed by the user to select an application "Multi-window display". For example, the operation may be tapping the application icon "Multi-window display". FIG. 25B shows a user interface displayed by the terminal in response to the operation performed by the user to select the application "Multi-window display". The user interface includes a plurality of application icons and check boxes corresponding to these application icons.

Figure 26:
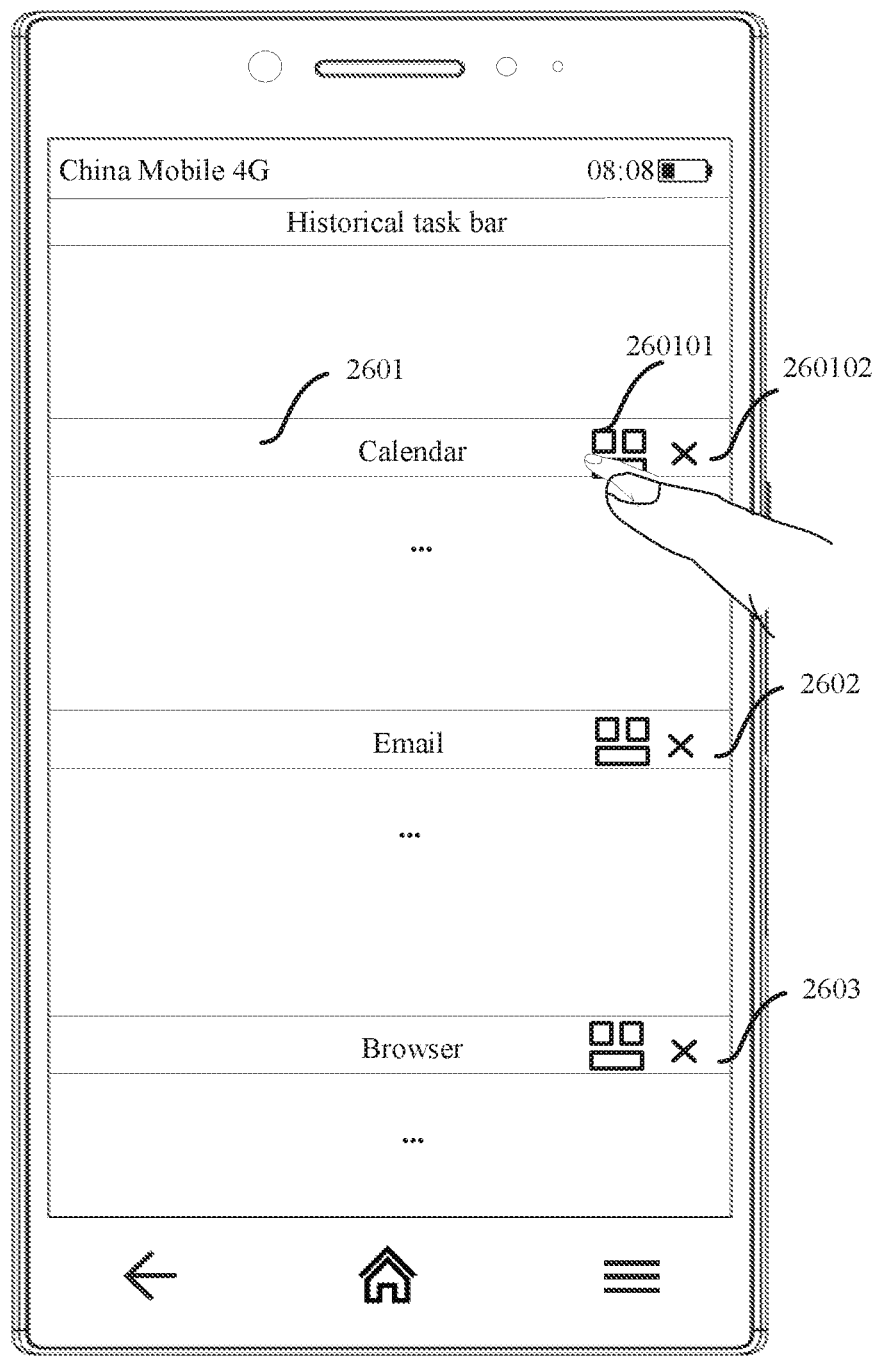
FIG. 26 is a schematic diagram of an example of a terminal interface.

FIG. 26 shows a user interface displayed by the terminal in response to an operation performed by the user to display the historical task bar. The user interface includes a task box 2601 corresponding to an interface of an application "Calendar", a task box 2602 corresponding to an interface of an application "Email", and a task box 2603 corresponding to an interface of the application "Browser". Each task box also includes a function button and a close button for multi-window display, such as 260101 and 260102.

Figure 27A:
FIG. 27A and FIG. 27B are a schematic diagram of an example of a terminal interface.
Figure 27B:
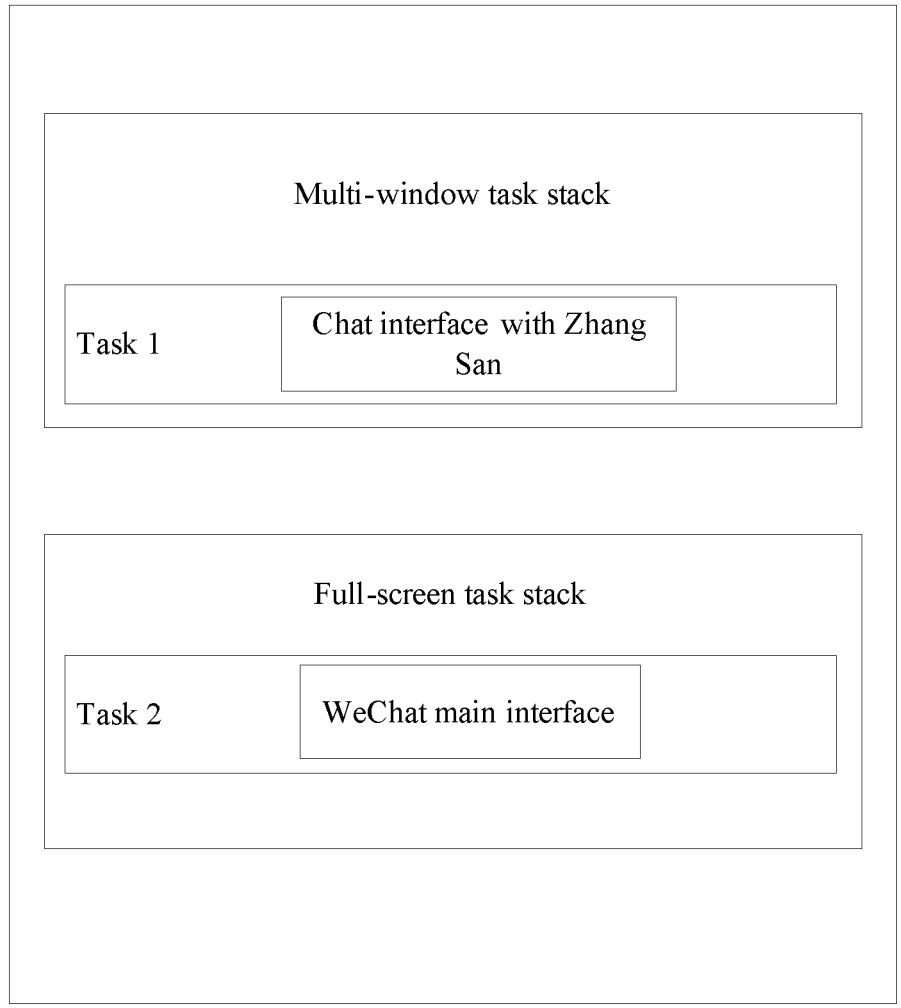

FIG. 27A shows another user interface displayed by the terminal in response to an operation performed by the user to display the historical task bar. The historical task bar includes a task bar of a main interface of the application "WeChat", and a task bar of a chatting with Zhang San interface of the application "WeChat". FIG. 27B shows a corresponding architectural diagram of the terminal when the terminal displays the user interface shown in FIG. 27A.

Figure 28:
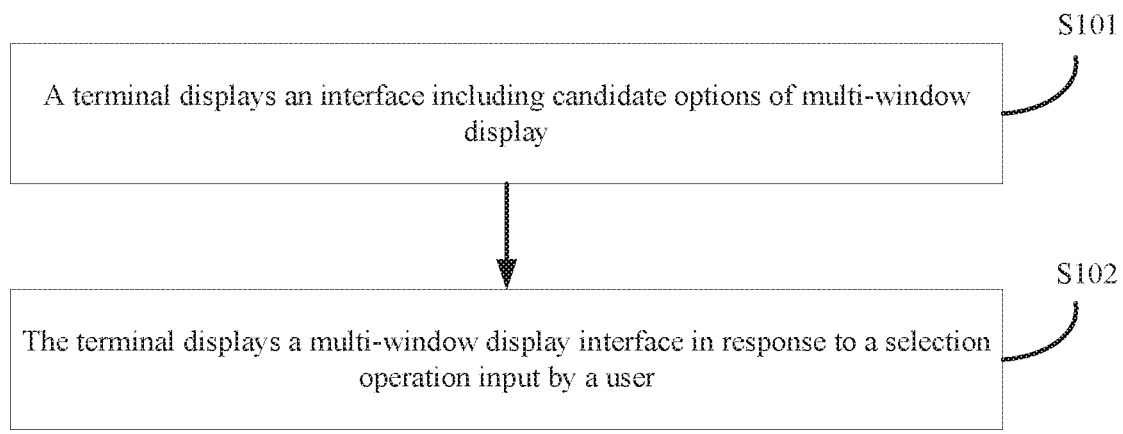
FIG. 28 is a schematic flowchart of a method for terminal display.

With reference to the foregoing drawings, the following describes a process of a method for terminal display according to an embodiment of this application. As shown in FIG. 28, the method specifically includes the following steps.

S101. The terminal displays an interface including candidate option for multi-window display.

The multi-window display means that the display screen of the terminal can display a plurality of windows at a same time, where each window may display a separate interface. An interface including candidate options for multi-window display may be denoted as a "first interface".

In a possible implementation, the interface including candidate options for multi-window display may be an interface including a drop-down menu of a status bar. As shown in FIG. 12, the interface of the application "Settings" and the interface of the application "Browser" are two candidate options. For another example, on the interface shown in FIG. 21A, the interface of the application "Player", the main interface of the application "WeChat", and the reading interface of the application "WeChat" are three candidate options.

In a possible implementation, the interface including candidate options for multi-window display may be alternatively an interface including a historical task bar. On the interface shown in FIG. 26, an interface corresponding to each historical task may be a candidate option for multi-window display.

In a possible implementation, the interface including candidate options for multi-window display may be alternatively an interface including a plurality of application icons. On the interface shown in FIG. 24, an application interface corresponding to each application icon is a candidate option for multi-window display.

In a possible implementation, the interface including candidate options for multi-window display may be alternatively a specific interface. As shown in FIG. 25, the specific interface may be an interface in an application "Multi-window display". As shown in FIG. 25B, the interface of the application "Settings", the interface of the application "Browser", the interface of the application "Player", and the interface of the application "Gallery" are four candidate options for a multi-window display interface.

It should be noted that the interface including candidate options for multi-window display may be a terminal interface in a screen unlocked state, or may be a terminal interface in a screen off or screen locked state. This is not limited in this embodiment of this application.

S102. The terminal displays a multi-window display interface in response to a selection operation input by the user.

The multi-window display interface may be denoted as a "second interface", and includes a plurality of windows, where each window may display a separate interface.

The selection operation input by the user is used to select, from candidate options, a plurality of interfaces to be displayed on the multi-window display interface. A quantity of the plurality of interfaces is not limited in this embodiment of this application. The selection operation may be one or more operations, and may be specifically a tap, a drag, a press, a voice input, an optical input, or an operation in another manner.

In a possible implementation, if the interface including candidate options for multi-window display is an interface including a drop-down menu of a status bar, the selection operation input by the user may be, for example, tapping a check box corresponding to a candidate option and tapping an OK button. As shown in FIG. 12, the terminal detects that the user taps the check box 1201, taps the check box 1202, and taps the button 1203. For another example, as shown in FIG. 14, the terminal detects that the user taps the check box 1401 corresponding to the application "Settings", the check box 1402 corresponding to the application "Browser", the check box 1403 corresponding to the application "Gallery", and the OK button 1404.

In a possible implementation, if the interface including candidate options for multi-window display is an interface including a historical task bar, the selection operation input by the user may be, for example, tapping a "Multi-window display" button corresponding to a candidate option. As shown in FIG. 22, the terminal detects that the user taps the button 2203 corresponding to the application "Calendar".

In a possible implementation, if the interface including candidate options for multi-window display is an interface including a plurality of application icons, the selection operation input by the user may be, for example, dragging a candidate option to move towards a specific area. As shown in FIG. 24, the terminal detects that the user drags the application icon of the application "Player" to the status bar.

Specifically, an input system of the terminal detects the selection operation input by the user, a control system generates an executable instruction, where the executable instruction includes interface identifiers corresponding to a plurality of interfaces. Then, a window management system re-arranges, based on the interface identifiers in the executable instruction, sizes of the interfaces corresponding to the interface identifiers, so that the display screen of the terminal can display the plurality of interfaces corresponding to the interface identifiers. In this case, an interface displayed on the terminal is a multi-window interface. In other words, the multi-window display interface includes a plurality of windows, and the windows correspond to the interface identifiers in the executable instruction in a one-to-one manner, that is, each window is used to display content of an interface corresponding to one interface identifier in the executable instruction.

It should be noted that an arrangement manner of the plurality of windows on the second interface may be as follows:

If the second interface displays two windows, the terminal may divide the display screen into an upper window and a lower window, to respectively display different interfaces selected by the user, as shown in FIG. 13A. Alternatively, a window is displayed overlapping the other window, as shown in FIG. 13B. Alternatively, the terminal may divide the display screen into a left window and a right window. For an arrangement manner thereof, refer to an arrangement mode of the foregoing two windows. Details are not described herein. Specifically, the arrangement manner may be alternatively selected automatically based on whether the terminal is currently in a portrait mode or a landscape mode, or the user may be prompted to manually select a specific arrangement manner. It should be noted that areas occupied by the two windows may be equal or not equal, or sizes of the two windows may be adjusted by the user.

If the second interface displays three windows, the terminal may divide the display screen into an upper part and a lower part. The upper part displays two windows, and the lower part displays one window, as shown in FIG. 15A. Alternatively, as shown in FIG. 15B, the upper part displays one window, and the lower part displays two windows. Alternatively, on the user interface shown in FIG. 16B, the upper part of the display screen of the terminal displays one window, the lower part displays one window, and over the two windows displays one window. Alternatively, on the user interface shown in FIG. 16A, the display screen of the terminal is divided into three parts. Alternatively, the display screen of the terminal may be divided into a left part and a right part. For an arrangement manner thereof, refer to an arrangement manner of the upper part and the lower part. Details are not described herein. It should be noted that areas occupied by the three windows may be equal or not equal.

Alternatively, areas of two of the three windows are equal, and an area occupied by another window is greater or less than an area occupied by each of the two windows. Alternatively, sizes of the plurality of windows may be adjusted by the user.

Optionally, window sizes and locations of windows displayed on the second interface may remain the same as those before the interface is displayed, and the windows may or may not overlap. This is not limited in this application.

It should also be noted that, a quantity of windows displayed on the multi-window display interface and a specific arrangement manner of each window are not limited in this embodiment of this application.

It should be noted that, the terminal may arrange, according to a rule, interface content displayed in each window on the multi-window display interface. For example, the terminal may display interfaces corresponding to applications in the windows in ascending or descending order of use frequencies, or may display an interface corresponding to a more frequently used application in a window occupying a larger area or in a window over another window. Alternatively, the terminal may display interfaces in the windows based on a sequence in which the user selects the interfaces. The interface content specifically displayed in each window of the multi-window interface is not limited in this embodiment of this application.

In the multi-window display method provided in this embodiment of this application, sizes of interfaces acting as candidate options (candidate interfaces for short) are re-arranged, so that the display screen of the terminal can display a plurality of interfaces simultaneously. The plurality of interfaces may be interfaces of different applications, different interfaces of one application, or a combination thereof. This helps simplify user operations, increase user efficiency, and improve user experience.

Figure 29:
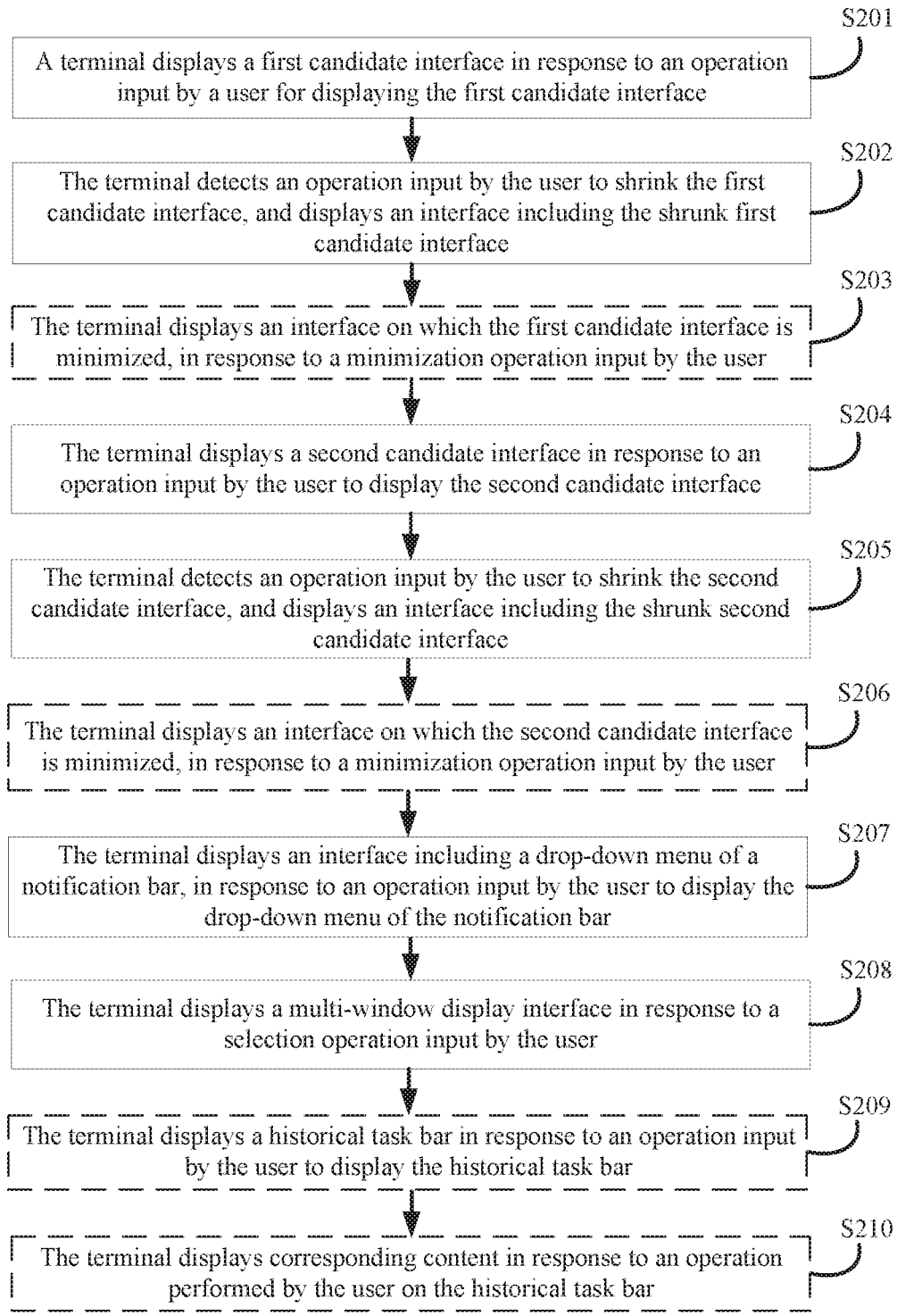
FIG. 29 is a schematic flowchart of a method for terminal display.

As a specific embodiment, this embodiment of this application may further include a step that the terminal detects that the user adds a candidate interface to an interface including a candidate option. Therefore, the following describes in detail a method for terminal display according to an embodiment of this application by using an example in which the interface including candidate options for the multi-window display is an interface including a drop-down menu of a status bar, as shown in FIG. 29. Details are as follows:

S201. The terminal displays a first candidate interface in response to an operation input by a user to display the first candidate interface.

The first candidate interface may be a main interface of a first application, or may be any other interface of the first application.

The operation input by the user to display the first candidate interface may be specifically a tap, a drag, a press, a voice input, an optical input, or an operation in another manner.

For example, FIG. 2A and FIG. 2B show a process in which the terminal detects an operation input by the user to display the first candidate interface and displays the first candidate interface. The first application is the application "Settings", the first candidate interface is a main interface of "Settings", and the operation input by the user to display the first candidate interface is tapping an application icon of "Settings".

S202. The terminal detects an operation input by the user to shrink a first candidate interface, and displays an interface including the shrunk first candidate interface.

The operation of shrinking the first candidate interface is used to instruct the terminal to shrink the first candidate interface, and may also be referred to as a switching operation. Specifically, for example, the operation may be sliding inwards from a location of any one of four included angles of the display screen, such as a gesture 301 shown in FIG. 3A, or may be sliding inwards from locations of four included angles of the display screen, or may be tapping a switch button, for example, an operation of tapping the button 2301 shown in FIG. 23, or may be selecting a switch option, or the like. The operation is not limited in the embodiments of this application.

The shrunk first candidate interface may also be referred to as a first candidate interface in a free-window mode.

For the first candidate interface in the free-window mode, the terminal adjusts a size of the first candidate interface and moves a location of the first candidate interface in the display screen, according to an adjustment operation input by the user on the first candidate interface. For example, the adjustment operation may be dragging the frame of the first candidate interface or inputting a corresponding size parameter as shown in FIG. 4A, or may be dragging the first candidate interface or inputting a corresponding location parameter as shown in FIG. 4B. The embodiments of this application set no limitation thereto.

Specifically, after an input system of the terminal detects an operation input by the user, a control system determines whether an input event is a switching instruction. If the input event is a switching instruction, according to the switching instruction, a window management system re-arranges a currently displayed interface, that is, the first candidate interface, modifies a size of a currently displayed window, and refreshes the display. In this case, the interface displayed on the terminal is the first candidate interface in the free-window mode.

Optionally, after the terminal determines to switch the first candidate interface to the free-window mode, a task management system sends information about the first candidate interface to a notification management system, in other words, the first candidate interface in the free-window mode is not managed by the task management system any more but managed by the notification management system. Therefore, the notification management system displays, in a drop-down menu of a status bar, interface information of the first candidate interface in the free-window mode, enabling the user to manage the first candidate interface in the free-window mode easily by using the drop-down menu of the status bar. However, the task management system displays, in a historical task bar, interface information corresponding to an interface in a full-screen mode, enabling the user to manage the interface in the full-screen mode easily by using the historical task bar. In this way, according to this embodiment of this application, the user can manage application interfaces in different modes and different states separately, thereby improving user experience.

For example, in an Android architecture, one application includes a plurality of interfaces. Each interface corresponds to one activity (one of basic components of Android), and a plurality of activities corresponding to the plurality of interfaces form an application activity stack, that is, a task. The task is managed by the task management system. Therefore, according to some embodiments of this application, after an interface is switched to the free-window mode, the interface is separated from the application activity stack and forms a separate window window. In this way, the interface may be managed by the notification management system, and is not managed by the task management system any more. On a display interface of the terminal, after the interface in the free-window mode exits, there is no record in the historical task bar. The interface may be displayed in a notification bar, that is, displayed in the drop-down menu of the status bar.

Optionally, the terminal displays the first candidate interface in the full-screen mode in response to a detected operation input by the user to display the first candidate interface in the full-screen mode. For example, the operation input by the user to display the first candidate interface in the full-screen mode may be tapping the full screen button 303 shown in FIG. 3B, or may be selecting a full screen option. The embodiments of this application set no limitation thereto.

It can be learned that, according to this embodiment of this application, an interface can be quickly switched from the full-screen mode to the free-window mode, and can also be quickly switched from the free-window mode back to the full-screen mode, thereby simplifying user operations, increasing user efficiency, and helping improve user experience.

Optionally, the terminal displays an interface on which the first candidate interface is closed, in response to a detected close operation input by the user. For example, the close operation input by the user may be the user's tapping, detected by the terminal, on the close button 304 shown in FIG. 3B, or may be the user's selecting a close option. The embodiments of this application set no limitation thereto.

Optionally, considering that some application interfaces include too much or too important content to switch to the free-window mode, or that the user does not want the application interfaces to switch to the free-window mode, the user may disable these application interfaces from switching to the free-window mode. After the control system detects that a switching operation is detected, the task management system also needs to determine whether the first candidate interface can be switched to the free-window mode. If yes, the window management system re-arranges the first candidate interface, and switches the first candidate interface to the free-window mode. Otherwise, prompt information is displayed to inform the user that the free-window mode is not supported for the first candidate interface. For example, as an interface in the free-window mode displays relatively less content, if a main interface of "WeChat" is in the free-window mode, the user may miss some important information. Therefore, the main interface of "WeChat" may be disabled from switching to the free-window mode. As a specific chat interface in "WeChat" has relatively less interface content, the specific chat interface may be set to a free-window allowed mode. In this way, the display screen of the terminal can display more interface information of another interface.

S203. The terminal displays an interface on which the first candidate interface is in a minimized state, in response to a minimization operation input by the user.

The minimization operation is used to instruct the terminal to minimize the first candidate interface. For example, the operation may be tapping a minimize button, for example, the user's tapping, detected by the terminal, on the button 302 shown in FIG. 5A, or may be selecting a minimization option. The embodiments of this application set no limitation thereto.

The interface on which the first candidate interface is in the minimized state may include an icon that is used to inform the user that the first candidate interface is in the minimized state. The icon may be referred to as a minimization icon for short. The minimization icon may be an application icon corresponding to the first candidate interface, or may be an icon of another pattern. As shown in FIG. 5B, the interface in the minimized state is the interface of the application "Settings", and the minimization icon 502 is the application icon of the application "Settings" and is located on the left of the status bar.

It should be noted that the terminal may display a minimization icon for each minimized interface, or may display all minimized interfaces by using one minimization icon. This is not limited in the embodiments of this application.

The interface displaying the first candidate interface in the minimized state may include an interface displayed before the terminal displays the first candidate interface, or may be set to include a display desktop by default. This is not limited in the embodiments of this application.

It should be noted that in this application, there are two kinds of notification messages. One is a universal notification message, that is, prompt information pushed by an application to the user. The user may quickly start or access the application by, for example, tapping the notification message, and in this case, the application is in the full-screen mode. FIG. 7B shows two universal notification messages of an application "Messages" and an application "Alipay". The other one is an application minimized notification message, used to inform the user that an application is in the minimized state. The user may select to display the application on a multi-window display interface. In addition, the user may access the application by, for example, tapping the notification message, and in this case, the application is in the free-window mode. FIG. 7A shows a minimized notification message of the application "Settings". FIG. 7A and FIG. 7B show a display manner in which the terminal displays the two kinds of notification messages on different pages. Optionally, the terminal may display the two kinds of notification messages on a same page without differentiation. A display manner of the notification messages is not limited by the embodiments of this application.

It should be noted that in this embodiment of this application, after minimizing the first candidate interface, the terminal determines the first candidate interface as a candidate option for multi-window display. Optionally, the terminal may directly determine the first candidate interface as a candidate option for multi-window mode after shrinking the first candidate interface, in other words, this step may be omitted.

S204. The terminal displays a second candidate interface in response to an operation input by the user to display the second candidate interface.

The second candidate interface may be any other interface except the first candidate interface of the first application, or may be any interface of a second application, where the second application and the first application are different.

For specific implementation of this step, refer to step S201.

S205. The terminal detects an operation input by the user to shrink the second candidate interface, and displays an interface including the shrunk second candidate interface.

For specific implementation of this step, refer to step S202.

S206. The terminal displays an interface on which the second candidate interface is in the minimized state, in response to a minimization operation input by the user.

For specific implementation of this step, refer to step S203.

S207. The terminal displays an interface including a drop-down menu of a status bar, in response to an operation input by the user to display the drop-down menu of the status bar.

For the step, refer to the first implementation in step S101. The interface including the drop-down menu of the status bar may be the interface including candidate options for multi-window display in S101, that is, the "first interface".

It should be noted that after steps S201 to S206 are performed, the drop-down menu of the status bar includes a candidate option corresponding to the first candidate interface and a candidate option corresponding to the second candidate interface. However, before steps S201 to S206 are performed, the drop-down menu of the status bar does not include the candidate option corresponding to the first candidate interface and the candidate option corresponding to the second candidate interface. In other words, steps S201 to S206 are steps for adding the first candidate interface and the second candidate interface to the drop-down menu of the status bar.

It should also be noted that the drop-down menu of the status bar in this application may also be referred to as a drop-down bar of the status bar, a drop-down bar, a notification bar, or a drop-down menu of the notification bar, a drop-down bar of the notification bar, or the like. This is not limited in this application.

S208. The terminal displays a multi-window display interface in response to a selection operation input by the user.

For the step, refer to the first implementation in step S102. The multi-window display interface herein may be the multi-window display interface in S102, that is, the "second interface".

It should be noted that the terminal adds the multi-window display interface including the first candidate interface and the second candidate interface to the historical task bar.

Optionally, after it is determined that the first candidate interface and the second candidate interface are combined into the multi-window display interface, the notification management system sends interface information of the first candidate interface and the second candidate interface to the task management system, in other words, the first candidate interface and the second candidate interface are not managed by the notification management system any more but managed by the task management system. Therefore, the task management system displays, in the historical task bar, the interface information corresponding to the first candidate interface and the second candidate interface, enabling the user to manage the multi-window display interface easily by using the historical task bar. However, the user manages an interface in the free-window mode still by using the drop-down menu of the status bar. In this way, this embodiment of this application helps the user manage the multi-window display interface and the interface in the free-window mode separately, thereby improving user experience.

For example, in the Android architecture, a newly added multi-window task stack (Stack) is also referred to as a free stack. When there are two or more interfaces in the free-window mode, a multi-window task stack is formed. After a plurality of interfaces in the free-window mode are combined into one multi-window display interface, the plurality of interfaces in the free-window mode are combined into one task that is stored in the multi-window task stack, as shown in FIG. 20B. If the plurality of interfaces in the free-window mode are combined into a plurality of multi-window display interfaces, a plurality of tasks are formed and stored in the multi-window task stack, as shown in FIG. 22B.

In other words, the task management system manages the multi-window display interface by using the multi-window task stack, and manages a full-screen interface by using a full-screen task stack, also called a full stack. Specifically, one multi-window display interface corresponds to one task in the multi-window task stack, and one full-screen interface corresponds to one task in the full-screen task stack. As shown in FIG. 20A, the historical task bar includes a multi-window display interface 2001, a full-screen display interface 2002, and a full-screen display interface 2003. With reference to FIG. 20B, it can be learned that the multi-window display interface 2001 in the historical task bar corresponds to a task 1 in a multi-window task stack, where the task includes the interface of the application "Settings", the interface of the application "Browser", and the interface of the application "Gallery"; and in the historical task bar, the full-screen interface 2002 corresponds to a task 2 in a full-screen task stack, and the full-screen interface 2003 corresponds to a task 3 in the full-screen task stack.

Therefore, if the second candidate interface is any other interface except the first candidate interface of the first application, the multi-window display interface displays different interfaces of one application, realizing single-application multi-task experience. If the second candidate interface is any interface of the second application, where the second application is different from the first application, the multi-window display interface displays different interfaces of different applications, realizing multi-task experience.

Further, an embodiment of this application further provides a method for terminal display. Following step S208, the method further includes the following steps.

S209. The terminal detects an operation input by the user to display a historical task bar, and displays the historical task bar.

The operation of displaying the historical task bar may be, for example, tapping a menu bar and selecting an option of the historical task bar, or double-tapping a menu bar, or the like. The operation of displaying the historical task bar is not limited in this embodiment of this application.

S210. The terminal displays corresponding content in response to an operation of the user on the historical task bar.

Specifically, if the terminal detects an operation input by the user to display a multi-window interface, the terminal displays the multi-window display interface, that is, the "second interface". If the terminal detects an operation input by the user to display the first candidate interface, the terminal displays the first candidate interface; and if the terminal detects an operation input by the user to display the second candidate interface, the terminal displays the second candidate interface.

For example, as shown in FIG. 20A, if the terminal detects that the user taps the multi-window display interface 2001, the terminal displays a multi-window display interface including the interface of the application "Settings", the interface of the application "Browser", and the interface of the application "Gallery". If the terminal detects that the user taps a full screen button of one interface on the multi-window display interface, for example, the user taps a full screen button of the interface of the application "Settings", the terminal displays a full-screen interface of the application "Settings".

Further, a quantity of windows displayed on the multi-window display interface is not limited in this embodiment of this application. Therefore, before step S207, the terminal may continue to detect a selection operation of the user to display a third candidate interface, a fourth candidate interface, and so on. Details are not described one by one in this embodiment of this application.

In an application scenario, the user is reading news or a subscribed article by using the application "WeChat". At this time, if a chat message is received, the user needs to exit the news or the subscribed article, and return to a main interface of "WeChat" to view the unread message. However, after viewing the message, if the user wants to continue reading the previously read news or subscribed article, the user needs to open the article again, and slide to a position of last view to continue reading. However, if the method for terminal display provided in this application is used, the terminal can display an interface of the news or the subscribed article being read in one window, and display a chat interface of "WeChat" in another one or more windows, thereby improving user experience.

For example, the terminal detects an operation performed by the user to select the drop-down menu of the status bar, and displays the drop-down menu of the status bar. As shown in FIG. 21A, the terminal again detects that the user selects the main interface of "WeChat" and an article reading interface in "WeChat" and taps an OK button, and the terminal displays the interface shown in FIG. 21B, that is, a multi-window display interface including the main interface of "WeChat" and the article reading interface in "WeChat".

Further, after displaying a combined multi-window display interface, that is, after step S207, the terminal may further continue to display one or more multi-window display interfaces according to the foregoing method in response to an operation of the user.

Further, after the user opens one or more multi-window display interfaces, an embodiment of this application further provides a method for terminal display, to enable the terminal to quickly switch, in response to an operation of the user, a displayed interface between the plurality of multi-window display interfaces, or between the plurality of multi-window display interfaces and a full-screen interface.

For example, the terminal detects an operation input by the user to display the historical task bar, and displays the historical task bar, where the historical task bar displays an application interface in the full-screen mode and a multi-window display interface. As shown in FIG. 22A, 2201 and 2202 are multi-window display interfaces, and 2203 and 2204 are full-screen interfaces.

For example, the task management system manages a plurality of multi-window display interfaces by using the multi-window task stack, and manages a full-screen interface by using the full-screen task stack. Specifically, the multi-window task stack may include a plurality of tasks, and one multi-window display interface corresponds to one task in the multi-window task stack. One full-screen interface corresponds to one task in the full-screen task stack. As shown in FIG. 22B, the multi-window display interface 2201 in the historical task bar corresponds to a task 1 in a multi-window task stack, and the multi-window display interface 2202 corresponds to a task 2 in the multi-window task stack. The full-screen interface 2203 in the historical task bar corresponds to a task 3 in a full-screen task stack, and the full-screen interface 2204 corresponds to a task 4 in the full-screen task stack.

If the terminal detects that the user taps to display an interface corresponding to 2201, the terminal displays a multi-window display interface including the interface of the application "Settings", the interface of the application "Browser", and the interface of the application "Gallery". If the terminal detects that the user taps a full screen button on an interface, the terminal displays the interface in the full-screen mode. If the terminal detects that the user taps a close button on an interface, the terminal displays an interface on which the foregoing interface is closed. If the terminal detects that the user taps to display an interface corresponding to 2203, the terminal displays the interface of the application "Calendar", where the interface of the application "Calendar" is in the full-screen mode or the free-window mode. It can be learned that this embodiment of this application realizes quick switching of a terminal interface between the full-screen interface and the multi-window display interface, and between a plurality of multi-window display interfaces, thereby simplifying operations and improving user experience.

For example, the method for terminal display provided in this application may further generate a plurality of tasks from a plurality of interfaces of one application. Specifically, a full-screen interface corresponds to one task, and some interfaces of the application are switched to the free-window mode to form a new task.

For example, the user opens the main interface of "WeChat", continues to open a chat interface with Zhang San in "WeChat", and switches the chat interface to the free-window mode. The user opens the historical task bar again, as shown in FIG. 27A. When the terminal displays an interface of the historical task bar, a corresponding terminal architecture is shown in FIG. 27B. The chat interface with Zhang San in "WeChat" corresponds to a task 1 in a multi-window task stack, and the main interface of the application "WeChat" corresponds to a task 2 in a full-screen task stack.

Figure 30:
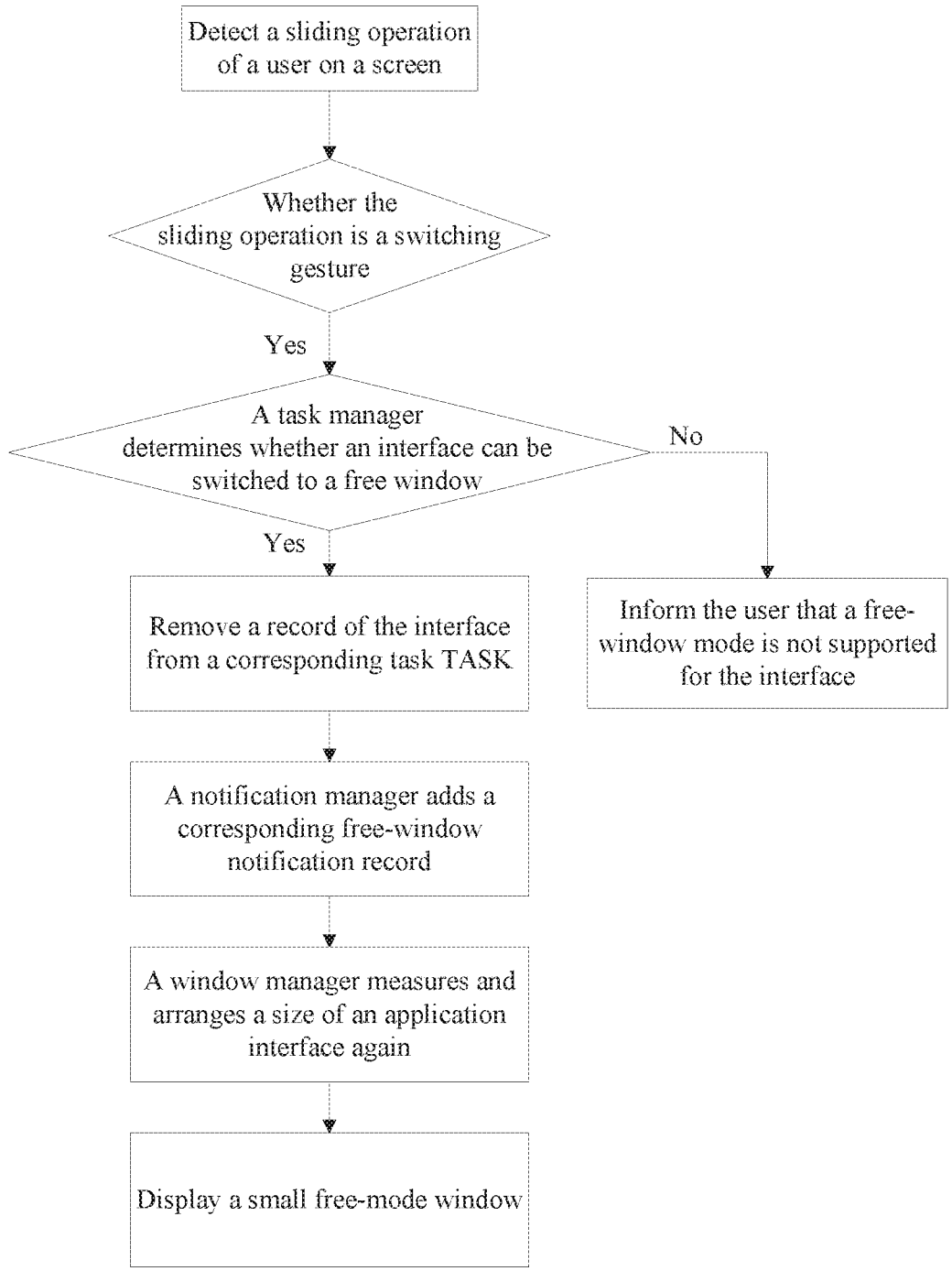
FIG. 30 is a schematic flowchart of a method for terminal display.

FIG. 30 is a flowchart of switching an interface to a free-window mode provided in this application.

Specifically, an input system is configured to detect a sliding operation of the user on a screen.

A control system is configured to determine whether the sliding operation of the user on the screen is a switching gesture.

If the sliding operation of the user on the screen is a switching gesture, a task management system or a task manager is configured to determine whether an interface can be switched to a free window.

If the interface can be switched to the free window, the task management system or the task manager is configured to remove a record of the interface from a task corresponding to the interface. A notification management system or a notification manager is configured to add a notification record of the interface. If the interface cannot be switched to the free window, the user is informed that the free-window mode is not supported for the interface.

A window management system or a window manager measures and arranges a size of an application interface again.

Figure 31A:
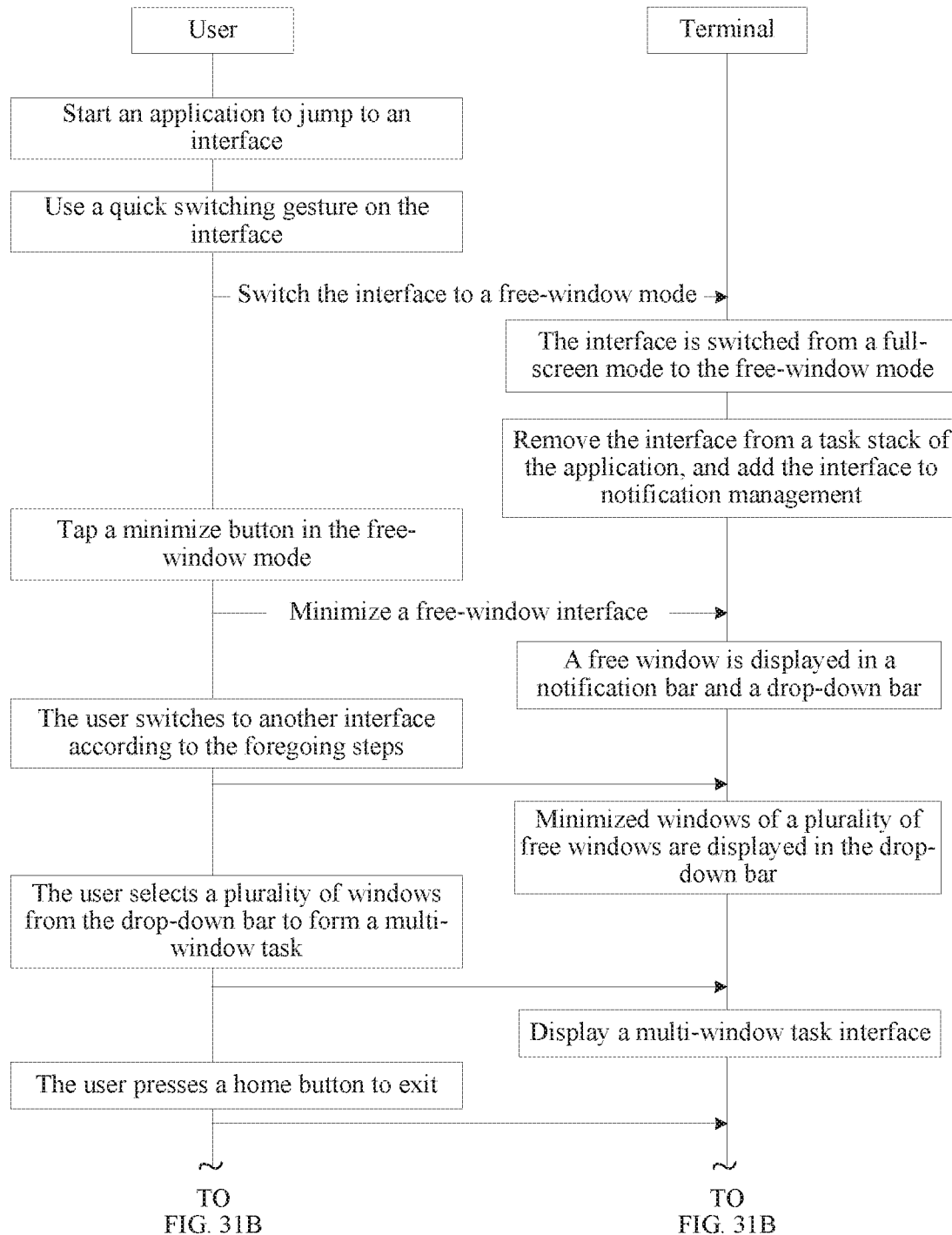
FIG. 31A and FIG. 31B are a schematic flowchart of a method for terminal display.
Figure 31B:
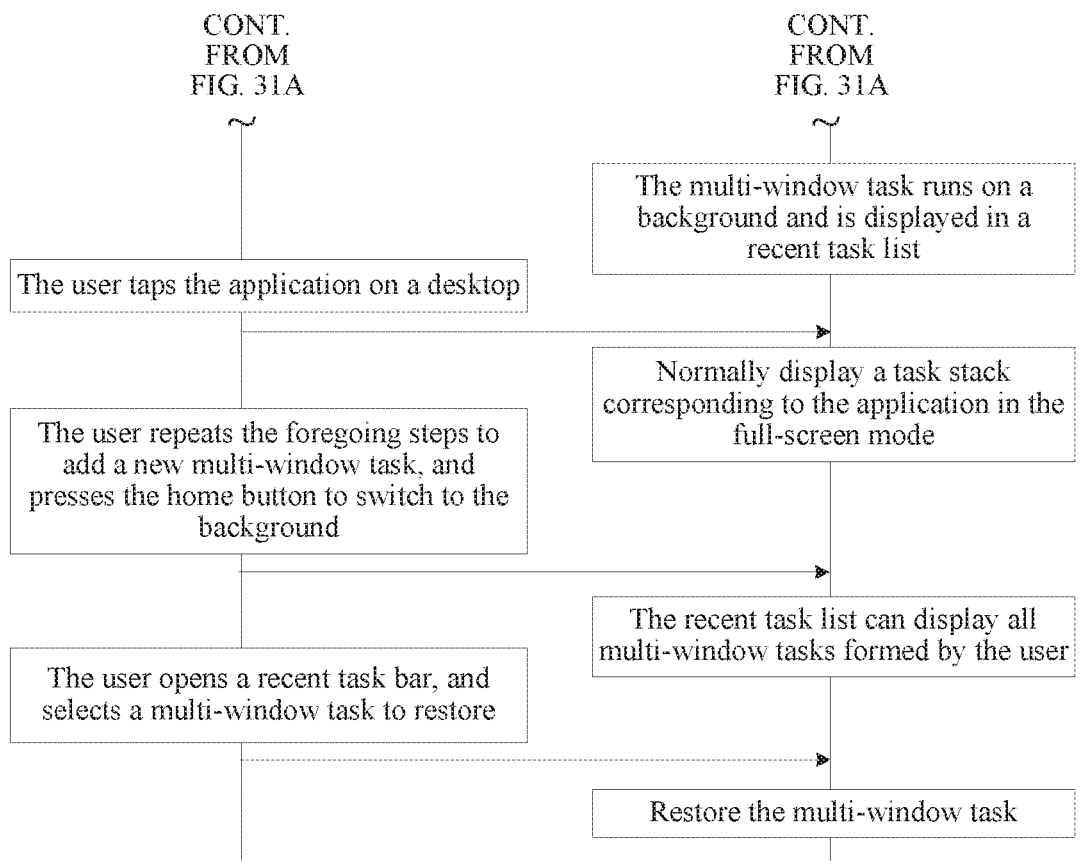

FIG. 31A and FIG. 31B are a flowchart of displaying a plurality of multi-window display interfaces provided in this application.

The plurality of multi-window display interfaces may be interfaces of different applications. The flowchart also shows a process for restoring display of one of the plurality of multi-window display interfaces.

Figure 32A:
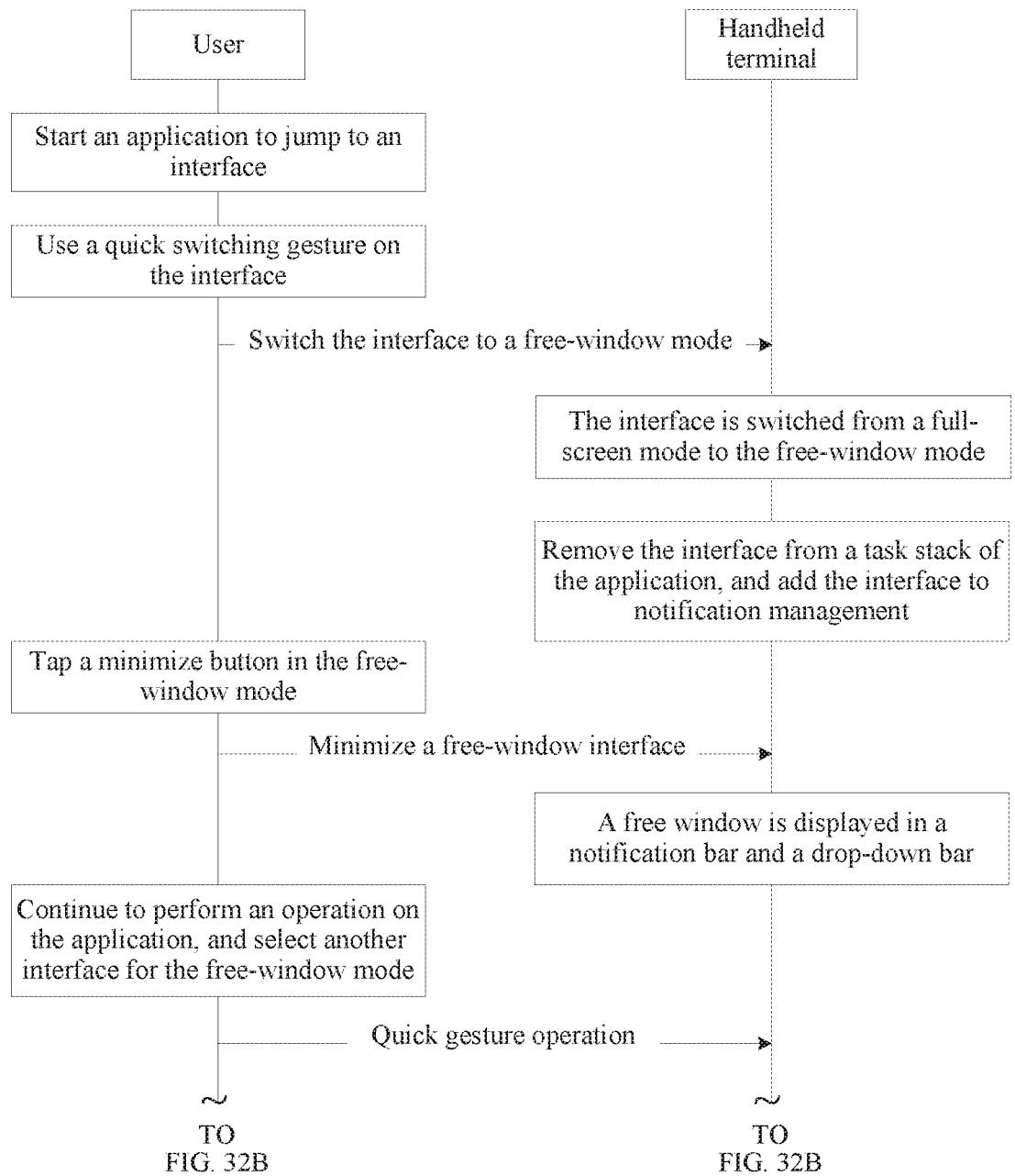
FIG. 32A and FIG. 32B are a schematic flowchart of a method for terminal display.
Figure 32B:
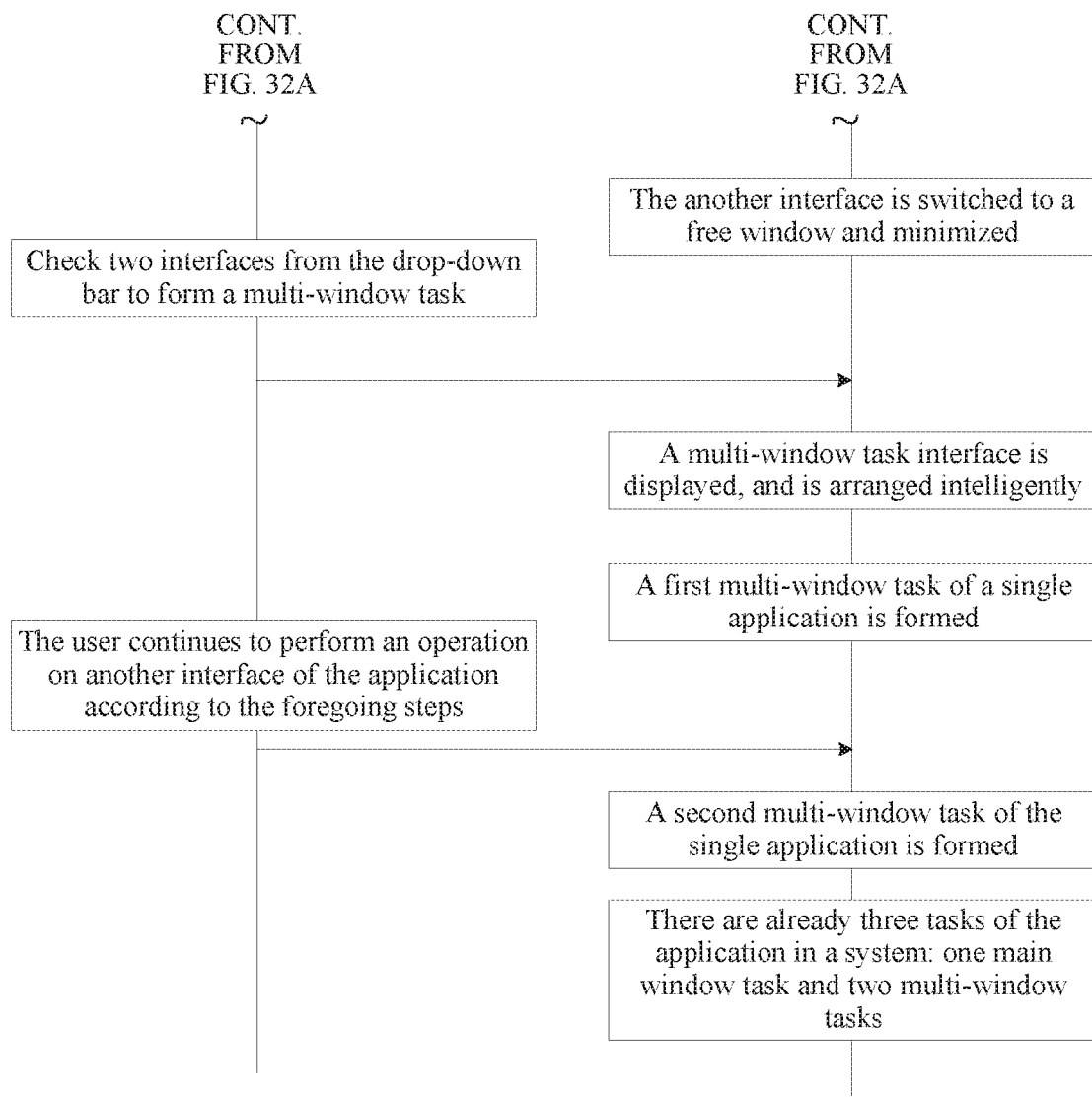

FIG. 32A and FIG. 32B are a flowchart of displaying a plurality of multi-window display interfaces provided in this application.

The plurality of multi-window display interfaces may be different interfaces of one application.

It may be understood that, to implement the foregoing functions, the foregoing terminal includes a corresponding hardware structure and/or software module for performing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, functional module division may be performed on the foregoing terminal or the like according to examples of the foregoing method. For example, functional modules may be obtained through division based on corresponding functions, or two or more functions may be integrated into one processing module. The foregoing integrated module may be implemented in a form of hardware, or may be implemented in a form of a software functional module. It should be noted that, in an embodiment of the present invention, module division is an example, and is merely a logical function division. In actual implementation, another division manner may be used.

Figure 33:
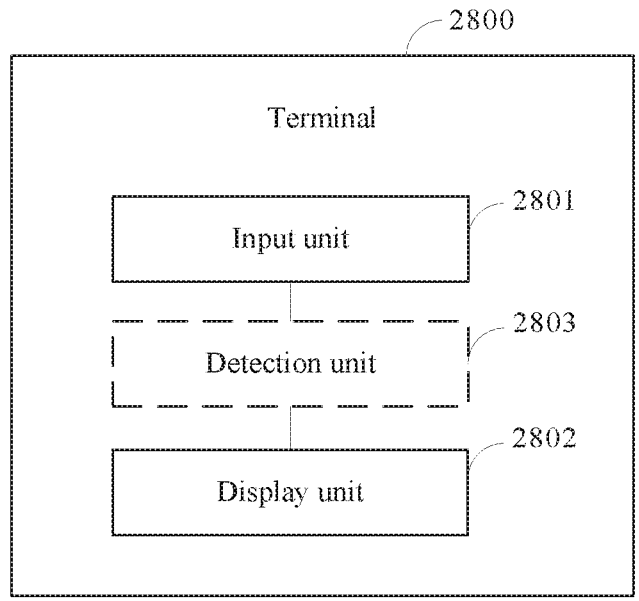
FIG. 33 is a schematic diagram of a hardware structure of a terminal.

When the functional modules are obtained through division based on corresponding functions, FIG. 33 shows a possible schematic structural diagram of the terminal in the foregoing embodiments. The terminal 2800 includes an input unit 2801 and a display unit 2802.

The input unit 2801 is configured to support the terminal in perform the following operations in the foregoing method embodiments: receiving the selection operation input by the user in S102, the operation input by the user to display the first candidate interface in S201, the operation input by the user to shrink the first candidate interface in S202, the minimization operation input by the user in S203, the operation input by the user to display the second candidate interface in S204, the operation input by the user to shrink the second candidate interface in S205, the minimization operation input by the user in S206, the operation input by the user to display the drop-down menu of the status bar in S207, the selection operation input by the user in S208, the operation input by the user to display the historical task bar in S209, and the operation of the user on the historical task bar in S210, and/or other processes of technologies described in this specification. The display unit 2802 is configured to support the terminal in performing the following operations in the method embodiments: displaying the interface including the candidate options for multi-window display in S101, the multi-window display interface in S102, the first candidate interface in S201, the interface including the shrunk first candidate interface in S202, the interface on which the first candidate interface is in the minimized state in S203, the second candidate interface in S204, the interface including the shrunk second candidate interface in S205, the interface on which the second candidate interface is in the minimized state in S206, the interface including the drop-down menu of the status bar in S207, the multi-window display interface in S208, the interface displaying the historical task bar in S209, the interface including other related content in S210, and/or another process of the technology described in this specification.

Further, the foregoing terminal 2800 may further include a detection unit 2803. The detection unit 2803 is configured to support the terminal in detecting an operation input by the user in the method embodiments, and/or another process of the technology described in this specification.

All related content of the steps involved in the foregoing method embodiments may be cited in function descriptions of a corresponding functional module. Details are not described herein.

Certainly, the terminal 2800 includes but is not limited to the foregoing units and modules. For example, the terminal 2800 may further include a communications unit, where the communications unit is configured to communicate with another terminal. The terminal 2800 may further include a storage unit that is configured to store program code, data, and the like. In addition, functions that the foregoing functional units may specifically realize also include but are not limited to functions corresponding to method steps described in the foregoing embodiments. Other units of the terminal 2800 may be described by reference to detailed description of corresponding method steps. Details are not described in this embodiment of this application.

When an integrated unit is used, the detection unit 2803 may be integrated into a processing module for implementation, the communications unit may be an RF circuit, a Wi-Fi module, or a bluetooth module of the terminal, the foregoing storage unit may be a storage module of the terminal, and the foregoing display unit may be a display module, such as a touchscreen.

Figure 34:
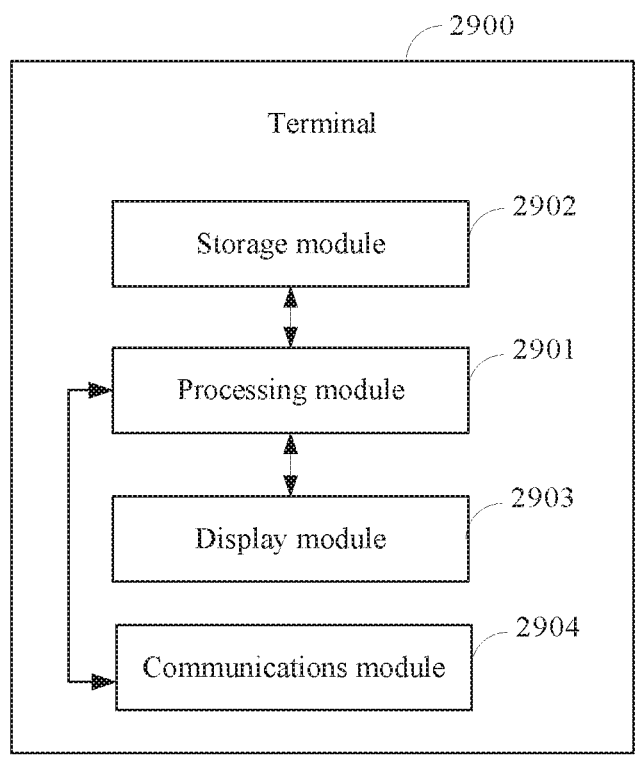
FIG. 34 is a schematic diagram of a hardware structure of a terminal.

FIG. 34 shows a possible schematic structural diagram of the terminal in the foregoing embodiments. The terminal 2900 includes: a processing module 2901, a storage module 2902, a display module 2903, and a communications module 2904. The processing module 2901 is configured to control and manage an action of the terminal. The display module 2903 is configured to display an image generated by the processing module 2901. The storage module 2902 is configured to store program code and data of the terminal. The communications module 2904 is configured to communicate with another terminal. For example, the communications module 2904 is configured to perform voice communication with another terminal, and receive data from or send data to the another terminal.

The processing module 2901 may be a processor or a controller, such as a central processing unit (Central Processing Unit, CPU), a general-purpose processor, a digital signal processor (Digital Signal Processing, DSP), an application-specific integrated circuit (Application-Specific Integrated Circuit, ASIC), a field programmable gate array (Field Programmable Gate Array, FPGA), or another programmable logic device, a transistor logic device, a hardware component, or a combination thereof. The processor/controller may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 2904 may be a transceiver, a transceiver circuit, a communications interface, or the like. The storage module 2902 may be a memory.

When the processing module 2901 is a processor (such as the processor 101 shown in FIG. 1A), the communications module 2904 is an RF circuit (such as the radio frequency circuit 102 shown in FIG. 1A), the storage module 2902 is a memory (such as the memory 103 shown in FIG. 1A), and the display module 2903 is a touchscreen (including the touch panel 104-1 and the display 104-2 shown in FIG. 1A), the terminal provided in this application may be the mobile phone 100 shown in FIG. 1A. The communications module 2904 may not only include the RF circuit, but also include a Wi-Fi module and a bluetooth module. The communications modules such as the RF circuit, the Wi-Fi module, and the bluetooth module may be collectively referred to as a communications interface. The foregoing processor, communications interface, touchscreen, and memory may be coupled together by using a bus.

This application further provides a computer storage medium. The computer storage medium stores computer program code. When the foregoing processor executes the computer program code, the terminal performs related method steps in any one of FIG. 28 to FIG. 32B to implement the method for terminal interface display in the foregoing embodiments.

This application further provides a computer program product. When the computer program product is run on a computer, the computer is enabled to perform related method steps in any one of FIG. 28 to FIG. 32B to implement the method for terminal interface display in the foregoing embodiments.

The terminal 2800, the terminal 2900, the computer storage medium, or the computer program product provided in this application are configured to perform the corresponding method provided above. Therefore, for beneficial effects that can be achieved, refer to beneficial effects in the corresponding methods provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented based on a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiment.

In addition, functional units in each embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in each embodiment of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A mobile terminal, comprising:
   a processor;
   a touchscreen display coupled to the processor; and
   a memory coupled to the processor and storing instructions that, when executed by the processor, cause the mobile terminal to be configured to:
   display a first user interface, wherein the first user interface comprises a second user interface of a first application, a second user interface of a second application and a second user interface of a third application;
   receive a first operation for displaying a historical task bar, wherein the historical task bar displays interface information corresponding to recently started application programs and enabling a user to manage the recently started application programs;
   display, in response to the first operation, a third user interface comprising the historical task bar, wherein the historical task bar comprises a first historical task box, wherein the first historical task box corresponds to the first user interface, wherein the first historical task box comprises a fourth user interface of the first application, a fourth user interface of the second application and a fourth user interface of the third application, wherein the historical task bar comprises a second historical task box and a third historical task box, and wherein the second historical task box corresponds to a fifth user interface comprising a sixth user interface of a fourth application and a seventh user interface of the fourth application, wherein the third historical task box comprises an eighth user interface of a fifth application, and wherein a size of the fourth user interface of the first application is smaller than a size of the second user interface of the first application, wherein a size of the fourth user interface of the second application is smaller than a size of the second user interface of the second application, and wherein a size of the fourth user interface of the third application is smaller than a size of the second user interface of the third application;

receive a second operation performed on the first historical task box; and display the first user interface in response to the second operation.

2. The mobile terminal of claim 1, wherein a first part of the first user interface comprises the second user interface of the first application and the second user interface of the second application, and wherein a second part of the first user interface comprises the second user interface of the third application.

3. The mobile terminal of claim 1, wherein the instructions further cause the mobile terminal to be configured to:

receive a third operation selecting a close button that corresponds to the second user interface of the first application; and close the second user interface of the first application in response to the third operation.

4. The mobile terminal of claim 1, wherein the instructions further cause the mobile terminal to be configured to:

receive a fourth operation selecting a full screen button corresponds to the second user interface of the second application; and display a full screen user interface of the first second application in response to the fourth operation.

5. The mobile terminal of claim 1, wherein the first user interface is displayed in response to a fifth operation performed on a ninth user interface, wherein the ninth user interface comprises a first icon of the first application, a second icon of the second application and a third icon of the third application, and wherein the fifth operation is an operation for selecting the first icon, the second icon and the third icon.

6. The mobile terminal of claim 1, wherein the second user interface of the first application, the second user interface of the second application and the second user interface of the third application are displayed separately without overlap in the first user interface.

7. The mobile terminal of claim 1, wherein the first historical task box, the second historical task box and the third historical task box are displayed separately without overlap in the third user interface.

8. The mobile terminal of claim 1, wherein the fourth user interface of the first application, the fourth user interface of the second application and the fourth user interface of the third application are displayed separately without overlap in the first task historical box.

9. The mobile terminal of claim 1, wherein the size of the second user interface of the first application is smaller than the size of the second user interface of the third application, wherein the size of the second user interface of the second application is smaller than the size of the second user interface of the third application.

10. A method, implemented by a mobile terminal, comprising:

displaying a first user interface, wherein the first user interface comprises a second user interface of a first application, a second user interface of a second application and a second user interface of a third application;

receiving a first operation for displaying a historical task bar, wherein the historical task bar displays interface information corresponding to recently started application programs and enabling a user to manage the recently started application programs;

displaying, in response to the first operation, a third user interface comprising the historical task bar, wherein the historical task bar comprises a first historical task box, wherein the first historical task box corresponds to the first user interface, wherein the first historical task box comprises a fourth user interface of the first application, a fourth user interface of the second application and a fourth user interface of the third application, wherein the historical task bar comprises a second historical task box and a third historical task box, and wherein the second historical task box corresponds to a fifth user interface comprising a sixth user interface of a fourth application and a seventh user interface of the fourth application, and wherein the third historical task box comprises an eighth user interface of a fifth application, wherein a size of the fourth user interface of the first application is smaller than a size of the second user interface of the first application, wherein a size of the fourth user interface of the second application is smaller than a size of the second user interface of the second application, and wherein a size of the fourth user interface of the third application is smaller than a size of the second user interface of the third application;

receiving a second operation performed on the first historical task box; and displaying the first user interface in response to the second operation.

11. The method of claim 10, wherein a first part of the first user interface comprises the second user interface of the first application and the second user interface of the second application, and wherein a second part of the first user interface comprises the second user interface of the third application.

12. The method of claim 11, wherein the first historical task box, the second historical task box and the third historical task box are displayed separately without overlap in the third user interface.

13. The method of claim 11, wherein the size of the second user interface of the first application is smaller than the size of the second user interface of the third application, wherein the size of the second user interface of the second application is smaller than the size of the second user interface of the third application.

14. The method of claim 10, further comprising:

receiving a third operation selecting a close button corresponds to the second user interface of the first application; and closing the second user interface of the first application in response to the third operation.

15. The method of claim 10, further comprising:

receiving a fourth operation selecting a full screen button corresponds to the second user interface of the second application; and displaying a full screen user interface of the second application in response to the fourth operation.

16. The method of claim 10, wherein the first user interface is displayed in response to a fifth operation performed on a ninth user interface, wherein the ninth user interface comprises a first icon of the first application, a second icon of the second application and a third icon of the third application, and wherein the fifth operation is an operation for selecting the first icon, the second icon and the third icon.

17. The method of claim 10, wherein the second user interface of the first application, the second user interface of the second application and the second user interface of the third application are displayed separately without overlap in the first user interface.

18. The method of claim 10, wherein the fourth user interface of the first application, the fourth user interface of the second application and the fourth user interface of the third application are displayed separately without overlap in the first historical task box.

19. A computer program product comprising computer-executable instructions stored on a non-transitory computer-readable medium that, when executed by a processor, cause a mobile terminal to:
- display a first user interface, wherein the first user interface comprises a second user interface of a first application, a second user interface of a second application and a second user interface of a third application;
- receive a first operation for displaying a historical task bar, wherein the historical task bar displays interface information corresponding to recently started application programs and enabling a user to manage the recently started application programs;
- display a third user interface comprising the historical task bar, wherein the historical task bar comprises a first historical task box in response to the first operation, wherein the first historical task box corresponds to the first user interface, wherein the first historical task box comprises a fourth user interface of the first application, a fourth user interface of the second application and a fourth user interface of the third application, wherein the historical task bar comprises a second historical task box and a third historical task box, and wherein the second historical task box corresponds to a fifth user interface comprising a sixth user interface of a fourth application and a seventh user interface of the fourth application, and wherein the third historical task box comprises an eighth user interface of a fifth application, wherein a size of the fourth user interface of the first application is smaller than a size of the second user interface of the first application, wherein a size of the fourth user interface of the second application is smaller than a size of the second user interface of the second application, and wherein a size of the fourth user interface of the third application is smaller than a size of the second user interface of the third application;
- receive a second operation performed on the first historical task box; and
- display the first user interface in response to the second operation.

20. The computer program product of claim 19, wherein the second user interface of the first application, the second user interface of the second application and the second user interface of the third application are displayed separately without overlap in the first user interface.

* * * * *